(12) United States Patent
Arieli et al.

(10) Patent No.: US 7,609,388 B2
(45) Date of Patent: *Oct. 27, 2009

(54) SPATIAL WAVEFRONT ANALYSIS AND 3D MEASUREMENT

(75) Inventors: Yoel Arieli, Jerusalem (IL); Shay Wolfling, Kfar-Azar (IL); David Banitt, Tal-Shahar (IL); Yosi Weitzman, Tel Aviv (IL); Yoram Saban, Shoham (IL); Emmanuel Lanzmann, Tel Aviv (IL); Shay Levavi, Haifa (IL)

(73) Assignee: ICOS Vision Systems NV, Leuven (heverlee) (BE)

( * ) Notice: Subject to any disclaimer, the term of this patent is extended or adjusted under 35 U.S.C. 154(b) by 586 days.

This patent is subject to a terminal disclaimer.

(21) Appl. No.: 10/499,758

(22) PCT Filed: Oct. 16, 2002

(86) PCT No.: PCT/IL02/00833

§ 371 (c)(1),
(2), (4) Date: Aug. 27, 2004

(87) PCT Pub. No.: WO03/062743

PCT Pub. Date: Jul. 31, 2003

(65) Prior Publication Data

US 2005/0007603 A1    Jan. 13, 2005

Related U.S. Application Data

(60) Provisional application No. 60/351,753, filed on Jan. 24, 2002, provisional application No. 60/406,593, filed on Aug. 27, 2002.

(51) Int. Cl.
*G01B 9/02* (2006.01)

(52) U.S. Cl. .................................................... 356/512

(58) Field of Classification Search ................. 356/450, 356/521, 513–516, 499, 489, 495
See application file for complete search history.

(56) References Cited

U.S. PATENT DOCUMENTS 3,612,693 A * 10/1971 Stetson ....................... 356/458
3,694,088 A     9/1972 Gallagher et al.

(Continued)

FOREIGN PATENT DOCUMENTS

EP     0 555 099 A1    8/1993

(Continued)

OTHER PUBLICATIONS

Abstract. Japanese Patent No. JP9230247, Olympus Optical Co. Ltd., Sep. 5, 1997.

(Continued)

*Primary Examiner*—Hwa S Lee
(74) *Attorney, Agent, or Firm*—Darby & Darby P.C.

(57) ABSTRACT

A method of wavefront (100) analysis including applying a transform to the wavefront, applying a plurality of different phase changes (110, 112, 114) to the transformed wavefront (108), obtaining a plurality of intensity maps (130, 132, 134) wherein the plurality of different phase changes are applied to region of the transformed wavefront, corresponding to a shape of the light source.

74 Claims, 21 Drawing Sheets

U.S. PATENT DOCUMENTS

| | | | |
|---|---|---|---|
| 4,190,366 A | 2/1980 | Doyle | |
| 4,407,569 A | 10/1983 | Piller et al. | |
| 4,624,569 A | 11/1986 | Kwon | |
| 4,653,921 A | 3/1987 | Kwon | |
| 4,867,565 A | 9/1989 | Lequime | |
| 5,159,474 A | 10/1992 | Franke et al. | |
| 5,235,587 A | 8/1993 | Bearden et al. | |
| 5,446,540 A | 8/1995 | Lin | |
| 5,471,303 A | 11/1995 | Ai et al. | |
| 5,502,564 A * | 3/1996 | Ledger | 356/503 |
| 5,600,440 A | 2/1997 | Bendall | |
| 5,619,372 A | 4/1997 | Hellmuth et al. | |
| 5,751,475 A | 5/1998 | Ishiwata et al. | |
| 5,777,736 A | 7/1998 | Horton | |
| 5,814,815 A | 9/1998 | Matsumoto et al. | |
| 5,870,191 A | 2/1999 | Shirley et al. | |
| 5,936,253 A | 8/1999 | Sugaya | |
| 5,969,853 A | 10/1999 | Takaoka | |
| 5,969,855 A | 10/1999 | Ishiwata et al. | |
| 6,107,617 A * | 8/2000 | Love et al. | 250/201.9 |
| 6,281,993 B1 * | 8/2001 | Bernal et al. | 359/29 |
| 6,819,435 B2 | 11/2004 | Arieli et al. | |
| 6,911,637 B1 * | 6/2005 | Vorontsov et al. | 250/201.9 |

FOREIGN PATENT DOCUMENTS

| | | | |
|---|---|---|---|
| GB | 2315700 A1 | | 2/1998 |
| WO | WO 97/41478 | * | 11/1997 |

OTHER PUBLICATIONS

Abstract. Japanese Patent No. JP9179029, Olympus Optical Co. Ltd., Jul. 11, 1997.

Abstract. Japanese Patent No. JP8094936, Olympus Optical Co. Ltd., Apr. 12, 1996.

Abstract. Japanese Patent No. JP7261089, Olympus Optical Co. Ltd., Oct. 13, 1995.

Abstract. Japanese Patent No. JP7225341, Olympus Optical Co. Ltd, Aug. 22, 1995.

Abstract. Japanese Patent No. JP6186504, Olympus Optical Co. Ltd., Jul. 8, 1994.

Phillion, D.W., "General methods for generating phase-shifting interferometry algorithms", Applied Optics, Nov. 1, 1997, vol. 36, No. 31, pp. 8098-8115.

Pluta, Maksymillian, "Stray-light problem in phase contrast microscopy or toward highly sensitive phase contrast devices: a review", Optical Engineering, Dec. 1993, vol. 32, No. 12, pp. 3199-3212.

Noda, Tomoya, et al., "Separation of phase and absorption images in phase-contract microscopy", Journal of the Optical Society of America A, Jun. 1992, vol. 9, No. 6, pp. 924-931.

Creath, Katherine, "Phase-Measurement Interferometry Techniques", Progress in Optics XXVI, 1988, pp. 349-393.

Greivenkamp, J.E., "Generalized data reduction for heterodyne interferometry", Optical Engineering, Jul./Aug. 1984, vol. 23, No. 4, pp. 350-352.

Morgan, C.J., "Least-squares estimation in phase-measurement interferometry", Optics Letters, Aug. 1982, vol. 7, No. 8, pp. 368-370.

Golden, Lewis J., "Zernike test: Analytical aspects", Applied Optics, Jan. 1977, vol. 16, No. 1, pp. 205-213.

Bruning, J.H., et al., "Digital Wavefront Measuring Interferometer for Testing Optical Surfaces and Lenses", Applied Optics, Nov. 1974, vol. 13, No. 11, pp. 2693-2692.

* cited by examiner

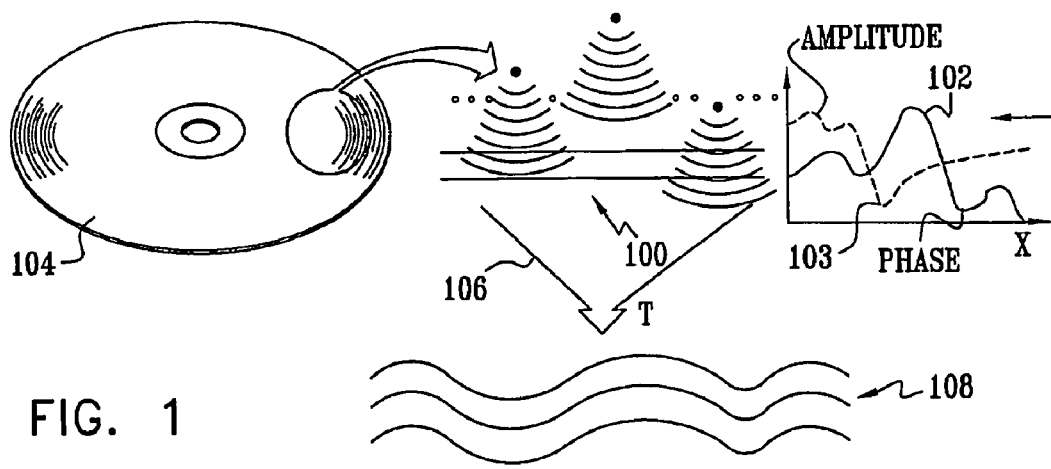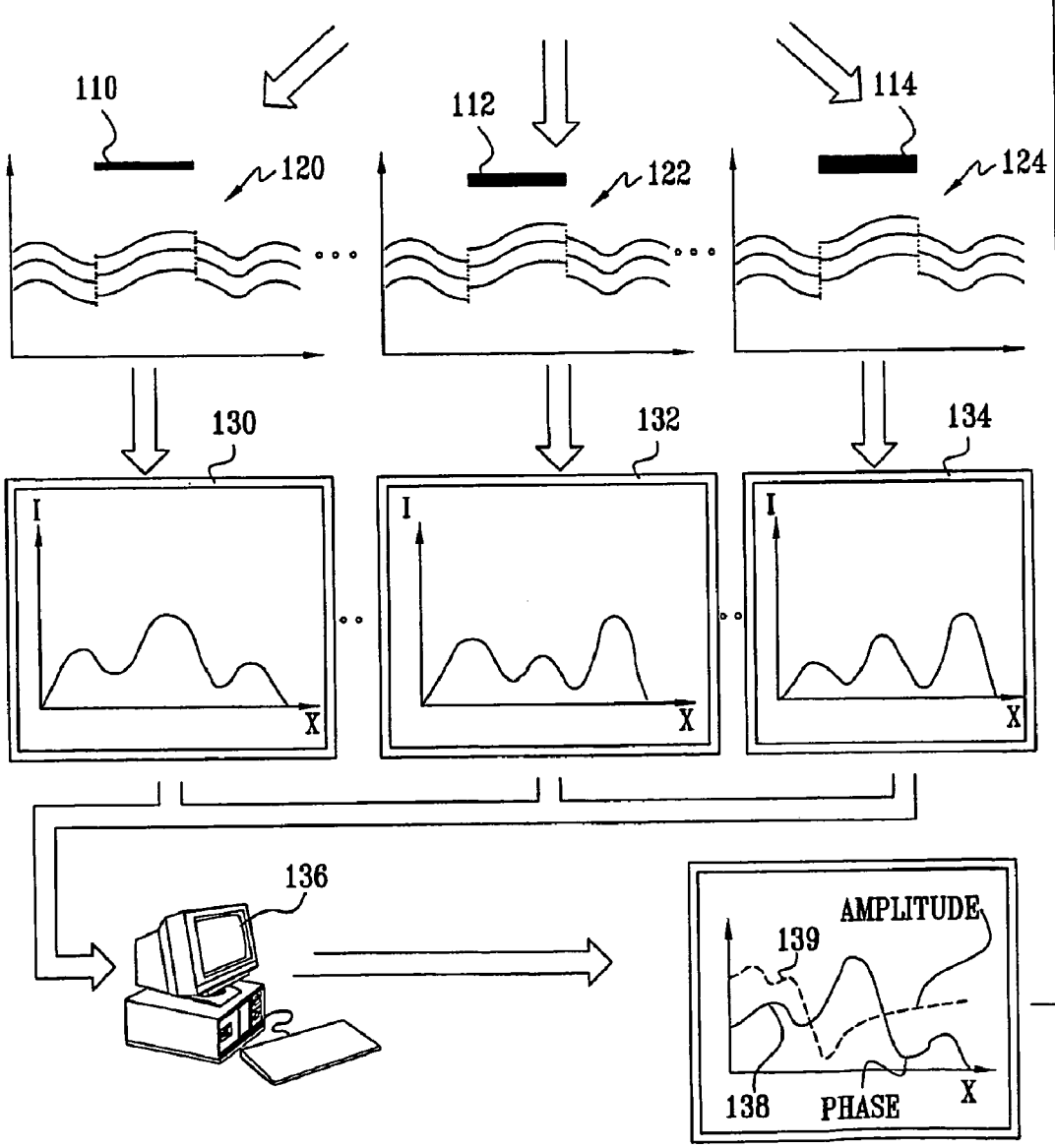
FIG. 1

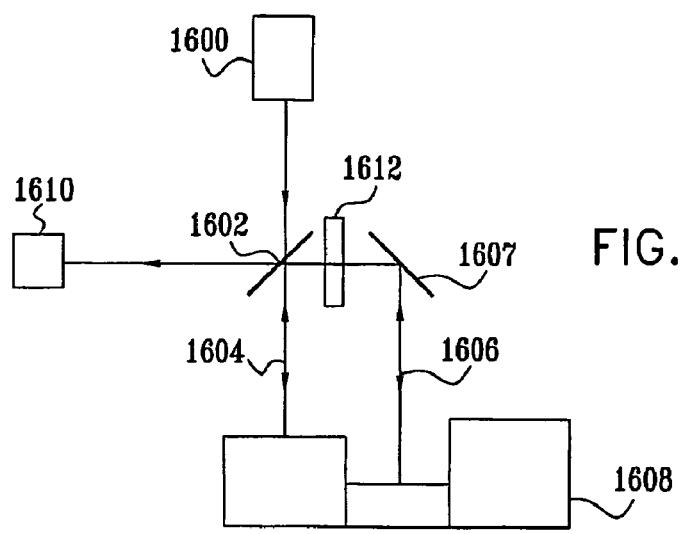
FIG. 16
FIG. 17
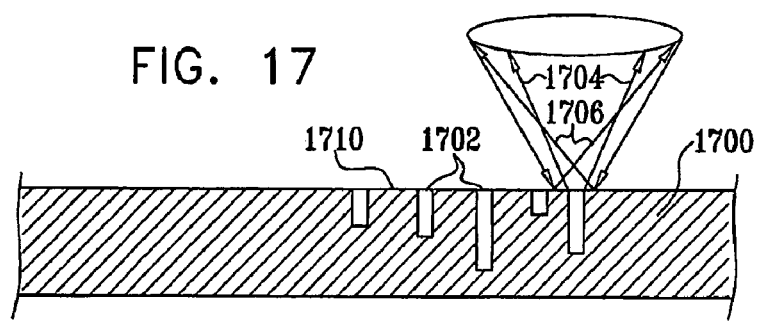
FIG. 18
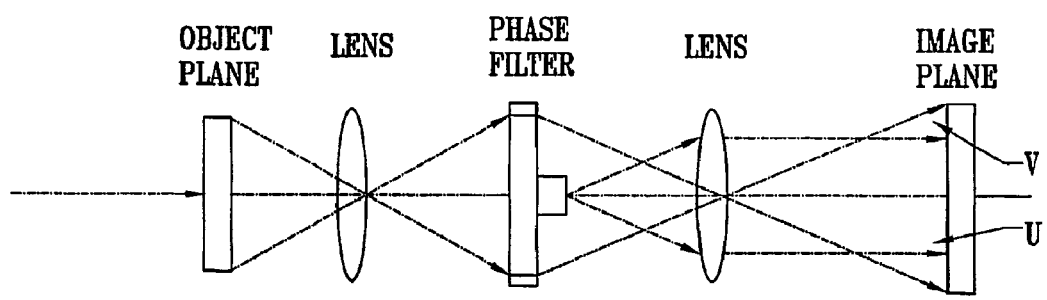
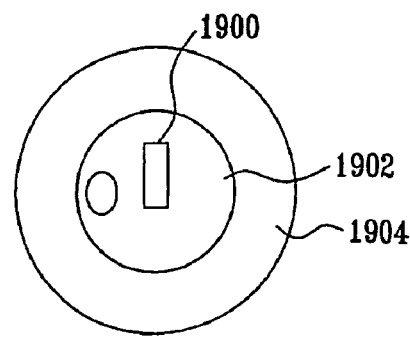
FIG. 19

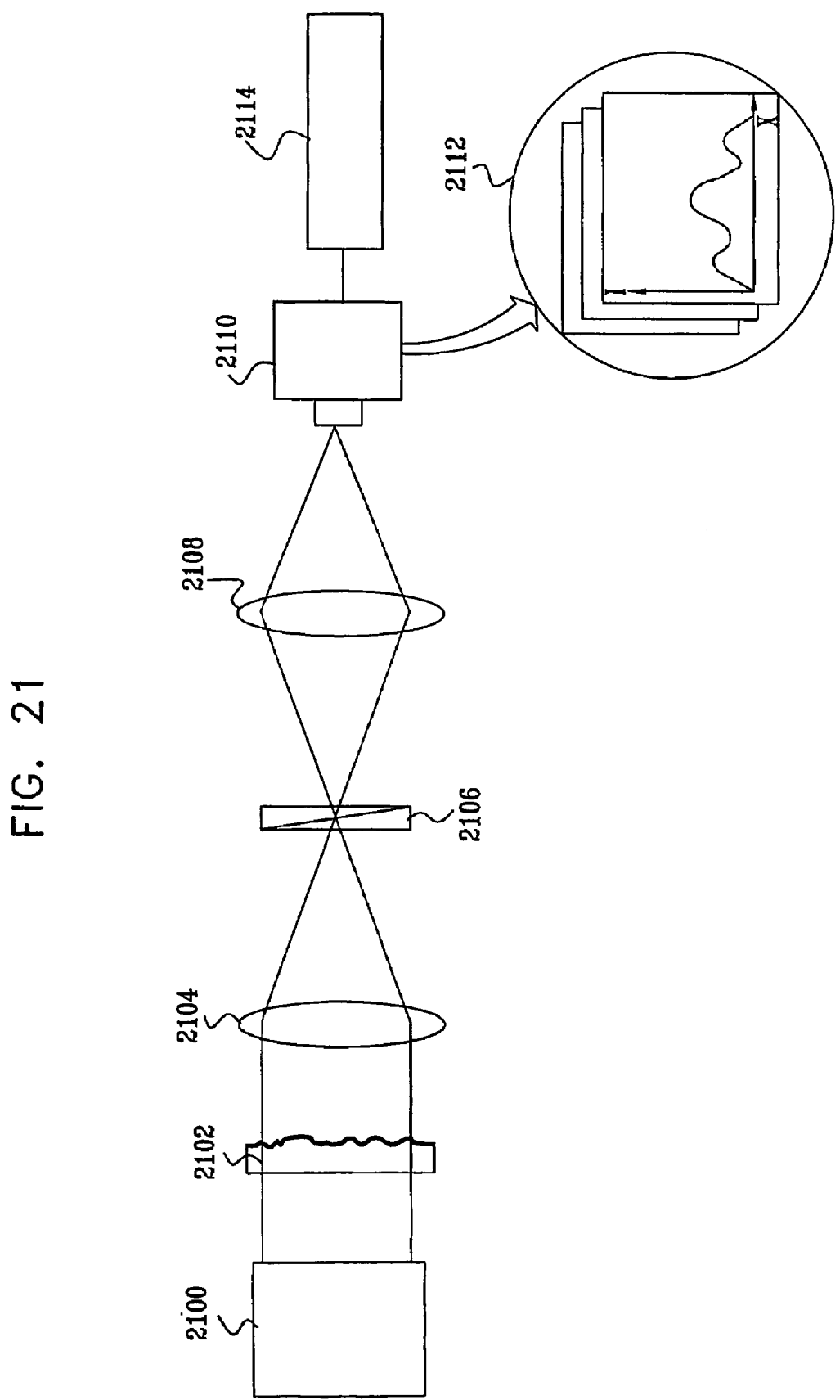

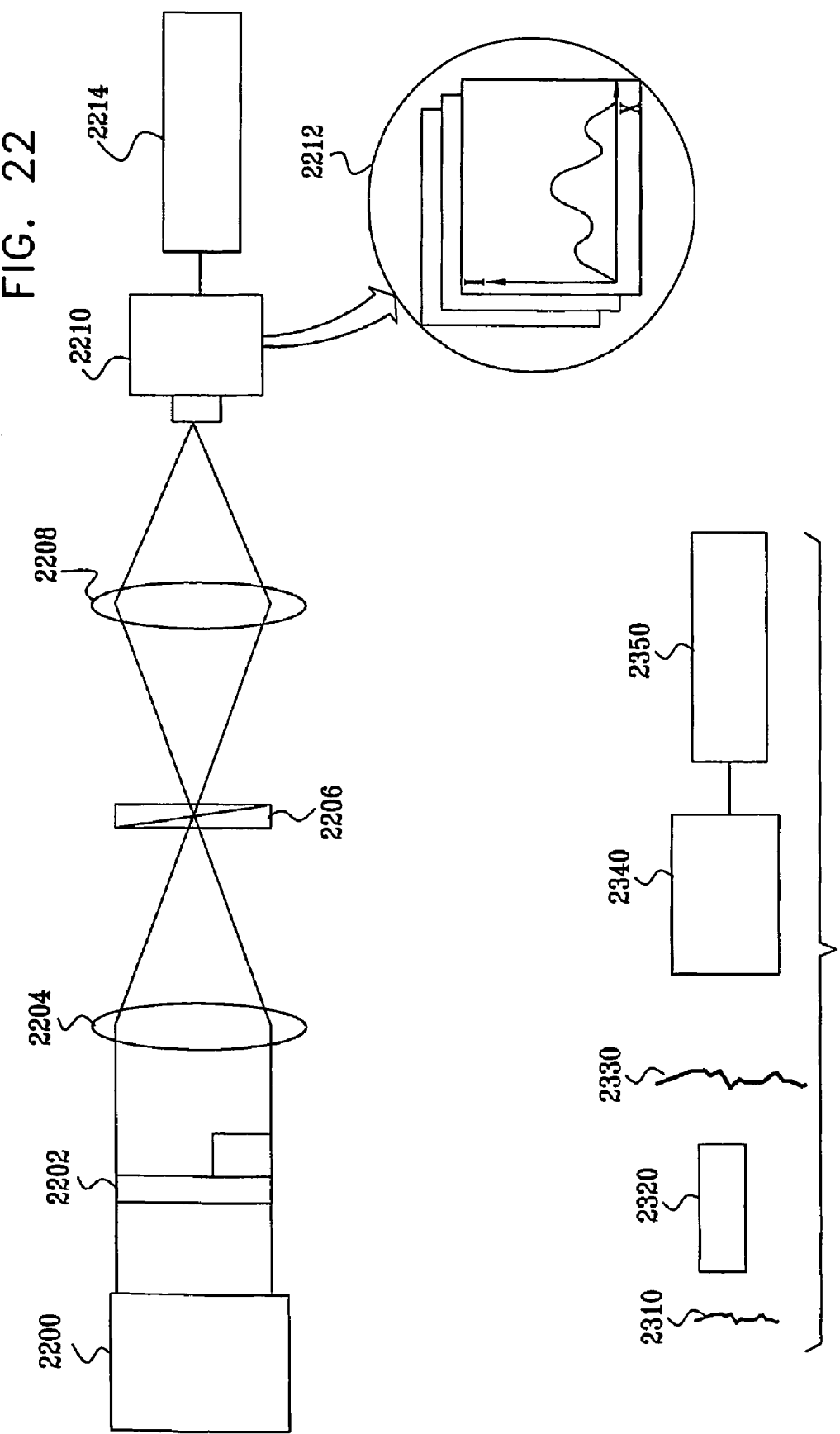

SPATIAL WAVEFRONT ANALYSIS AND 3D MEASUREMENT

REFERENCE TO CO-PENDING APPLICATIONS

Applicant hereby claims priority of U.S. Provisional Patent Application Ser. No. 60/351,753, filed on Jan. 24, 2002, entitled "Improved Spatial Wavefront Analysis and Measurement" and U.S. Provisional Patent Application Ser. No. 60/406,593, filed on Aug. 27, 2002, entitled "Best Methods for Spatial Wavefront Analysis and 3D Measurement".

FIELD OF THE INVENTION

The present invention relates to the field of spatial wavefront analysis.

BACKGROUND OF THE INVENTION

The following patents and publications are believed to represent the current state of the art:

U.S. patents:

U.S. Pat. Nos. 5,969,855; 5,969,853; 5,936,253; 5,870,191; 5,814,815; 5,777,736; 5,751,475; 5,619,372; 5,600,440; 5,471,303; 5,446,540; 5,235,587; 5,159,474; 4,653,921; 4,407,569 and 4,190,366.

Other Patents:

JP 9230947 (Abstract); JP 9179029 (Abstract); JP 8094936 (Abstract); JP 7261089 (Abstract); JP 7225341 (Abstract); JP 6186504 (Abstract); EP 0555099; GB 2315700

Other Publications:

Phillion, D. W., "General methods for generating phase-shifting interferometry algorithms"—Applied Optics, Vol. 36, 8098 (1997);

Pluta, M., "Stray-light problem in phase contrast microscopy or toward highly sensitive phase contrast devices: a review"—Optical Engineering, Vol. 32, 3199 (1993);

Noda, T. and Kawata, S., "Separation of phase and absorption images in phase-contrast microscopy"—Journal of the Optical Society of America A, Vol. 9, 924 (1992);

Creath, K., "Phase measurement interferometry techniques"—Progress in Optics XXVI, 348 (1988);

Greivenkamp, J. E., "Generalized data reduction for heterodyne interferometry"—Optical Engineering, Vol. 23, 350 (1984);

Morgan, C. J., "Least-squares estimation in phase-measurement interferometry"—Optics Letters, Vol. 7, 368 (1982);

Golden, L. J., "Zernike test. 1: Analytical aspects"—Applied Optics, Vol. 16, 205 (1977);

Bruning, J. H., et al. "Digital wavefront measuring interferometer for testing optical surfaces and lenses"—Applied Optics, Vol. 13, 2693 (1974); and Gerchberg, R. W. and Saxton, W. O., Optik 35, 237: (1972).

SUMMARY OF THE INVENTION

The current invention provides elaborated, improved and enhanced methodologies and systems for wavefront analysis and 3D measurements. These include innovative methods, improved algorithms and hardware, additional implementations, various additional applications and combinations with other methods and inventions.

There is thus provided in accordance with a preferred embodiment of the present invention a method of wavefront analysis including utilizing a light source to illuminate an object and to obtain a wavefront having an amplitude and a phase, obtaining a plurality of differently phase changed transformed wavefronts corresponding to the wavefront being analyzed, including applying a transform to the wavefront being analyzed thereby to obtain a transformed wavefront and applying a plurality of different phase changes to the transformed wavefront, thereby to obtain a plurality of differently phase changed transformed wavefronts, obtaining a plurality of intensity maps of the plurality of phase changed transformed wavefronts by phase manipulation and employing the plurality of intensity maps to obtain an output indicating the amplitude and phase of the wavefront being analyzed, wherein the plurality of different phase changes are applied to a region of the transformed wavefront, corresponding to a shape of the light source.

Preferably, the light source includes an elongate light source.

There is also provided in accordance with another preferred embodiment of the present invention a method of wavefront analysis including utilizing a light source to illuminate an object and to obtain a wavefront having an amplitude and a phase, obtaining a plurality of differently phase changed transformed wavefronts corresponding to the wavefront being analyzed, including applying a transform to the wavefront being analyzed thereby to obtain a transformed wavefront and applying a plurality of different phase changes to the transformed wavefront, thereby to obtain a plurality of differently phase changed transformed wavefronts, obtaining a plurality of intensity maps of the plurality of phase changed transformed wavefronts by phase manipulation and employing the plurality of intensity maps to obtain an output indicating the amplitude and phase of the wavefront being analyzed, wherein the plurality of different phase changes are applied to regions of the transformed wavefront, corresponding to a grating.

There is further provided in accordance with yet another preferred embodiment of the present invention a method of wavefront analysis including obtaining a plurality of differently phase changed transformed wavefronts corresponding to a wavefront being analyzed which has an amplitude and a phase, obtaining a plurality of intensity maps of the plurality of phase changed transformed wavefronts and employing the plurality of intensity maps to obtain an output indicating the amplitude and phase of the wavefront being analyzed, and wherein obtaining a plurality of differently phase changed transformed wavefronts includes applying a transform to the wavefront being analyzed thereby to obtain a transformed wavefront and applying a plurality of different phase changes to the transformed wavefront, thereby to obtain a plurality of differently phase changed transformed wavefronts, and wherein the transformed wavefront includes a plurality of different polarization components and the plurality of different phase changes are effected by using a birefringent phase changer to apply different phase changes to the plurality of different polarization components of the transformed wavefront.

There is also provided in accordance with still another preferred embodiment of the present invention a method of wavefront analysis including obtaining two differently phase changed transformed wavefronts corresponding to a wavefront being analyzed which has an amplitude and a phase, obtaining two intensity maps of the two phase changed transformed wavefronts, employing interference between the two intensity maps to generate a third intensity map and employing the two intensity maps and the third intensity map to obtain an output indicating the amplitude and phase of the wavefront being analyzed.

There is further provided in accordance with another preferred embodiment of the present invention a method of wavefront analysis including obtaining a plurality of differently phase changed transformed wavefronts corresponding to a wavefront being analyzed which has an amplitude and a phase, obtaining a plurality of intensity maps of the plurality of phase changed transformed wavefronts and employing the plurality of intensity maps to obtain an output indicating the amplitude and phase of the wavefront being analyzed, and wherein obtaining a plurality of differently phase changed transformed wavefronts includes applying a transform to the wavefront being analyzed thereby to obtain a transformed wavefront and applying a plurality of different phase changes to the transformed wavefront, thereby to obtain a plurality of differently phase changed transformed wavefronts, and wherein the plurality of different phase changes includes spatial phase changes, the plurality of different spatial phase changes are effected by applying a spatially uniform, time-varying spatial phase change to part of the transformed wavefront, the transform applied to the wavefront being analyzed is a Fourier transform, the plurality of different spatial phase changes includes at least three different phase changes, the plurality of intensity maps includes at least three intensity maps and the employing step includes expressing the wavefront being analyzed as a first complex function which has an amplitude and phase identical to the amplitude and phase of the wavefront being analyzed, expressing the plurality of intensity maps as a function of the first complex function and of a spatial function governing the spatially uniform, time-varying spatial phase change, defining a second complex function, having an absolute value and a phase, as a convolution of the first complex function and of a Fourier transform of the spatial function governing the spatially uniform, time-varying spatial phase change, expressing each of the plurality of intensity maps as a third function of the amplitude of the wavefront being analyzed, a square of the absolute value of the second complex function, a difference between the phase of the wavefront being analyzed and the phase of the second complex function and a known phase delay produced by one of the at least three different phase changes which each correspond to one of the at least three intensity maps, solving the third function to obtain the amplitude of the wavefront being analyzed, the absolute value of the second complex function and the difference between the phase of the wavefront being analyzed and the phase of the second complex function, solving the second complex function to obtain the phase of the second complex function and obtaining the phase of the wavefront being analyzed by adding tile phase of the second complex function to the difference between the phase of the wavefront being analyzed and the phase of the second complex function, the square of the absolute value of the second complex function is obtained by approximating a square of the absolute value to a polynomial of a given degree and the employing step includes computing a confidence level map characterizing confidence in each of a plurality of portions of the phase of the wavefront being analyzed, by comparing the square of the absolute value of the second complex function to the polynomial of a given degree, the confidence level map including a plurality of confidence levels respectively corresponding to a plurality of portions within the intensity maps.

Preferably, the applying a plurality of different phase changes is performed at least twice using at least two pluralities of different phase changes and the step of employing is performed at least twice using the at least two pluralities of different phase changes, thereby to obtain at least two values for the phase of the wavefront being analyzed, and the method also includes using the at least two confidence level maps resulting from performing the confidence level map computation step at least twice, to combine the at least two values for the phase of the wavefront being analyzed into a single value.

Preferably, the step of combining includes selecting a "best" value from among the at least two values for the phase of the wavefront being analyzed. Additionally, the step of combining includes computing a weighted average of the at least two values for the phase of the wavefront being analyzed, using the confidence levels included in the at least two confidence level maps as weights for the at least two values respectively.

Alternatively, the method also includes computing the confidence in each of a plurality of portions of the phase, using, for at least one portion, a phase value which is different from that measured for the at least one portion and, if the confidence computed for an individual portion using the different phase value exceeds the confidence computed using the measured phase value, replacing the measured phase value for the individual portion with the different phase value.

Preferably, the wavefront being analyzed includes a plurality of wavefront components having different wavelengths, and the plurality of differently phase changed transformed wavefronts are obtained by applying a phase change to the plurality of different wavelength components of the wavefront being analyzed, and the wavefront being analyzed includes a plurality of different wavelength components and the plurality of differently phase changed transformed wavefronts are obtained by applying a phase change to the plurality of different wavelength components of the wavefront being analyzed. Alternatively, the step of applying a plurality of different phase changes is performed for each of the plurality of wavefront components, and the step of employing is performed for each of the plurality of wavefront components, thereby to obtain a corresponding plurality of values for the phase of the wavefront being analyzed, and the method also includes using the at least-confidence level maps resulting from performing the confidence level map computation step a plurality of times, to combine the plurality of values for the phase of the wavefront being analyzed into a single value.

There is also provided in accordance with yet another preferred embodiment of the present invention a method of wavefront analysis including obtaining, a plurality of differently phase changed transformed wavefronts corresponding to a wavefront being analyzed which has an amplitude and a phase, obtaining a plurality of intensity maps of the plurality of phase changed transformed wavefronts and employing the plurality of intensity maps to obtain an output indicating the amplitude and phase of the wavefront being analyzed, wherein the step of employing also includes normalizing each of the plurality of intensity maps to obtain a plurality of intensity maps having the same sum of intensity values.

Preferably, the plurality of differently phase changed transformed wavefronts are obtained so as to maximize contrast between the plurality of intensity maps and to minimize effects of noise on the phase of the wavefront being analyzed.

There is further provided in accordance with still another preferred embodiment of the present invention a method of phase change analysis including obtaining a phase change analysis wavefront which has an amplitude and a phase, applying a transform to the phase change analysis wavefront thereby to obtain a transformed wavefront, applying at least one phase change to the transformed wavefront, thereby to obtain at least one phase changed transformed wavefront, obtaining at least one intensity map of the at least one phase changed transformed wavefront and employing the at least one intensity map to obtain an output indication of the at least one phase change applied to the transformed phase change analysis wavefront.

In accordance with another preferred embodiment, the applying at least one phase change to the transformed wavefront includes applying a phase delay value to an area within the transformed wavefront and the step of employing the at least one intensity map includes obtaining an output indication delimiting the area.

Preferably, the obtaining a phase change analysis wavefront includes reflecting light off a known object and using the light reflected off the known object as the phase change analysis wavefront. Alternatively, the obtaining a phase change analysis wavefront includes transmitting light through a known object and using the transmitted light exiting the known object as the phase change analysis wavefront.

Alternatively, the employing the at least one intensity map includes deriving at least one contrast map from the at least one intensity map and employing the at least one contrast map to obtain an output indication of the at least one phase change applied to the transformed phase change analysis wavefront.

There is also provided in accordance with another preferred embodiment of the present invention a method of wavefront analysis including obtaining a plurality of differently phase changed transformed wavefronts corresponding to a wavefront being analyzed which has an amplitude and a phase, obtaining a plurality of intensity naps of the plurality of phase changed transformed wavefronts and employing the plurality of intensity maps to obtain an output indicating the amplitude and phase of the wavefront being analyzed, the method also including performing the obtaining steps and the employing step wherein the wavefront being analyzed includes a wavefront originating from a known object having known amplitude and phase values, computing amplitude and phase calibration values by comparing the output of the employing step performed on the known object to the known amplitude and phase values and when performing the obtaining and employing steps on an unknown object, using the amplitude and phase calibration values to correct the output for the unknown object generated in the employing step.

Preferably, the wavefront originating from the known object includes a wavefront reflected from the known object. Alternatively, the wavefront originating from the known object includes a wavefront transmitted through the known object.

In accordance with a preferred embodiment, the known object includes a flat mirror. Alternatively, the known object includes a window.

There is further provided in accordance with yet another preferred embodiment of the present invention a method of wavefront analysis including obtaining a plurality of differently phase changed transformed wavefronts corresponding to a wavefront being analyzed which has an amplitude and a phase, obtaining a plurality of intensity maps of the plurality of phase changed transformed wavefronts and employing the plurality of intensity maps to obtain an output indicating the amplitude and phase of the wavefront being analyzed, and also including using an iris to block off a portion of a wavefront, thereby to generate the wavefront being analyzed, and wherein the plurality of intensity maps are obtained using a camera having an imaging area which is larger than the image of the iris on the imaging area.

There is also provided in accordance with still another preferred embodiment of the present invention a method of wavefront analysis including obtaining a plurality of differently phase changed transformed wavefronts corresponding to a wavefront being analyzed which has an amplitude and a phase, obtaining a plurality of intensity maps of the plurality of phase changed transformed wavefronts and employing the plurality of intensity maps to obtain an output indicating the amplitude and phase of the wavefront being analyzed, wherein obtaining a plurality of differently phase changed transformed wavefronts includes applying a transform to the wavefront being analyzed thereby to obtain a transformed wavefront and applying a plurality of different phase changes to the transformed wavefront, thereby to obtain a plurality of differently phase changed transformed wavefronts, the plurality of different phase changes includes spatial phase changes, and the plurality of different spatial phase changes are effected by applying a spatially uniform, time-varying spatial phase change to part of the transformed wavefront and the transform applied to the wavefront being analyzed is a Fourier transform, the step of employing includes expressing the wavefront being analyzed as a first complex function which has an amplitude and phase identical to the amplitude and phase of the wavefront being analyzed, expressing the plurality of intensity maps as a function of the first complex function and of a spatial function governing the spatially uniform, time-varying spatial phase change, defining a second complex function, having an absolute value and a phase, as a convolution of the first complex function and of a Fourier transform of the spatial function governing the spatially uniform, time-varying spatial phase change, expressing each of the plurality of intensity maps as a third function of the amplitude of the wavefront being analyzed, the absolute value of the second complex function, a difference between the phase of the wavefront being analyzed and the phase of the second complex function and a known phase delay produced by one of the different phase changes which each correspond to one of the intensity maps, solving the third function to obtain the amplitude of the wavefront being analyzed, the absolute value of the second complex function and the difference between the phase of the wavefront being analyzed and the phase of the second complex function, solving the second complex function to obtain the phase of the second complex function and obtaining the phase of the wavefront being analyzed by adding the phase of the second complex function to the difference between the phase of the wavefront being analyzed and the phase of the second complex function, wherein the step of obtaining an output includes employing the plurality of intensity maps and the square of the absolute value of the second complex function to obtain the output.

There is further provided in accordance with another preferred embodiment of the present invention a method for analyzing a wavefront having an amplitude and a phase, the method including, using an iris to block off a portion of a wavefront, thereby to generate a wavefront being analyzed, Fourier-transforming the wavefront being analyzed and effecting a spatial phase change on a portion of the transformed wavefront, thereby to generate at least one partially phase changed transformed wavefront, including a known phase changed wavefront portion and a phase unchanged wavefront portion, obtaining at least one intensity map of the at least one partially phase changed transformed wavefront, the map representing interference between the phase changed portion and the phase unchanged portion, wherein the map is obtained using a camera having an imaging area which is larger than the image of the iris on the imaging area, thereby to define inside and outside map portions representing intensity of light impinging on the imaging area portion inside and outside the iris image respectively and employing the at least one intensity map to obtain an output indicating the amplitude and phase of the wavefront being analyzed, including expressing the wavefront being analyzed as a first complex function which has an amplitude and phase identical to the amplitude and phase of the wavefront being analyzed, expressing the intensity map as a function of the first complex function and of a spatial function and defining a second complex function, having an absolute value and a phase, as a convolution of the first complex function and of a Fourier transform of the spatial function, wherein the absolute value of the second complex function is obtained by approximating the absolute value to a polynomial of a given degree, and the square of the absolute value of the second complex function is derived from the portion of the imaging area which is external to the image of the iris on the imaging area, assuming that the phase of the second complex function is constant over, the imaging area and computing the amplitude and phase of the wavefront being analyzed by assuming the inside map portion represents interference between the wavefront being analyzed and a wavefront having the absolute value of the second complex function as an amplitude and having a phase which is constant over the imaging area.

In accordance with another preferred embodiment of the present invention the obtaining a plurality of differently phase changed transformed wavefronts includes applying a transform to the wavefront being analyzed thereby to obtain a transformed wavefront and applying a plurality of different phase changes to the transformed wavefront, thereby to obtain a plurality of differently phase changed transformed wavefronts, the plurality of different phase changes includes spatial phase changes, the plurality of different spatial phase changes are effected by applying a spatially uniform, time-varying spatial phase change to part of the transformed wavefront, the transform applied to the wavefront being analyzed is a Fourier transform, the plurality of different spatial phase changes includes at least three different phase changes, the plurality of intensity maps includes at least three intensity maps and the employing includes expressing the wavefront being analyzed as a first complex function which has an amplitude and phase identical to the amplitude and phase of the wavefront being analyzed, expressing the plurality of intensity maps as a function of the first complex function and of a spatial function governing the spatially uniform, time-varying spatial phase change, defining a second complex function, having an absolute value and a phase, as a convolution of the first complex function and of a Fourier transform of the spatial function governing the spatially uniform, time-varying spatial phase change, expressing each of the plurality of intensity maps as a third function of the amplitude of the wavefront being analyzed, the absolute value of the second complex function, a difference between the phase of the wavefront being analyzed and the phase of the second complex function and a known phase delay produced by one of the at least three different phase changes which each correspond to one of the at least three intensity maps, solving the third function to obtain the amplitude of the wavefront being analyzed, the absolute value of the second complex function and the difference between the phase of the wavefront being analyzed and the phase of the second complex function, solving the second complex function to obtain the phase of the second complex function and obtaining the phase of the wavefront being analyzed by adding the phase of the second complex function to the difference between the phase of the wavefront being analyzed and the phase of the second complex function, and wherein the square of the absolute value of the second complex function is derived from the portion of the imaging area which is external to the image of the iris on the imaging area.

There is also provided in accordance with yet another preferred embodiment of the present invention a method of wavefront analysis including obtaining a plurality of differently phase changed transformed wavefronts corresponding to a wavefront being analyzed which has an amplitude and a phase, obtaining a plurality of intensity maps of the plurality of phase-changed transformed wavefronts and employing the plurality of intensity maps to obtain an output indicating the amplitude and phase of the wavefront being analyzed, wherein obtaining a plurality of differently phase changed transformed wavefronts includes applying a transform to the wavefront being analyzed thereby to obtain a transformed wavefront and applying a plurality of different phase changes to the transformed wavefront, thereby to obtain a plurality of differently phase changed transformed wavefronts, and wherein the plurality of different phase changes includes spatial phase changes, the plurality of different spatial phase changes are effected by applying a spatial phase change to part of the transformed wavefront, and the step of applying a plurality of different phase changes includes duplicating the transformed wavefront into several wavefronts and wherein the step of applying a plurality of different phase changes includes applying a different spatial phase change to each of the several wavefronts.

Preferably, the step of duplicating includes splitting the beam forming the transformed wavefront.

There is further provided in accordance with still another preferred embodiment of the present invention a method of providing simultaneous surface and layer thickness measurements of a multilayer object including illuminating the multilayer object with broadband illumination, analyzing illumination emerging from the multilayer object to provide a spectral analysis output and utilizing the spectral analysis output, simultaneously to provide surface and layer thickness information regarding the multilayer object.

In accordance with another preferred embodiment the analyzing information includes performing at least one of phase manipulation and amplitude manipulation on illumination reflected from the multilayer object to obtain a plurality of reflected illumination intensity maps at different wavelengths and employing the plurality of intensity maps to obtain an output representing the surface and layer thickness of at least one layer of the multilayer object.

Preferably, the method also includes obtaining a reflected wavefront having an amplitude and a phase, by reflecting radiation from a surface; and analyzing the reflected wavefront by obtaining a plurality of differently phase changed transformed wavefronts corresponding to the reflected wavefront, obtaining a plurality of intensity maps of the plurality of phase changed transformed wavefronts and employing the plurality: of intensity maps to obtain an output indicating the amplitude and phase of the reflected wavefront.

Additionally, the radiation reflected from the surface has at least two narrow bands, each centered about a different wavelength, providing at least two wavelength components in the surface mapping wavefront and at least two indications of the phase of the surface mapping wavefront, thereby enabling an enhanced mapping of the surface to be obtained by avoiding an ambiguity in the mapping which exceeds the larger of the different wavelengths about which the two narrow bands are centered.

In accordance with yet another preferred embodiment, the wavefront being analyzed includes a plurality of different wavelength components and the plurality of differently phase changed transformed wavefronts are obtained by applying a phase change to the plurality of different wavelength components of the wavefront being analyzed. Preferably, the plurality of intensity maps includes at least four intensity maps and employing the plurality of intensity maps to obtain an output indicating the amplitude and phase of the wavefront being analyzed includes employing a plurality of combinations, each of at least three of the plurality of intensity maps, to provide a plurality of indications of the amplitude and phase of the wavefront being analyzed. Alternatively, the wavefront being analyzed includes at least two wavelength components, the obtaining a plurality of intensity maps also includes dividing the phase changed transformed wavefronts according to the at least two wavelength components in order to obtain at least two wavelength components of the phase changed transformed wavefronts and in order to obtain at least two sets of intensity maps, each set corresponding to a different one of the at least two wavelength components of the phase changed transformed wavefronts and employing the plurality of intensity maps to obtain an output indicating the amplitude and phase of the wavefront being analyzed includes obtaining an output indicative of the phase of the wavefront being analyzed from each of the at least two sets of intensity maps and combining the outputs to provide an enhanced indication of phase of the wavefront being analyzed, in which enhanced indication, there is no ambiguity.

Preferably, the broadband illumination includes multiwavelength illumination including illumination having a number of known wavelengths at least corresponding to the number of layers in the multilayer object. Additionally, the analyzing includes generating an emerging illumination intensity map for each of a number of known wavelengths at least corresponding in number to the number of layers in the multilayer object. Preferably, the emerging illumination includes at least one of reflected illumination and transmitted illumination.

There is also provided in accordance with another preferred embodiment of the present invention a method of analyzing a wavefront, including a plurality of different wavelength components, after the wavefront exits an object, the method including obtaining a plurality of differently phase changed transformed wavefronts corresponding to a wavefront being analyzed which has an amplitude and a phase, including applying a transform to each of the plurality of different wavelength components, thereby to generate a plurality of transformed wavefront components and applying a plurality of scalable phase changes to the plurality of transformed wavefront components respectively, obtaining a plurality of intensity maps of the plurality of phase changed transformed wavefronts and employing the plurality of intensity maps to obtain an output indicating the amplitude and phase of the wavefront being analyzed.

Preferably, the plurality of scalable phase changes are each in a different plane. Additionally, the plurality of different wavelength components are generated by light sources disposed at various distances from the object.

There is further provided in accordance with yet another preferred embodiment of the present invention a method of wavefront analysis including obtaining a plurality of differently phase changed transformed wavefronts corresponding to a wavefront being analyzed which has an amplitude and a phase, obtaining a plurality of intensity maps of the plurality of phase changed transformed wavefronts and employing the plurality of intensity maps to obtain an output indicating the amplitude and phase of the wavefront being analyzed, wherein obtaining a plurality of differently phase changed transformed wavefronts includes applying a transform to the wavefront being analyzed thereby to obtain a transformed wavefront and applying a plurality of different phase changes to the transformed wavefront, thereby to obtain a plurality of differently phase changed transformed wavefronts, and the applying a plurality of different phase changes includes providing an optical system having a selectable plurality of optical configurations creating a corresponding plurality of phase changes respectively.

There is also provided in accordance with still another preferred embodiment of the present invention a method for effecting phase change of a wavefront including applying a plurality of different phase changes to the wavefront, thereby to obtain a plurality of differently phase changed wavefronts, wherein the step of applying a plurality of different phase changes includes providing an optical system having a selectable plurality of optical configurations creating a corresponding plurality of phase changes respectively.

In accordance with yet another preferred embodiment of the present invention the optical system includes a spatial light modulator (SLM) including a central inactive area and a peripheral active area. Alternatively, the optical system includes a phase plate having a plurality of portions each corresponding to an individual phase change and a phase plate portion selector operative to position a selected one of the phase plate portions along a light path.

Additionally or alternatively, the optical system includes two mirrors at an adjustable distance from one another whose relative configuration is such that a first portion of the light impinging at the two mirror configuration arrives at the first mirror and a second portion of the light impinging at the two mirror configuration arrives at the second mirror. Preferably, the two mirrors include a first mirror preceding a second mirror along the light path and having an aperture defined therewith, thereby allowing the second portion of the light to reach the second mirror via the aperture. Alternatively, the two mirrors include a first mirror preceding a second mirror along the light path wherein at least one dimension of the first mirrors surface area is less than at least one corresponding dimension of the cross-section of the wavefront and less than the corresponding dimension of the second mirror's surface area, thereby allowing the second portion of the light to reach the second mirror. Preferably, the optical system also includes at least one piezo-electric actuator operative to allow a user to control the distance between the two mirrors.

There is further provided in accordance with another preferred embodiment of the present invention an apparatus for wavefront analysis including a light source, to illuminate an object and to obtain a wavefront having an amplitude and a phase, a wavefront transformer, obtaining a plurality of differently phase changed transformed wavefronts corresponding to a wavefront being analyzed having a phase and an amplitude, including a transformed wavefront generator, applying a transform to the wavefront being analyzed thereby to obtain a transformed wavefront and a phase changer, applying a plurality of different phase changes to the transformed wavefront, thereby to obtain a plurality of differently phase changed transformed wavefronts, an intensity map provider, obtaining a plurality of intensity maps of the plurality of phase changed transformed wavefronts by phase manipulation and an intensity map utilizer, employing the plurality of intensity maps to obtain an output indicating the amplitude and phase of the wavefront being analyzed, wherein the plurality of different phase changes are applied to a region of the transformed wavefront, corresponding to a shape of the light source.

There is also provided in accordance with yet another preferred embodiment of the present invention an apparatus for wavefront analysis including a light source used to illuminate an object and to obtain a wavefront having an amplitude and a phase, a wavefront transformer, obtaining a plurality of differently phase changed transformed wavefronts corresponding to the wavefront being analyzed, including a transformed wavefront generator, applying a transform to the wavefront being analyzed thereby to obtain a transformed wavefront and a phase changer, applying a plurality of different phase changes to the transformed wavefront, thereby to obtain a plurality of differently phase changed transformed wavefronts, an intensity map provider, obtaining a plurality of intensity maps of the plurality of phase changed transformed wavefronts by phase manipulation and an intensity map utilizer, employing the plurality of intensity maps to obtain an output indicating the amplitude and phase of the wavefront being analyzed, wherein the plurality of different phase changes are applied to regions of the transformed wavefront, corresponding to a grating.

There is also provided in accordance with still another preferred embodiment of the present invention an apparatus for wavefront analysis including a wavefront transformer, obtaining a plurality of differently phase changed transformed wavefronts corresponding to a wavefront being analyzed which has an amplitude and a phase, an intensity map provider, obtaining a plurality of intensity maps of the plurality of phase changed transformed wavefronts and an intensity map utilizer, employing the plurality of intensity maps to obtain an output indicating the amplitude and phase of the wavefront being analyzed, wherein obtaining a plurality of differently phase changed transformed wavefronts includes applying a transform to the wavefront being analyzed thereby to obtain a transformed wavefront and applying a plurality of different phase changes to the transformed wavefront, thereby to obtain a plurality of differently phase changed transformed wavefronts, and wherein the transformed wavefront includes a plurality of different polarization components and the plurality of different phase changes are effected by using a birefringent phase changer to apply different phase changes to the plurality of different polarization components of the transformed wavefront.

There is further provided in accordance with a further preferred embodiment of the present invention an apparatus for wavefront analysis including a wavefront transformer, obtaining two differently phase changed transformed wavefronts corresponding to a wavefront being analyzed which has an amplitude and a phase, an intensity map provider, obtaining two intensity maps of the two phase changed transformed wavefronts, and an intensity map utilizer, employing the two intensity maps to obtain an output indicating the amplitude and phase of the wavefront being analyzed, and wherein the intensity map provider is also operative for employing interference between the two intensity maps to generate a third intensity map and the obtaining two differently phase changed transformed wavefronts includes applying a transform to the wavefront being analyzed thereby to obtain a transformed wavefront and applying a plurality of different phase changes to the transformed wavefront, thereby to obtain a plurality of differently phase changed transformed wavefronts.

There is yet further provided in accordance with another preferred embodiment of the present invention an apparatus for providing simultaneous surface and layer thickness measurements of a multilayer object including an illuminator, illuminating the multilayer object with broadband illumination, an illumination analyzer, analyzing illumination reflected from the multilayer object to provide a spectral analysis output and a spectral analysis utilizer, utilizing the spectral analysis output, simultaneously to provide surface and layer thickness information regarding the multilayer object.

There is still further provided in accordance with another preferred embodiment of the present invention a method of object analysis including obtaining a first wavefront which has an amplitude and a phase from a first sub-surface on the surface of an object, obtaining a second wavefront which has an amplitude and a phase from a second sub-surface on the surface of the object adjacent to the first sub-surface, applying a plurality of different phase changes to the second wavefront, thereby to obtain a plurality of differently phase changed wavefronts corresponding to the second wavefront, obtaining a plurality of intensity maps of the interference of the first wavefront and the plurality of phase changed wavefronts and employing the plurality of intensity maps to obtain an output indicating the object surface.

There is even further provided in accordance with yet another preferred embodiment of the present invention a method for analyzing a wavefront including using an iris to block off a portion of a wavefront, thereby to generate a wavefront being analyzed having an amplitude and a phase, applying a transform to the wavefront, thereby obtaining a transformed wavefront, effecting a phase change on the transformed wavefront, thereby generating one phase changed transformed wavefront, obtaining one intensity map of the one phase changed transformed wavefront, generating a first region and a second region of the intensity map, where the first region is located inside an image of the iris and the second region is located outside the image of the iris, utilizing the second region to obtain a reference wavefront and utilizing the reference wavefront and the first region to obtain an output indicating the amplitude and phase of the wavefront being analyzed.

There is also provided in accordance with still another preferred embodiment of the present invention a method for wavefront analysis including forming a real image of an object at an image plane, analyzing an image wavefront corresponding to the real image at the image plane and utilizing results of the analyzing to reconstruct an object wavefront, corresponding to the object.

Preferably, the analyzing takes place following forming the real image.

In accordance with another preferred embodiment of the present invention the analyzing an image wavefront includes obtaining a plurality of differently phase changed transformed image wavefronts corresponding to an image wavefront being analyzed which has an amplitude and a phase, obtaining a plurality of intensity maps of the plurality of phase changed transformed image wavefronts and employing the plurality of intensity maps to obtain an output indicating the amplitude and phase of the image wavefront being analyzed.

Preferably, the analyzing an image wavefront includes interfering the wavefront with a wavefront reflected from a reference surface. Additionally, the analyzing an image wavefront includes spatially splitting the wavefront into two parts and interfering one part with the other in a common-path manner.

There is further provided in accordance with another preferred embodiment of the present invention a wavefront analysis system including an imager, forming a real image of an object at an image plane, a wavefront analyzer, analyzing an image wavefront corresponding to the real image at the image plane and an object wavefront reconstructor, utilizing an output of the image wavefront analyzer to reconstruct an object wavefront, corresponding to the object.

In accordance with another preferred embodiment, the wavefront analyzer includes a wavefront transformer, operative to provide a plurality of differently phase changed transformed wavefronts corresponding to the image wavefront which has an amplitude and a phase, an intensity map generator, operative to provide a plurality of intensity maps of the plurality of phase changed transformed wavefronts and an intensity map utilizer, employing the plurality of intensity maps to provide an output indicating the amplitude and phase of the image wavefront.

There is yet further provided in accordance with still another preferred embodiment of the present invention an apparatus for wavefront analysis including an imaging system, generating a wavefront to be analyzed which has an amplitude and a phase, a wavefront transformer, operative to provide a plurality of differently phase changed transformed wavefronts corresponding to the wavefront being analyzed, an intensity map generator, operative to provide a plurality of intensity maps of the plurality of phase changed transformed wavefronts and an intensity map utilizer, employing the plurality of intensity maps to provide an output indicating the amplitude and phase of the wavefront being analyzed.

In accordance with still another preferred embodiment of the present invention, the system also includes a wavefront interference generator, generating an interference of the wavefront with a wavefront reflected from a reference surface. Additionally or alternatively, the system also includes a wavefront splitter, spatially splitting the image wavefront into first and second parts and a wavefront interference generator, generating an common-path interference of the first part with the second part.

In accordance with yet another preferred embodiment, the imager is an optical microscope. Alternatively, the imager is a revolving turret with at least one commercial objective. Preferably, the image plane is any plane.

Additionally, the wavefront transformer includes an optical manipulator and an imaging optics and the intensity map generator includes a CCD camera.

There is also provided in accordance with still another preferred embodiment of the present invention a method of optical property analysis of an object by analyzing a wavefront exiting the object, the method including providing an imaging system having a defined depth of focus, repeating the following steps focusing on each of several depths within the object: obtaining a plurality of differently phase changed transformed wavefronts corresponding to a wavefront being analyzed which has an amplitude and a phase and which is exiting an object, obtaining a plurality of intensity maps of the plurality of phase changed transformed wavefronts and employing the plurality of intensity maps to obtain an output indicating the amplitude and phase of the wavefront being analyzed and combining the several outputs generated by repeating the obtaining and employing steps in order to obtain a slice-by-slice optical transmission profile of the object.

Preferably, the optical transmission profile includes an optical path length for each of the several depths within the object.

There is also provided in accordance with still another preferred embodiment of the present invention a method of wavefront analysis operative to analyze a wavefront exiting from an object, the method including focusing an imaging system on the object without changing the distance from the object to the imaging system and obtaining a plurality of differently phase changed transformed wavefronts corresponding to a wavefront being analyzed which has an amplitude and a phase, obtaining a plurality of intensity maps of the plurality of phase changed transformed wavefronts and employing the plurality of intensity maps to obtain an output indicating the amplitude and phase of the wavefront being analyzed.

There is also provided in accordance with still another preferred embodiment of the present invention a method of wavefront analysis including obtaining a plurality of differently phase changed transformed wavefronts corresponding to a wavefront being analyzed, obtaining a plurality of intensity maps of the plurality of phase changed transformed wavefronts and employing the plurality of intensity maps to obtain a modulo $2\pi$ output indicating the amplitude and phase of the wavefront being analyzed, wherein the step of employing includes computing at least one characteristic of the object's surface geometry by analyzing a Moiré pattern generated by projecting stripes on the object and viewing the object through a grating; and resolving the $2\pi$ ambiguity of the modulo $2\pi$ output using at least one characteristic of the object's surface geometry.

Preferably, the stripes are generally linear. Additionally, the step of projecting stripes includes illuminating the object via a grating. Alternatively or additionally, the step of projecting stripes includes using a plurality of coherent illumination sources to illuminate the object, thereby to generate an interference pattern on the object.

In accordance with another preferred embodiment of the present invention the object wavefront is a surface mapping wavefront obtained by reflecting radiation from a surface of the object, the surface mapping wavefront having an amplitude and a phase, the image wavefront is an image surface mapping wavefront and the output indicating the amplitude and phase of the image wavefront being analyzed is employed to obtain an output indicating the surface of the object.

Alternatively, the object wavefront is an object inspection wavefront obtained by transmitting radiation through the object, the object inspection wavefront having an amplitude and a phase, the image wavefront is an image object inspection wavefront and the output indicating the amplitude and phase of the image wavefront being analyzed is employed to obtain an output indicating optical and thickness properties of the object.

Alternatively, the object wavefront is a spectral analysis wavefront obtained by causing radiation to impinge on an object, the spectral analysis wavefront having an amplitude and a phase, the image wavefront is an image spectral analysis wavefront and the output indicating the amplitude and phase of the image wavefront being analyzed is employed to obtain an output indicating spectral content of the radiation.

There is further provided in accordance with another preferred embodiment of the present invention a method for wavefront analysis utilizing a propagated wavefront, the method including utilizing a propagated wavefront, which corresponds to a wavefront being analyzed, having an amplitude and a phase, for obtaining an amplitude and a phase of the propagated wavefront, utilizing the amplitude and phase of the propagated wavefront to obtain an output indicating the amplitude and phase of the wavefront being analyzed.

There is also provided in accordance with still another preferred embodiment of the present invention a method for wavefront analysis utilizing a propagated wavefront, the method including utilizing a propagated wavefront, which corresponds to a wavefront being analyzed, having an amplitude and a phase, for obtaining a plurality of differently phase changed transformed propagated wavefronts, obtaining, a plurality of intensity maps of the plurality of phase changed transformed propagated wavefronts and employing the plurality of intensity maps to obtain an output indicating the amplitude and phase of the wavefront being analyzed.

Preferably, the employing includes employing the plurality of intensity maps to obtain an output corresponding to the propagated wavefront and employing the output corresponding to the propagated wavefront to obtain an output indicating the amplitude and phase of the wavefront being analyzed.

Alternatively or additionally, the method also includes utilizing the output indicating the amplitude and phase of the wavefront being analyzed in order to obtain a second output indicating amplitude and phase of a propagated wavefront obtained by propagating the wavefront being analyzed to any given plane. Additionally, the propagating the wavefront being analyzed to any given plane also includes propagating through optical elements.

There is still further provided in accordance with yet another preferred embodiment of the present invention a method for wavefront analysis including in a first mode of operation: obtaining a plurality of differently phase changed transformed wavefronts corresponding to an wavefront being analyzed which has an amplitude and a phase, obtaining a plurality of intensity maps of the plurality of phase changed transformed wavefronts and employing the plurality of intensity maps to obtain an output indicating the amplitude and phase of the wavefront being analyzed and in a second mode of operation: carrying out an interferometric measurement on the wavefront being analyzed employing a reference in order to provide an output indicating the location of a source of the wavefront being analyzed.

Preferably, the source of the wavefront being analyzed includes an object. Additionally, the reference includes a mirror.

There is yet further provided in accordance with another preferred embodiment of the present invention a method of wavefront analysis including obtaining a wavefront being analyzed which has an amplitude and a phase, obtaining a modified wavefront which has an amplitude and a phase in which estimated known differences of the wavefront being analyzed from a planar-like wavefront are removed by an optical element, obtaining a plurality of differently phase changed transformed modified wavefronts corresponding to the modified wavefront, obtaining a plurality of intensity maps of the plurality of phase changed transformed modified wavefronts, employing the plurality of intensity maps to obtain an output indicating the amplitude and phase of the modified wavefront and obtaining an output indicating the amplitude and phase of the wavefront being analyzed, by reintroducing the estimated known differences from the planar-like wavefront to the output indicating the amplitude and phase of the modified wavefront.

There is also provided in accordance with yet another preferred embodiment of the present invention a wavefront analysis system including a wavefront generator, operative to obtain a wavefront being analyzed which has an amplitude and a phase, an optical element, operative to modify the wavefront to obtain a modified wavefront which has an amplitude and a phase in which estimated known differences of the wavefront being analyzed from a planar-like wavefront are removed by the optical element, a phase changer, operative to provide a plurality of differently phase changed transformed modified wavefronts corresponding to the modified wavefront, an intensity map generator, operative to generate a plurality of intensity maps of the plurality of phase changed transformed modified wavefronts, an intensity map utilizer, employing the plurality of intensity maps to provide an output indicating the amplitude and phase of the modified wavefront and a wavefront reconstructor, operative to obtain an output indicating the amplitude and phase of the wavefront being analyzed by reintroducing the estimated known differences from the planar-like wavefront to the output indicating the amplitude and phase of the modified wavefront.

In accordance with another preferred embodiment the wavefront being analyzed is approximately a spherical wavefront and the optical element is a lens operative to remove the spherical components of the wavefront being analyzed. Alternatively, the wavefront being analyzed is a tilted wavefront with additional features and the optical element is a prism operative to remove the tilt component of the wavefront being analyzed.

There is further provided in accordance with still another preferred embodiment of the present invention a method of wavefront analysis including obtaining a plurality of differently phase changed transformed wavefronts corresponding to a wavefront being analyzed which has a polarization, obtaining a plurality of intensity maps of the plurality of phase changed transformed wavefronts and employing the plurality of intensity maps to obtain an output indicating the polarization of the wavefront being analyzed.

There is also provided in accordance with yet another preferred embodiment of the present invention a method of wavefront analysis including obtaining a plurality of differently polarization changed transformed wavefronts corresponding to a wavefront being analyzed which has a polarization, obtaining a plurality of intensity maps of the plurality of polarization changed transformed wavefronts and employing the plurality of intensity maps to obtain an output indicating the polarization of the wavefront being analyzed.

BRIEF DESCRIPTION OF THE DRAWINGS

The present invention will be understood and appreciated more fully from the following detailed description, taken in conjunction with the drawings in which:

FIG. 1 is a simplified partially schematic, partially pictorial illustration of wavefront analysis functionality used in embodiments of the present invention;

FIG. 16 is a simplified schematic illustration of an implementation of an improved common path Michelson interferometer, constructed and operative in accordance with still another preferred embodiment of the present invention;

FIG. 17 is a simplified illustration of light reflecting from a disk being scanned in accordance with yet another preferred embodiment of the present invention;

FIG. 18 is a simplified schematic illustration of a wavefront analysis method and system using a single intensity map, constructed and operative in accordance with another preferred embodiment of the present invention;

FIG. 19 is a simplified illustration of an illumination pattern obtained using an iris in the wavefront analysis system of FIG. 18;

FIG. 21 is a simplified partially schematic, partially pictorial illustration of an object inspection system, employing the functionality and structure of FIGS. 1 and 2;

FIG. 22 is a simplified partially schematic, partially pictorial illustration of a system for spectral analysis, employing the functionality and structure of FIGS. 1 and 2;

FIG. 23 is a simplified illustration of combining a wavefront analysis system and an optical imaging system, constructed and operative in accordance with yet another preferred embodiment of the present invention;

DETAILED DESCRIPTION OF PREFERRED EMBODIMENTS

Figure 2:
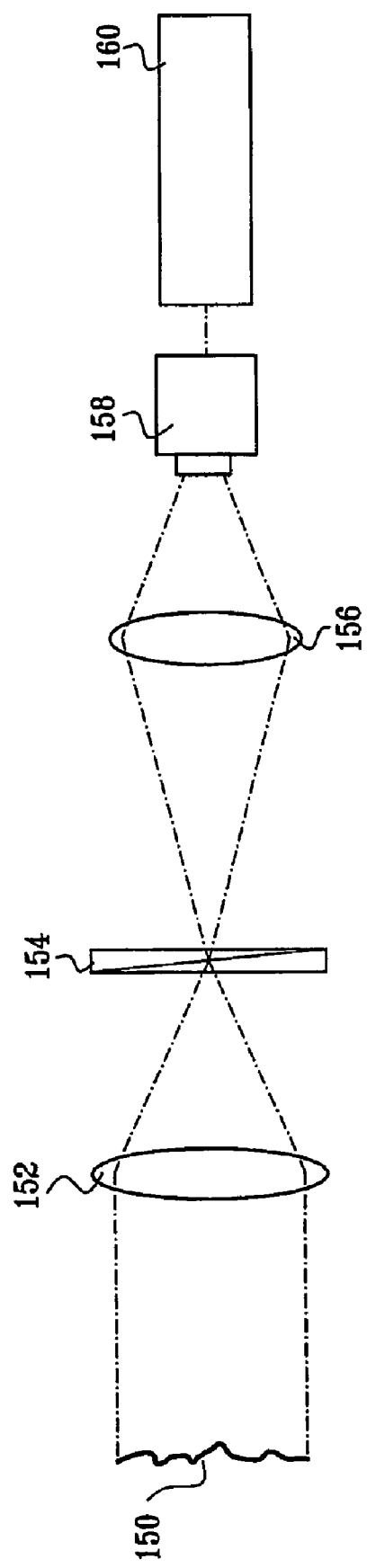
FIG. 2 is a simplified partially schematic, partially block diagram illustration of a wavefront analysis system suitable for carrying out the functionality of FIG. 1.

The methodologies and systems for wavefront analysis, as well as for surface mapping, phase change analysis, spectral analysis, object inspection, stored data retrieval, three-dimensional imaging and other suitable applications utilizing wavefront analysis, described hereinbelow, may, but need not necessarily, include techniques described in PCT Patent Application No. PCT/IL/01/00335, dated Apr. 11, 2001, of the present assignee, the disclosure of which is hereby incorporated by reference.

Reference is now made to FIG. 1, which is a simplified partially schematic, partially pictorial illustration of wavefront analysis functionality. The functionality of FIG. 1 can be summarized as including the following sub-functionalities: obtaining a plurality of differently phase changed transformed wavefronts corresponding to a wavefront being analyzed, which has an amplitude and a phase; obtaining a plurality of intensity maps of the plurality of phase changed transformed wavefronts; and employing the plurality of intensity maps to obtain an output indicating at least one and possibly both of the phase and the amplitude of the wavefront being analyzed.

As seen in FIG. 1, the first sub-functionality may be realized by the following functionalities: a wavefront, which may be represented by a plurality of point sources of light, is generally designated by reference numeral 100. Wavefront 100 has a phase characteristic which is typically spatially non-uniform, shown as a solid line and indicated generally by reference numeral 102. Wavefront 100 also has an amplitude characteristic which is also typically spatially non-uniform, shown as a dashed line and indicated generally by reference numeral 103. Such a wavefront may be obtained in a conventional manner by receiving light from any object, such as by reading an optical disk, for example a DVD or compact disk 104.

The principal purpose of the method is to measure the phase characteristic, such as that indicated by reference numeral 102, and the amplitude characteristic, such as that indicated by reference numeral 103, in an enhanced manner.

A transform, indicated here symbolically by reference numeral 106, is applied to the wavefront being analyzed 100, thereby to obtain a transformed wavefront, symbolically indicated by reference numeral 108. A plurality of different phase changes, preferably spatial phase changes, represented by optical path delays 110, 112 and 114 are applied to the transformed wavefront 108, thereby to obtain a plurality of differently phase changed transformed wavefronts, represented by reference numerals 120, 122 and 124 respectively. It is appreciated that the illustrated difference between the individual ones of the plurality of differently phase changed transformed wavefronts is that portions of the transformed wavefront are delayed differently relative to the remainder thereof.

The second sub-functionality may be realized by applying a transform, preferably a Fourier transform, to the plurality of differently phase changed transformed wavefronts. Finally, this sub-functionality requires detection of the intensity characteristics of the plurality of differently phase changed transformed wavefronts. The outputs of such detection are the intensity maps, examples of which are designated by reference numerals 130, 132 and 134.

The third sub-functionality may be realized by the following functionalities: expressing, such as by employing a computer 136, the plurality of intensity maps, such as maps 130, 132 and 134, as at least one mathematical function of phase and amplitude of the wavefront being analyzed and of the plurality of different phase changes, wherein at least one, and possibly both, of the phase and the amplitude are unknown and the plurality of different phase changes, typically represented by optical path delays 110, 112 and 114 to the transformed wavefront 108, are known; and employing, such as by means of the computer 136, the at least one mathematical function to obtain an indication of at least one, and possibly both, of the phase and the amplitude of the wavefront being analyzed, here represented by the phase function designated by reference numeral 138 and the amplitude function designated by reference numeral 139, which, as can be seen, respectively represent the phase characteristics 102 and the amplitude characteristics 103 of the wavefront 100. Wavefront 100 may represent the information contained or the height map of the measured object, such as compact disk or DVD 104 in this example.

Reference is now made to FIG. 2, which is a simplified partially schematic, partially block diagram illustration of a wavefront analysis system suitable for carrying out the functionality of FIG. 1.

As seen in FIG. 2, a wavefront, here designated by reference numeral 150, is focused, as by a lens 152, onto a phase manipulator 154, which is preferably located at the focal plane of lens 152. The phase manipulator 154 generates phase changes, and may be, for example, a spatial light modulator or a series of different transparent, spatially non-uniform objects. A second lens 156 is arranged so as to image wavefront 150 onto a detector 158, such as a CCD detector. Preferably the second lens 156 is arranged such that the detector 158 lies in its focal plane. The output of detector 158 is preferably supplied to data storage and processing circuitry 160, which preferably carries out the third sub-functionality described hereinabove with reference to FIG. 1.

Figure 3:
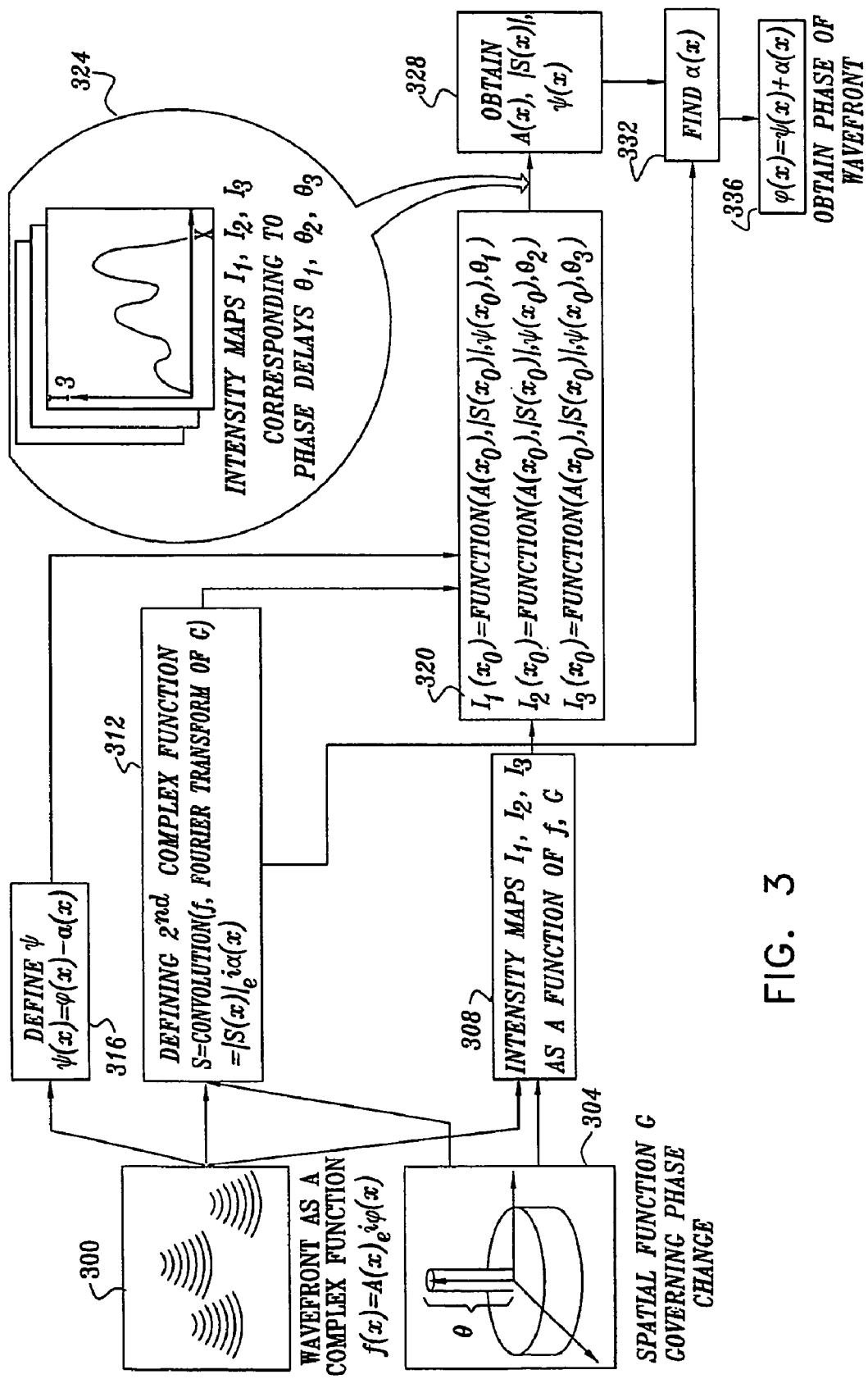
FIG. 3 is a simplified functional block diagram illustration of part of the functionality of FIG. 1.

Reference is now made to FIG. 3, which is a simplified functional block diagram illustration of part of the functionality of FIG. 1, wherein the transform applied to the wavefront being analyzed is a Fourier transform, wherein at least three different spatial phase changes are applied to the thus transformed wavefront, and wherein at least three intensity maps are employed to obtain indications of at least one of the phase and the amplitude of the wavefront. As seen in FIG. 3, and described in the third sub-functionality hereinabove with reference in FIG. 1, the intensity maps are employed to obtain an output indication of at least one and possibly both of the phase and the amplitude of the wavefront being analyzed. FIG. 3 illustrates the general principles of the algorithms and computation methods used to analyze the wavefront.

Turning to FIG. 3, it is seen that the wavefront being analyzed is expressed as a first complex function $f(x)=A(x)e^{i\phi(x)}$, indicated by reference numeral 300, where 'x' is a general indication of a spatial location. The complex function has an amplitude distribution $A(x)$ and a phase distribution $\phi(x)$ identical to the amplitude and phase of the wavefront being analyzed. Each of the plurality of different spatial phase changes is applied to the transformed wavefront, preferably by applying a spatially uniform spatial phase delay, having a known value, to a given spatial region of the transformed wavefront. As seen in FIG. 3, the spatial function governing these different phase changes is designated by 'G', an example of which, for a phase delay value of $\theta$, is designated by reference numeral 304. Function 'G' is a spatial function of the phase change applied in each spatial location of the transformed wavefront. In the specific example 304, the spatially uniform spatial phase delay, having a value of $\theta$, is applied to a spatially central region of the transformed wavefront, as indicated by the central part of the function having a value of $\theta$, which is greater than the value of the function elsewhere.

A plurality of expected intensity maps, indicated by spatial functions $I_1(x)$, $I_2(x)$ and $I_3(x)$, are each expressed as a function of the first complex function $f(x)$ and of the spatial function 'G', as indicated by reference numeral 309. Subsequently, a second complex function $S(x)$, which has an absolute value $|S(x)|$ and a phase $\alpha(x)$, is defined as a convolution of the first complex function $f(x)$ and of a Fourier transform of the spatial function 'G'. This second complex function, designated by reference numeral 312, is indicated by the equation $S(x)=f(x)*\Im(G)=|S(x)|e^{i\alpha(x)}$, where the symbol '*' indicates convolution and $\Im(G)$ is the Fourier transform of the function 'G'. The difference between $\phi(x)$, the phase of the wavefront, and $\alpha(x)$, the phase of the second complex function, is indicated by $\psi(x)$, as designated by reference numeral 316.

The expression of each of the expected intensity maps as a function of $f(x)$ and G, as indicated by reference numeral 308, the definition of the absolute value and the phase of $S(x)$, as indicated by reference numeral 312 and the definition of $\psi(x)$, as indicated by reference numeral 316, enables expression of each of the expected intensity maps as a third function of the amplitude of the wavefront $A(x)$, the absolute value of the second complex function $|S(x)|$, the difference between the phase of the wavefront and the phase of the second complex function $\psi(x)$, and the known phase delay produced by one of the at least three different phase changes which each correspond to one of the at least three intensity maps. This third function is designated by reference numeral 320 and includes three functions, each preferably having the general form $$I_n(x) = |A(x) + (e^{i\theta_n} - 1)|S(x)|e^{-i\psi(x)}|^2$$

where $I_n(x)$ are the expected intensity maps and n=1, 2 or 3. In the three functions, $\theta_1$, $\theta_2$ and $\theta_3$ are the known values of the uniform spatial phase delays, each applied to a spatial region of the transformed wavefront, thus effecting the plurality of different spatial phase changes which produce the intensity maps $I_1(x)$, $I_2(x)$ and $I_3(x)$, respectively. It is appreciated that preferably the third function at any given spatial location $x_0$ is a function of A, $\psi$ and $|S|$ only at the same spatial location $x_0$. The intensity maps are designated by reference numeral 324.

The third function is solved for each of the specific spatial locations $x_0$, by solving at least three equations, relating to at least three intensity values $I_1(x_0)$, $I_2(x_0)$ and $I_3(x_0)$ at at least three different phase delays $\theta_1$, $\theta_2$ and $\theta_3$, thereby to obtain at least part of three unknowns $A(x_0)$, $|S(x_0)|$ and $\psi(x_0)$. This process is typically repeated for all spatial locations and results in obtaining the amplitude of the wavefront $A(x)$, the absolute value of the second complex function |S(x)| and the difference between the phase of the wavefront and the phase of the second complex function ψ(x), as indicated by reference numeral 328. Thereafter, once A(x), |S(x)| and ψ(x) are known, the equation defining the second complex function, represented by reference numeral 312, is typically solved globally for a substantial number of spatial locations 'x' to obtain α(x), the phase of the second complex function, as designated by reference numeral 332. Finally, the phase φ(x) of the wavefront being analyzed is obtained by adding the phase α(x) of the second complex function to the difference ψ(x) between the phase of the wavefront and the phase of the second complex function, as indicated by reference numeral 336.

Figure 4:
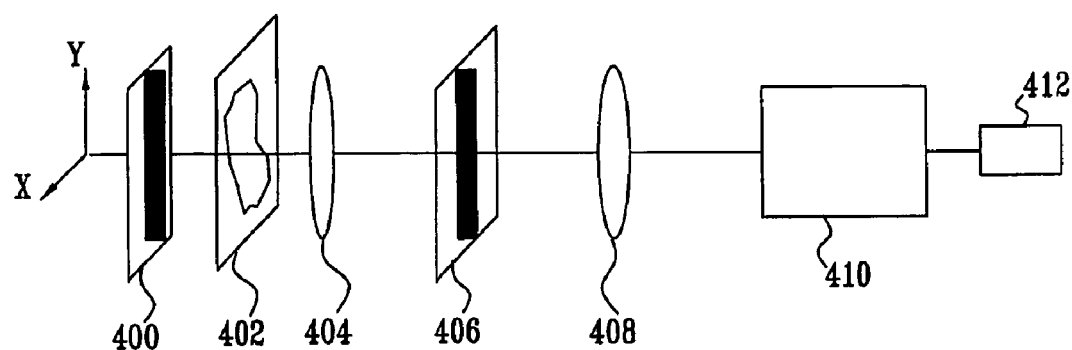
FIG. 4 illustrates another preferred embodiment of the present invention, introducing a line phase delay using a filter in a Fourier plane in conjunction with a line light source.

Reference is now made to FIG. 4, which illustrates another embodiment of the present invention, for reducing the spatial coherence, such as by utilizing a light source having a special form, such as a line light source. An imaging system working with spatially coherent light is very noisy due to fringes from many sources, such as interference patterns between different layers in the optical path and particles and scratched along the optical path. It is desirable to reduce the spatial coherence of light in order to eliminate the fringes and to increase the lateral resolution. However, to obtain the plurality of intensity maps out of the plurality of phase changed transformed wavefronts, spatially coherent light is preferred. Spatial coherence is preferred over the wavefront to which spatial phase change is applied. Preferably, the light source should have spatial coherence in one-dimension only. This can be accomplished, for instance, by using a line light source instead of a point light source. This line-light source can be used either to reflect light from an inspected object or to transmit light through a partially transparent inspected object. Additionally, the spatial function of the phase change applied in each spatial location of the transformed wavefront, designated 'G' hereinabove in reference to FIG. 3, is preferably a line-function, generating a spatially uniform spatial phase delay in a region having a 'line-like' (elongated) shape of relatively small width passing through the center region of the transformed wavefront. This line spatial function, in conjunction with the line light-source, reduces the computation algorithms to be very similar to the computation algorithms as described hereinabove.

The embodiment of FIG. 4 illustrates reducing the spatial coherence by introducing a line phase delay using a filter in a Fourier plane in conjunction with a line light source. As seen in FIG. 4, light is projected from a line light source 400 through an object 402. The resulting wavefront is focused, as by a lens 404, onto a line phase manipulator 406, preferably located at the focal plane of lens 402. A second lens 408 is arranged so as to image the wavefront onto a detector 410, such as a camera or CCD detector. Preferably the second lens 408 is arranged such that the detector 410 lies in its focal plane. The output of detector 410 is subsequently processed by a data storage and processing unit 412. In an alternative embodiment, not illustrated, the light may be reflected from the object 402.

In the configuration seen in FIG. 4 and described hereinabove, the spatial coherence in the Y dimension is eliminated. In the image plane, obtained on the surface of the camera 410, the convolution of the object 402 and the Fourier transform of the filter is obtained for only the X dimension and not for the Y dimension. Therefore, the calculations required for measurement of the inspected object 402, i.e. obtaining the phase and amplitude of the wavefront being analyzed, need to be performed only in one dimension and not in the two dimensions. Additionally, the measurement and analysis system is much less sensitive to tilts of the inspected object, either by reflection or transmission, in the Y axis. The inspected object 402 can subsequently be rotated to decrease the tilt sensitivity in the other dimension. It should be clear that a "line" is only one example of the shape of the light source, and any shape other than point source affects the coherence and can thus be used, provided that the phase change filter has a substantially similar form.

The calculations required for a measurement of an object or analysis of a wavefront using a one-dimensional filter in a Fourier plane are described below:

The complex electric field transmitted or reflected by the object, which is the wavefront to be analyzed is described by equation 4.1.

$$f(x,y)=A(x,y)\exp[i\phi(x,y)] \quad (4.1)$$

The field obtained in the Fourier plane is described by equation 4.2.

$$F(u,v)=\Im[f(x,y)] \quad (4.2)$$

The filter function of the one-dimensional phase filter, in the Y direction, is given by equation 4.3, where δu is the width of the filter in the X direction.

$$G(u,v) = 1 + [\exp(i\theta) - 1]rect\left(\frac{u}{\delta u}\right) \quad (4.3)$$

The resulting electric field in the Fourier plane after filtering is described by equation 4.4.

$$H(u,v)=F(u,v) \cdot G(u,v) \quad (4.4)$$

The electric field in the image plane is the Fourier transform of the electric field in the Fourier plane, and is described by equation 4.5, where g(x,y) is the Fourier transform of G(u,v) and is described by equation 4.6.

$$h(x,y))=\Im[H(u,v)]=f(x,y)*g(x,y) \quad (4.5)$$

$$g(x,y)=\delta(x,y)+[\exp(i\theta)-1]\sin c(\delta u \cdot x) \quad (4.6)$$

Substituting equation 4.3 and 4.6 in equation 4.5 results in equation 4.7.

$$h(x,y)=f(x,y)+[\exp(i\theta)-1]f(x,y)*\sin c(\delta u \cdot x)=f(x,y)+[\exp(i\theta)-1]S(x,y) \quad (4.7)$$

The resulting intensity in the image plane is:

$$I(x,y)=|f(x,y)+[\exp(i\theta)-1]S(x,y)|^2=|A(x,y)\exp(i\phi(x,y))+[\exp(i\theta)-1]S(x,y)|^2$$

These equations are very similar to the equations discussed hereinabove, with reference to FIG. 3, except that the convolution is one-dimensional in the X direction and not in the Y direction.

In order to better obtain the values of |S(x,y)|, a one-dimensional parabola can be fitted to each line.

This configuration provides several distinct advantages. The calculations can be separated to one-dimensional calculations for each line instead of two-dimensional calculations. The |S(x,y)| function can be calculated more accurately using the a-priori knowledge that it should be cylindrical and at a certain direction. Problems associated with tilting of the inspected object in one dimensions are minimized.

The sample can be rotated to minimize the tilt problem in the other dimension as well.

In the configuration described above, the line light source can be viewed as an addition of point light sources. The line light source is parallel to the one-dimensional filter, which is a line filter, thus, each point in the line light source will create its own image on the image plane. The different images of each point in the one-dimensional light source have the same intensity distribution in the image plane. The tilt of the point light source corresponding to the optical axis adds a linear phase shift to the wavefront reflected or transmitted by the object. In the Fourier plane this linear phase shift is transformed to a lateral shift of the DC of the Fourier transform of the object. However, because the phase filter is parallel, the different DCs still incident on the filter and get the correct phase shift. In the image plane the square of the Fourier transform, which is actually the intensity of the image, eliminates the linear shift and the same intensity is obtained for each image. Each point-source of the 1-D light source is actually effected by a one-dimensional filter, and the reconstruction algorithms can be done by calculations in one-dimension only, as described above. Most of the fringes will disappear due to the elimination of the spatial coherence in one dimension.

Figure 5:
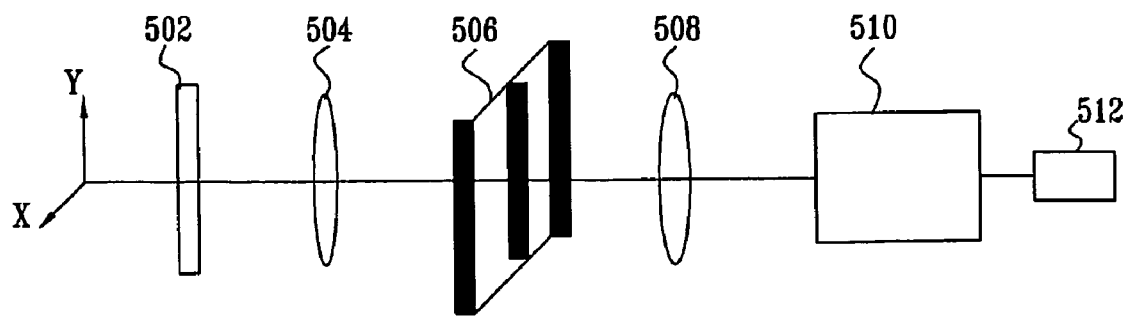
FIG. 5 illustrates a further preferred embodiment of the present invention, introducing a one-dimensional phase grating in a Fourier plane.

Reference is now made to FIG. 5, which illustrates another embodiment of the present invention introducing a one-dimensional phase grating in a Fourier plane. As seen in FIG. 5, light is projected from a light source (not shown) through an object 502. The resulting wavefront is focused, as by a lens 504, onto a one dimensional phase grating 506, preferably located at the focal plane of lens 502. A second lens 508 is arranged so as to image the wavefront onto a detector 510, such as a camera or CCD detector. Preferably the second lens 508 is arranged such that the detector 510 lies in its focal plane. The output of detector 510 is subsequently processed by a data storage and processing unit 512.

When a one-dimensional or two-dimensional phase grating is introduced in the Fourier plane, or a different plane of the imaging system, of the wavefront analysis system, a replicated image is obtained in the image plane. This replication is one-dimensional or two-dimensional, depending on the grating 506, since the image replication is parallel to the replication of the grating 506. The grating's period defines the overlapping of the replicated images. In the case of a one-dimensional grating 506, an example of the grating's period that can be chosen is a period that will create only two images overlapped at each point. This situation results in images similar to images obtained from shearing interferometry, where the light from each two points in the image with a constant distance between them interfere. In the interference of the light complex amplitudes of the two overlapped points, there are three unknown variables: the absolute amplitudes of light of each point of the image and the phase difference. These three unknowns can be obtained locally by measuring the intensities in these points with only two phase shifts introduced by the phase grating:

The calculations required for a measurement of an object or analysis of a wavefront using a one-dimensional grating in a Fourier plane are described below:

Assuming that the one-dimensional phase grating is in the X dimension, the orating function is described by equation 5.1, where $\Delta u$ is the grating spacing and $\delta u$ is the width of each line in the grating.

$$G(u, v) = \left\{ rect\left(\frac{u}{\Delta u}\right)\left[1 + [\exp(i\theta) - 1]rect\left(\frac{u}{\delta u}\right)\right] \right\} * comb\left(\frac{u}{\Delta u}\right) \quad (5.1)$$

The field in the image plane is the Fourier transform of the field in the Fourier plane and is described in equation 5.2, where f(x,y) is the object complex amplitude and g(x,y) is the Fourier transform of G(u,v) as described in equation 5.3, where $\delta(x)$ is the delta function.

$$h(x,y) = f(x,y) * g(x,y) \quad (5.2)$$

$$g(x,y) = \sin c(\Delta u \cdot x) \cdot comb(\Delta u \cdot x) + [\exp(i\theta) - 1]\sin c(\delta u \cdot x) \cdot comb(\Delta u \cdot x) = \delta(x) + [\exp(i\theta) - 1]\sin c(\delta u \cdot x) \cdot comb(\Delta u \cdot x) \quad (5.3)$$

Substituting equation 5.3 in equation 5.2 results in equation 5.4.

$$h(x,y) = f(x,y) + [\exp(i\theta) - 1]f(x,y) * \{\sin c(\delta u \cdot x) \cdot comb(\Delta u \cdot x)\} \quad (5.4)$$

The interpretation of equation 5.4 is that the interference pattern is caused by interference of multiple images, where the image of the object itself is in the center of the field and a series of complex amplitudes of the image of the object, each displaced by the amount $1/\Delta u$ relative to each other and multiplied by the factor $[\exp(i\theta)-1]\sin c(\theta u \cdot x)$.

If the object is a square with the dimensions "a" over "a" and if we choose the grating spacing, $\Delta u$, such that $$\frac{1}{\Delta u} = \frac{a}{2},$$

then only two complex amplitudes overlap. The two complex amplitudes on the right side of the field are $\exp(i\theta)f(x,y)$ and $$[\exp(i\theta) - 1]\mathrm{sinc}\left(\frac{\pi}{2} \cdot a\right)f(x - a, y).$$

On the left side of the field the two complex amplitudes are $\exp(i\theta)f(x, y)$ and $$[\exp(i\theta) - 1]\mathrm{sinc}\left(\frac{\pi}{2} \cdot a\right)f(x + a, y).$$

Figure 6:
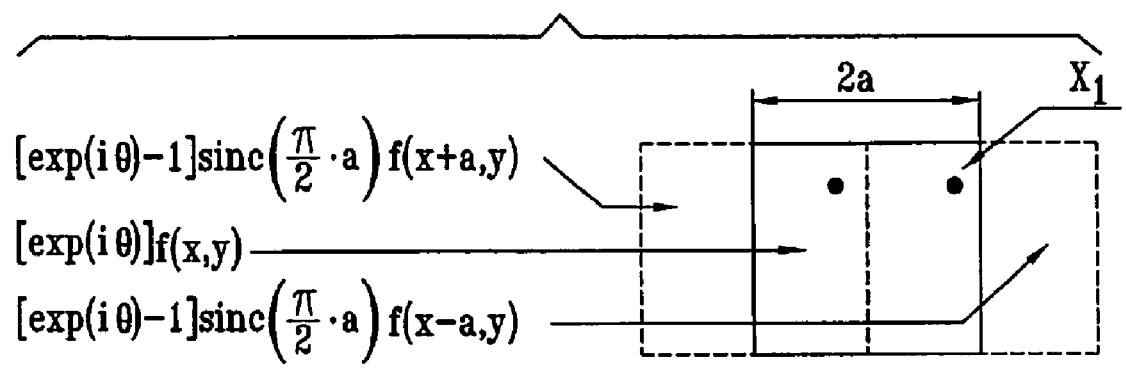
FIG. 6 illustrates the replicated image obtained in the Fourier plane in the embodiment of FIG. 5.

Reference is now made to FIG. 6, which illustrates the replicated image obtained in the Fourier plane. The intensity at point $x_1$ in the image plane is the square of the sun of the two overlapped complex amplitudes and is described by equation 5.5, where $x_2$ is described by equation 5.6 and B is the complex number described in equation 5.7.

$$I_1 = \left|\exp(i\theta)f(x_1, y) + [\exp(i\theta) - 1]\mathrm{sinc}\left(\frac{\pi}{2} \cdot a\right)f(x_2, y)\right|^2 \quad (5.5)$$
$$= |f(x_1, y) + B \cdot f(x_2, y)|^2$$

$$x_2 = x_1 + a \quad (5.6)$$

$$B = [\exp(i\theta) - 1]\mathrm{sinc}\left(\frac{\pi}{2} \cdot a\right)\exp(-i\theta) = |B|\exp(i\phi) \quad (5.7)$$

The intensity at the point $x_2$ in the image plane is described by equation 5.8.

$$I_2 = \left|\exp(i\theta)f(x_2, y) + [\exp(i\theta) - 1]\mathrm{sinc}\left(\frac{\pi}{2} \cdot a\right)f(x_1, y)\right|^2 \quad (5.8)$$
$$= |f(x_2, y) + B \cdot f(x_1, y)|^2$$

Equations 5.9 and 5.10 describe the complex amplitudes in the points $x_1$ and $x_2$ respectively, where $\psi 1$ is the phase of the complex amplitude at the point $x_1$, $\psi_2$ is the phase of the complex amplitude at the point $x_2$ and $\phi$ is the phase of B.

$$I_1 = |f(x_1,y)|^2 + |B \cdot f(x_2,y)|^2 + 2|f(x_1,y)||B \cdot f(x_2,y)|\cos(\psi_2 - \psi_1 + \phi) \quad (5.9)$$

$$I_2 = |B \cdot f(x_1,y)|^2 + |f(x_2,y)|^2 + 2|f(x_1,y)||B \cdot f(x_2,y)|\cos(\psi_2 - \psi_1 + \phi) \quad (5.10)$$

Since there are 3 unknowns: $|f(x_1,y)|$, $|f(x_2,y)|$ and , $\psi_2 - \psi_1$, an additional equation is needed. Taking a measurement with no filter, i.e. filter=0, the values of $|f(x_1,y)|$ and $|f(x_2,y)|$ can be measured immediately. Another measurement with any filter, using equation 5.9 or 5.10, enables the calculation of the phase difference, $\psi_2 - \psi_1$.

The present preferred configuration requires only two measurements, with different phase delays. Furthermore, the calculations required in order to extract the measured object, i.e. the analyzed wavefront, are local and straightforward.

The measurements described above, using a grating in the Fourier plane, can be done by two or more wavelengths, for example, when one wavelength serves for the filter 0, i.e. no phase delay is applied, and another wavelength for the second set of measurements. In this configuration the different phase delays are obtained by using two wavelengths, and a constant phase delay can be used. Additionally, instead of or in addition to two or more wavelengths, two orthogonal polarizations of light can be used to generate two different phase delays.

Figure 7:
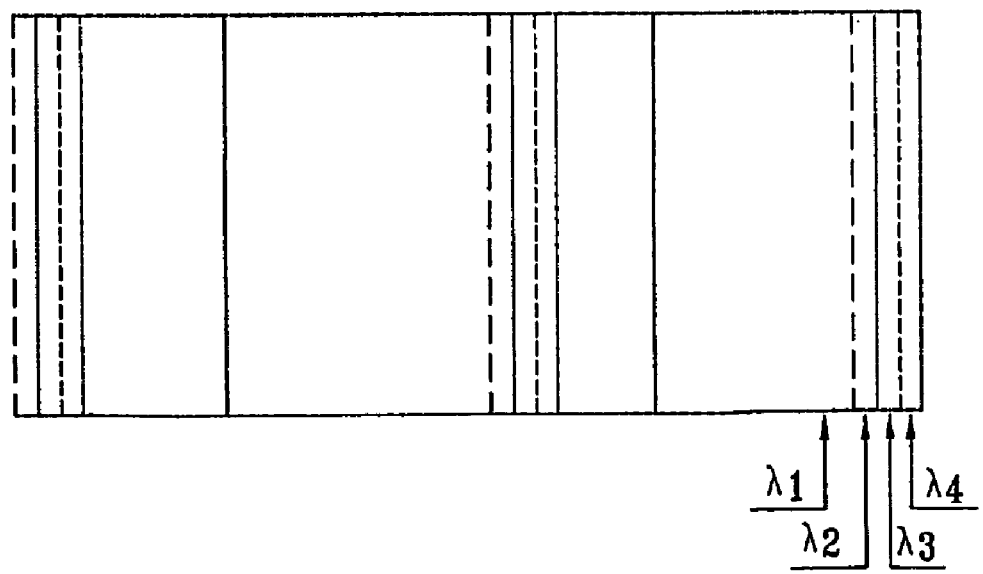
FIG. 7 illustrates the replicated image obtained using different lateral shifts for different wavelengths in accordance with another preferred embodiment of the present invention.

Reference is now made to FIG. 7, which illustrates the replicated image obtained using different lateral shifts for different wavelengths. The grating inserted in the Fourier plane can also be used to enhance the lateral resolution of the measurement or wavefront analysis. The phase grating introduced in the Fourier plane replicates the image obtained in the image plane. The grating's period defines the overlapping of the replicated images. The lateral shift between the replicated images is wavelength dependent, as each wavelength has a different lateral shift. As a result, the object or the wavefront can be reconstructed for different pixel lateral shifts for different wavelengths, as seen in FIG. 7. If the lateral shifts are sub-pixels, a reconstruction with super-resolution can be obtained.

The present invention also provides for phase manipulations by means of polarization. In the wavefront analysis system and method depicted hereinabove with reference to FIGS. 1 and 2, different intensity images are obtained in order to analyze a wavefront or measure an object. The difference between the intensity of the images is such that a different phase shift is introduced to a transformed wavefront, for example, introducing different phase shifts to various frequencies of the object in the Fourier plane. The different phase shifts can be realized by several methods. A preferred method for obtaining the different intensity images is by using light having several polarization components. The phase-manipulation filter can thus be made of a birefringent material, resulting in the phase delay of the polarization component of light propagating through the slow axis being different from the phase delay of the polarization component of light propagating through the fast axis.

In a preferred embodiment of the present invention, three sensors, each covered with polarizers having different directions from each other, are used. For example, a first CCD sensor is covered with a polarizer in a direction parallel to the optical axis of the birefringent material, a second CCD sensor is covered with a polarizer in a direction perpendicular to the optical axis of the birefringent material and a third CCD sensor is covered with a polarizer at a 45°, or any other suitable, angle to the optical axis of the birefringent material. The different polarization components of the light will thus have different phase delays. An interference between the two components of the two polarizations that pass through the polarizer is generated on the third sensor. Using the three intensity images generated on the three sensors, the characteristics of the object can be calculated. The three sensors can be implemented in a variety of ways, such as three different CCD cameras or a 3-CCD camera having 3' sensors with suitable polarizers.

Figure 8:
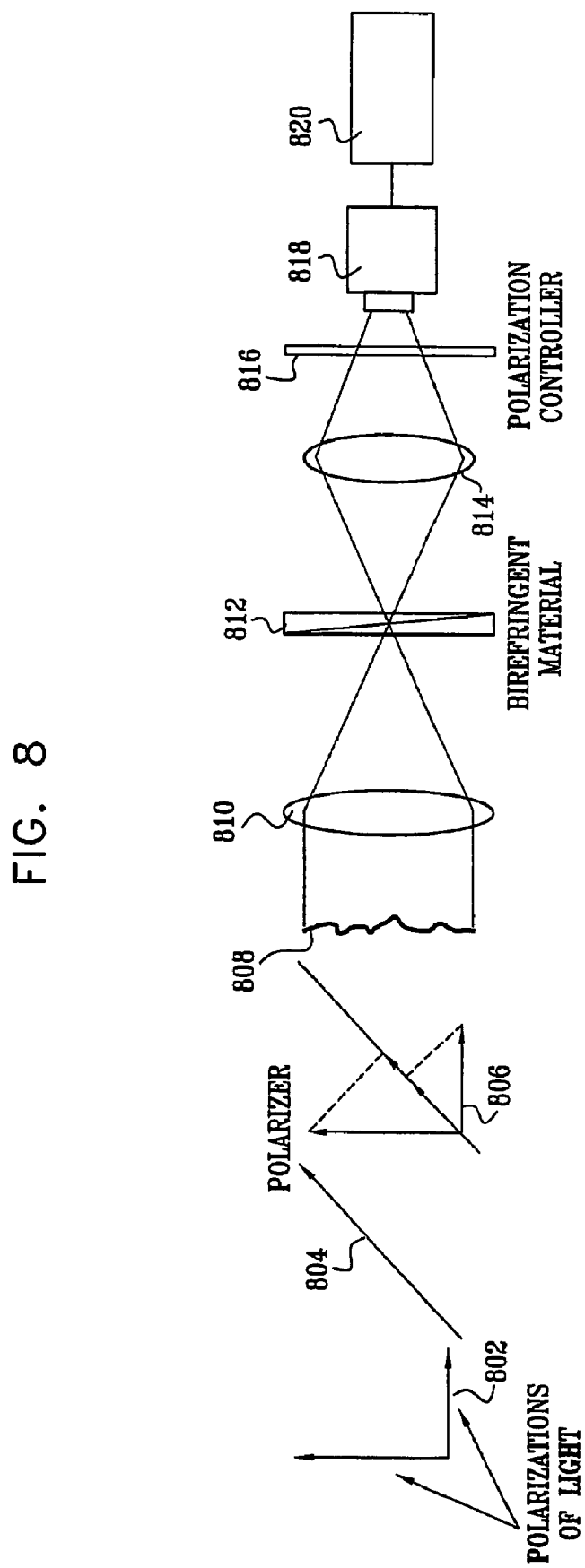
FIG. 8 is a simplified partially schematic, partially block diagram of a wavefront analysis system, providing for phase manipulations by means of polarization, constructed and operative in accordance with a preferred embodiment of the present invention.

Reference is now made to FIG. 8, which is a simplified partially schematic, partially block diagram of a wavefront analysis system, providing for phase manipulations by means of polarization, constructed and operative in accordance with yet another preferred embodiment of the present invention.

In this embodiment, a single sensor is used, and the different polarization components of the light are separated by using polarization controllers along the optical path. As seen in FIG. 8, a complex amplitude having two polarization components 802 passes through a polarizer 804. This complex amplitude of light is the sum of the components of the two orthogonal polarizations in the direction of the polarizer, as seen by reference numeral 806. The resulting wavefront 808, having both polarization components 802, is focused, as by a lens 810, onto a phase manipulator 812, made of a birefringent material, which is preferably located at the focal plane of lens 810. The phase manipulator 812 generates different phase changes to each polarization component. A second lens 814 is arranged so as to image wavefront 808 through a polarization controller 816, onto a detector 818, such as a CCD detector. Preferably the second lens 814 is arranged such that the detector 818 lies in its focal plane. The output of detector 818 is preferably supplied to data storage and processing circuitry 820, which analyzes the intensity maps to obtain information about wavefront 808, such as its amplitude, phase and polarization. The polarization component imaged by detector 818 is controlled by the polarization controller 816 in a way that at different times, different polarizations are imaged. In another preferred embodiment, the polarization controller 816 is a rotating polarizer which polarizes the light to different polarizations. The measurements are taken one at a time when the detector 818 is synchronized with the rotation of the polarizer.

In another preferred embodiment of the present invention, three light beams with different polarizations from three different light sources are used, and the polarization is preserved, such as by a polarization preserving fiber. The measurements can then be taken simultaneously with different sensors or at different times with a single sensor.

Some of the calculations required for measurement of an object, or analysis of a wavefront, while implementing the phase manipulations by different polarizations are described below:

The two orthogonal polarizations propagating through the birefringent phase plate will possess different phase delays. The intensities in the image plane of the two polarizations are given by equation 8.1, where $\theta_1$ and $\theta_2$ are the different phase shifts for the two polarizations.

$$I_1 = |Ae^{i\psi} + (e^{i\theta_1} - 1)S|^2$$

$$I_2 = |Ae^{i\psi} + (e^{i\theta_2} - 1)S|^2 \quad (8.1)$$

The polarizer of the third camera is placed at a 45° angle, or other suitable angle, to the optical axis of the birefringent material. This results in an interference between the two components of the two orthogonal polarizations that pass through the polarizer. The complex amplitudes of the two orthogonal polarizations are given in equations 8.2 and 8.3.

$$a_1 = Ae^{i\psi} + (e^{i\theta_1} - 1)S \quad (8.2)$$

$$a_2 = Ae^{i\psi} + (e^{i\theta_2} - 1)S \quad (8.3)$$

When the polarizer is at a 45° angle, the value of these components is described in equation 8.4.

$$a_3 = [Ae^{i\psi} + (e^{i\theta_1} - 1)S + Ae^{i\psi} + (e^{i\theta_2} - 1)S]\cos 45 \quad (8.4)$$
$$= 2\left[Ae^{i\psi} + \left(\frac{e^{i\theta_1} + e^{i\theta_1}}{2} - 1\right)S\right]\cos 45$$

The intensity is the square of the sum of the two complex amplitudes, the value of which is described in equation 8.5.

$$I_3 = \left|Ae^{i\psi} + \left(\frac{e^{i\theta_1} + e^{i\theta_1}}{2} - 1\right)S\right|^2 \quad (8.5)$$

Equation 8.5 is similar to equation 8.1 and equation 8.2 and can thus be solved as described hereinabove with reference to FIG. 3.

This method provides several distinct advantages. The same wavelength can be used for all the images and the same algorithm described hereinabove with reference to FIG. 3 can also be utilized. There are no moving parts, no active phase changes and no splitting to the different channels of the optical path.

Figure 9:
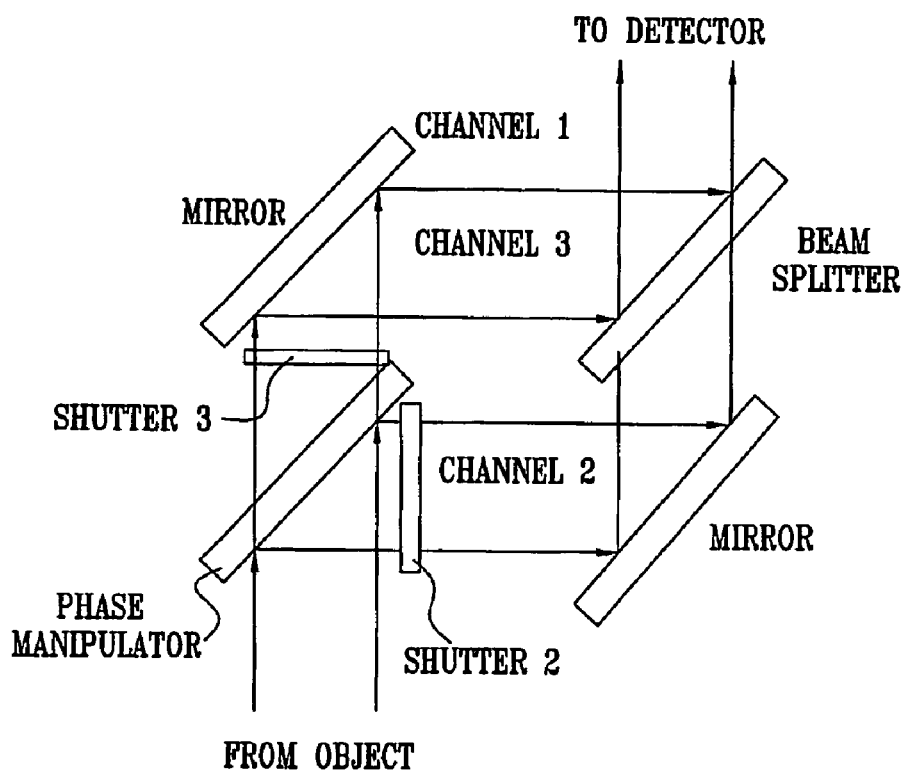
FIG. 9 is a simplified partially schematic illustration of a wavefront analysis apparatus where two images interfere, constructed and operative in accordance with yet another preferred embodiment of the present invention.

Reference is now made to FIG. 9, which is a simplified partially schematic illustration of a wavefront analysis apparatus where two images interfere, constructed and operative in accordance with yet another preferred embodiment of the present invention. In this embodiment, more data about the complex amplitude in the image plane is obtained by interfering different images with each other and generating an interference pattern.

In the wavefront analysis or object measurement methods and systems described hereinabove different intensity images are obtained in the image plane and utilized for the analysis. In the image plane, there are actually different complex amplitudes, not only different intensities. These complex amplitudes, i.e. an amplitude and phase in each image plane, are not readily detectable, since the cameras are intensity detectors, detecting only the absolute value of the complex amplitude.

This embodiment overcomes this problem of detecting the complex amplitudes. An interference image of two images, or two wavefronts, provides an intensity image affected by the phase difference between the two interfered complex amplitudes. Thus, instead of three different phase delays, as described hereinabove with reference to FIGS. 1 and 3, the analysis of a wavefront can be obtained by two intensity maps, obtained by two different phase delays, using the interference of the two images as the third intensity map. These three intensity maps are then utilized, in a method similar to that described hereinabove with reference to FIG. 3, to generate the phase and amplitude of the wavefront. As seen in FIG. 9, channel 1 represents the interference image between channel 2 and channel 3, each having a different phase delay. Operation of the shutters enable images to be obtained in each of the channels as appropriate, thus, when obtaining an image in channel 1, both shutters 2 and 3 are in the open position, while shutter 2 is opened and shutter 3 is closed when obtaining an image in channel 2 and shutter 3 is opened and shutter 2 is closed to obtain an image in channel 3.

In another embodiment of the present invention, the method is operative to define confidence levels and perform error correction.

In the method described hereinabove with reference to FIG. 1 and FIG. 2, specifically when the spatial function "G" of FIG. 3 is applied to a spatially central region, the second complex function S(x,y), as described hereinabove, can represent the low frequencies of the inspected object obtained, or the wavefront being analyzed, since it is generated by low-pass filtering in the Fourier plane. As a result, the function $|S(x,y)|^2$ can be approximated by a low degree polynomial, such as a second order polynomial, of the position. A second degree polynomial is best fitted to the function $|S(x,y)|^2$ resulting from the experimental results, by best fitting methods, such as least squares approximation. It is therefore possible to obtain approximate values for |S(x,y)| over the entire plane from the value of the function at only a few points in the plane. Following this approximation, to every point $(x_i, y_i)$ a 'confidence level' can be defined, based on the difference between the value of the function |S| at the point, and the value of the polynomial approximation of |S| at the point. Accordingly, every pixel in the image plane can have a 'confidence level', indicative of the quality of the experimental results, or the noise level, at this pixel. This indication defines a "level of confidence" of the phase and amplitude of the analyzed wavefront calculated at each point.

When there are more than three measurements, i.e. more than 3 differently phase changed wavefronts, resulting in more than 3 intensity maps at the image plane, the level of confidence of each combination of every three measurements can be calculated. This level of confidence at each point can then be used to increase the accuracy of the measurement and minimize the noise by several methods, such as at each point choosing the phase and intensity of the wavefront being analyzed calculated by the three measurements having the maximal level of confidence, or averaging the different results from different combinations, weighting each result related to the level of confidence in the appropriate combination.

This level of confidence can be used for error correction and noise reduction of the measurement and analysis. The value in each point, or pixel, in the analyzed parameter, such as the phase or amplitude of the analyzed wavefront, can be modified, for example to maximize the level of confidence in the same point in |S(x,y)|.

In another embodiment, multiple wavelengths are used, for example, to increase the dynamic range of the height measurements. The dynamic range, however, is noise limited. When there is noise, one of the several heights that fall within the accuracy of the measurements should be chosen. As described hereinabove, the difference at each point, between the S calculated from the experimental results and the smoothed S calculated by the second degree polynomial, can be used as an indicator for the quality of the experimental results at that point. This indication defines the "level of confidence" of the phase calculated at each point. The "level of confidence" of each wavelength is calculated. The phase calculated which has the maximal "level of confidence" can be chosen as the "true" phase. For the other wavelength, the height that is closer to the smoothed S can be chosen as the "true" height.

In still another embodiment, a normalization process may be used to increase the measurement accuracy, when there are different average intensity levels at each one of the resulting intensity maps. In this embodiment, the intensities of all the pixels in each of the intensity maps are summed and the pixels in all but one of the intensity maps are multiplied by the ratio of the relevant sums. The normalization process can also be performed when the light source is spectrally broad or not spatially coherent.

Still another normalization method normalizes the halo, or intensity of S, around the image for the different intensity maps. The halo around the image depends on the object and the spatial form of the phase change applied to the transformed wavefront, and does not depend on the value of the phase change applied to the transformed wavefront.

The wavefront analysis method described hereinabove with reference to FIGS. 1 and 2 can also be used, when reflecting light from or transmitting light through a known object, to determine the effective phase change value applied to the transformed wavefront. Additionally, since the contrast of the resulting intensity map is relatively insensitive to the normalization, losses, fringes and other noises in the optical system, but is dependent on the value of the phase change, the effective phase change value can be calculated by measuring the contrast in the intensity map image of a known object. The phase change value resulting in a measured contrast in the image closest to the expected value is the effective phase change value.

This method can also be used to obtain the effective area and spatial shape in the transformed wavefront in which the phase change is applied. This effective area of the phase can be calculated by extrapolations of the zeros of the low order polynomial that describe the function of $S(x)$.

In accordance with another embodiment of the present invention, a flat mirror can be used to calibrate the wavefront analysis system. In this embodiment, a known reflected wavefront is generated by using any known object, and in particular a flat mirror as the inspected object. The resulting intensity maps from this known wavefront can be used to perform normalization as described hereinabove between the different intensity maps obtained, where this normalization will also be valid for different non a-priori known objects. The known wavefront reflected from a flat mirror can also be used as the known wavefront in order to obtain the effective phase change value or the effective phase change area as described hereinabove. The resulting intensity maps can also be used to eliminate or minimize noise and other error factors in the entire system, by subtracting or dividing the resulting intensity maps of unknown objects by the known intensity maps obtained using the flat mirror.

In yet another embodiment of the present invention, the wavefront to be analyzed may be obtained using only two different phase changes. In this embodiment, part of a signal reflected from or transmitted through an object to be inspected is intentionally blocked, such as by an iris. Information is then obtained from the area of the intensity maps, resulting from a phase changed transformed wavefront, both from the imaging of the unblocked area in the object plane and the area outside the image of the iris. The intensity outside the iris can be shown to be equivalent to the absolute value squared of the object low pass ($|S|^2$ in reference to FIG. 3). Using a polynomial approximation, such as a second degree polynomial, of this absolute value squared to in the position, the value of $|S(x,y)|$ can be obtained over the entire plane. This provides one of the unknowns required in the algorithm as described hereinabove with reference to FIG. 3, thus, only two intensity maps are required, and therefore only two phase changes need to be applied.

In accordance with still another embodiment, some of the wavefront is blocked, such as by an iris, and data is obtained from the intensity map in an area outside the image of the iris. The minimum spot size of an optical imaging system is a function of the wavelength and the numerical aperture, or F/#, of the optical system. In order to set the spot size of the optical system, the effective numerical aperture can be partially controlled by the field of view in the object plane. This field of view can be set by introducing an iris in the object plane, or in a plane imaging the object. During the imaging process, the object within the iris is imaged to an image limited by the iris image. An iris can be introduced in an implementation of the wavefront analysis system as described hereinabove with reference to FIGS. 1 and 2. Intensity information exists outside the image of the object, creating a "halo" around the iris image, outside the iris, by the diffraction of light from the phase manipulation, such as the Fourier filter. This halo can be used to obtain additional information regarding the wavefront being analyzed. The intensity of the halo is the absolute square of the low-pass frequencies of the object outside the halo. This can help in reconstructing the $S(x)$ function described hereinabove. A low order polynomial is best fitted to the intensity of the halo. When a flat object is used for calibration, as described hereinabove, the contrast between the intensity inside the iris and outside the iris, i.e. the halo, in the image plane can be used for normalization or to obtain the effective phase change value or the effective phase change area as described hereinabove. The ratios between the intensities of the halo in different channels can be used as normalization factors of the different intensity maps or different channels, as described hereinabove. Another possible normalization methodology is to normalize the halo, or intensity of S, around the image for the different intensity maps. The halo around the image depends mainly on the object and spatial shape of the phase change, and does not depend on the phase change value introduced, and thus should be substantially identical in all intensity maps.

Figure 10:
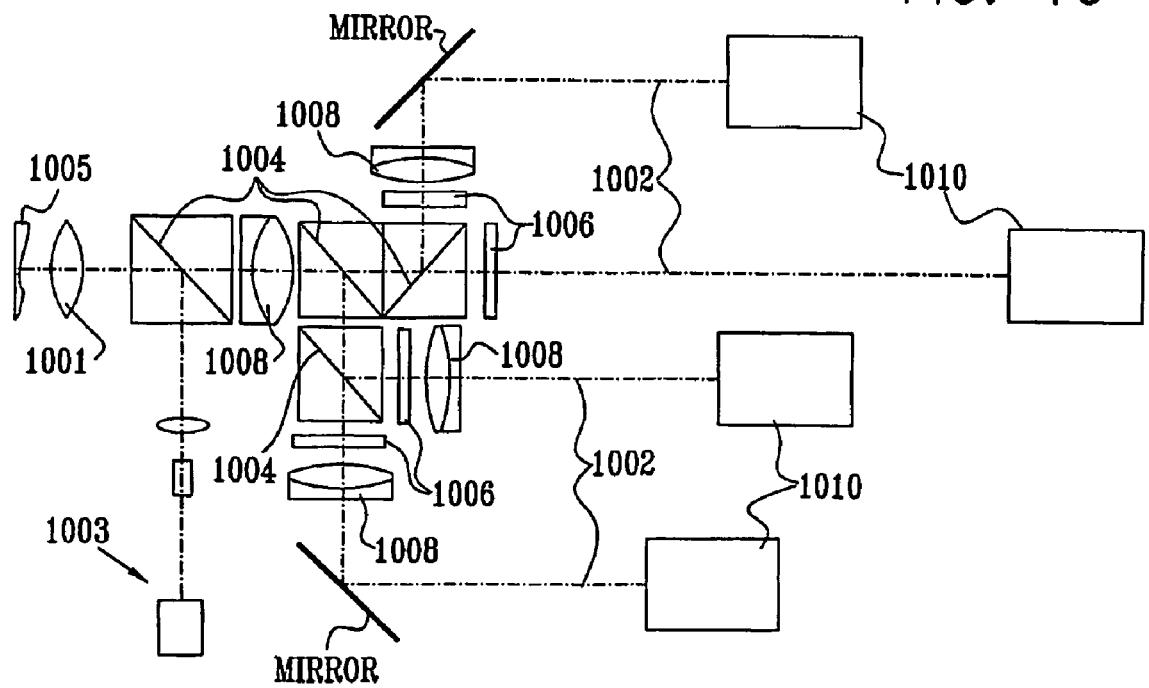
FIG. 10 is a simplified schematic illustration of part of a wavefront analysis system using multiple channels for different phase shifts, constructed and operative in accordance with another embodiment of the present invention.

Reference is now made to FIG. 10, which is a simplified schematic illustration of part of a wavefront analysis system using multiple channels for different phase shifts in accordance with another embodiment of the present invention. As seen in FIG. 10, several different imaging channels 1002 are utilized for the same wavefront. These different imaging channels 1002 are obtained, preferably, by splitting a beam from an illumination source 1003 using multiple beam splitters 1004. The illumination is reflected from an object 1005. In each channel 1002, the wavefront undergoes a different phase shift, provided by multiple phase manipulators 1006. In this embodiment, all of the phase shifts can be performed substantially simultaneously. Each intensity map is then obtained by a sensor 1010, such as a CCD camera, presented at each channel 1002. All channels 1002 use the same illumination 1003 and the same primary optics 1001, but each may have one or more additional lenses 1008. Using different channels 1002 for different phase shifts it is possible to normalize the intensities of all channels 1002 to compensate for the different optical components and different optical paths of each channel 1002. One normalization methodology normalizes the integration of the intensity in the image plane, so the sum over the entire field of view of all the intensities is equal. Another normalization method uses a non-coherent light source where no phase-delay is obtained and normalizes the intensity of the different channels 1002.

Figure 11:
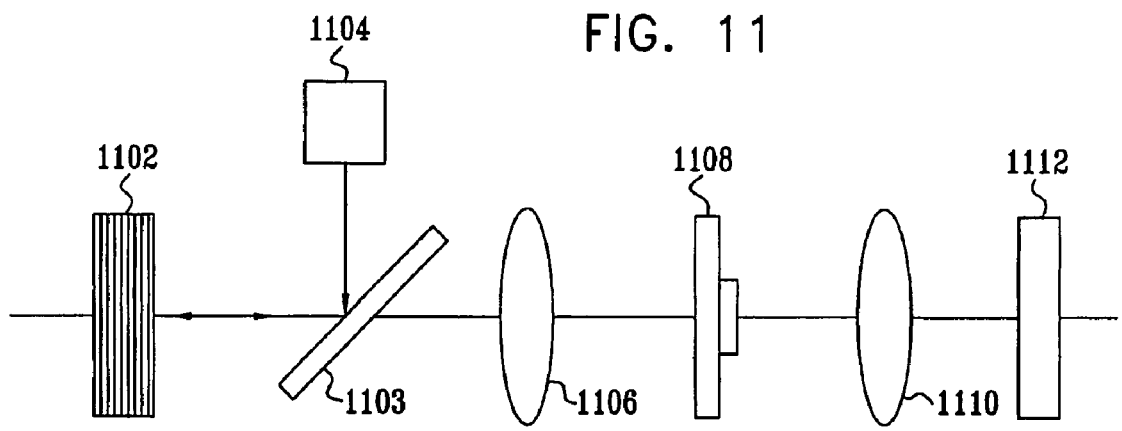
FIG. 11 is a simplified schematic illustration of a system for analysis, detection and measurement of multilayer objects, constructed and operative in accordance with a further preferred embodiment of the present invention.

Reference is now made to FIG. 11, which is a simplified schematic illustration of a system for analysis, detection and measurement of multilayer objects, constructed and operative in accordance with a further preferred embodiment of the present invention.

The reflectivity of a multilayer material or object 1102 is dependent on the wavelength of the reflecting light-source. The optical path length of each layer can be calculated by measuring the reflectivity in different wavelengths using a wideband light source 1104. Additionally, the thickness of each layer can be obtained if the refractive indices of the different materials are known. Current methods make no use of the phase of the reflected light, and the thickness at each location in the sample is measured according to the reflection from that location in various wavelengths, independent of other locations. The wavefront analysis system of the present invention obtains and measures both the amplitude and the phase of the wavefront transmitted though or reflected from an object. The amplitude measurement is used to obtain information about the object's transmittance or reflectance at the wavelength of the impinging light and the phase measurement is used to obtain information about the object's optical quality or surface by using the wavefront analysis system, with a spectrally wideband light source, or a light source having several wavelengths. The reflectance of a multilayer material or object is obtained for different wavelengths. This is done similar to the wavefront analysis system described hereinabove with reference to FIGS. 1 and 2, where, for example a phase manipulator is inserted in the Fourier plane of an imaging system. In this implementation a spectrally wideband radiation source and a spectrally wideband sensor are used to obtain the intensity maps at the various wavelengths of the radiation source, and subsequently obtain the phase and amplitude of the reflected wavefront in each wavelength and in each location in the object.

For each wavelength a different phase shift can be performed by a phase manipulator 1108, such as a fixed optical-path change in a transparent plate, generating a different phase delay at each wavelength. The optical system may include additional optical elements such as beam-splitter 1103 and lenses 1106 and 1110. The spectral images of the object obtained in the image plane 1112 of the system are analyzed by means of an imaging spectrometer. An example of such an imaging spectrometer is described in U.S. Pat. No. 5,777,736. For each wavelength, the amplitude and the phase of the wavefront reflected from the object 1102 are obtained. This is done in the various methods described hereinabove for the wavefront analysis method, such as by obtaining a plurality of intensity maps.

Once the reflected wavefronts are obtained, the optical path length of each layer is calculated, and, if the refractive indices of the different materials are known, the thickness of each layer is obtained. Additionally, since the phase of the reflected wavefronts is also obtained, the three dimensional measurements of the surface of the object can be extracted as well. Different materials can be detected by comparing the reflection wavefronts obtained, to known and stored expected reflection wavefronts of different materials.

In another embodiment, the wavefront analysis system is operative to record the measurements while the polarization of the radiation source is changed. By measuring reflections from a multilayer material for different wavelengths and different polarizations, the wavefront analysis system operates as a two-dimensional ellipsometer. In addition to conventional ellipsometry, additional phase information is obtained, which is utilized to extract the three dimensional measurements of the object's surface.

The present invention also allows for a variety of methods to perform different phase changes. These different phase changes can be used, for example, to yield the required differently phase changed transformed wavefronts. These methods include reflection or transmission mode methods, such as using different phase plates or a tunable spatial light modulator. Another method is to combine the reflection and transmission modes and use both in the same phase plate or spatial light modulator, to obtain more phase shifts from fewer phase plates. Another method is to use different wavelengths, which provide different effective phase changes in each wavelength, and to include scaling of the Fourier transform. Another example is a phase-changing spatial light modulator in which the phase changing area surrounds the non-changing area, eliminating the need for excessive conductors. Still another method for creating different phase changes is to use a moving phase plate which has different phase shifts at different locations. Yet another method is to use a reflective set of mirrors, where a moveable mirror is placed under a mirror with a hole in its center. A further method is to use nonlinear material in the Fourier plane. Use of these methods is not limited to phase manipulation of the wavefront analysis system, but also may be used to perform phase manipulation on any system.

Figure 12:
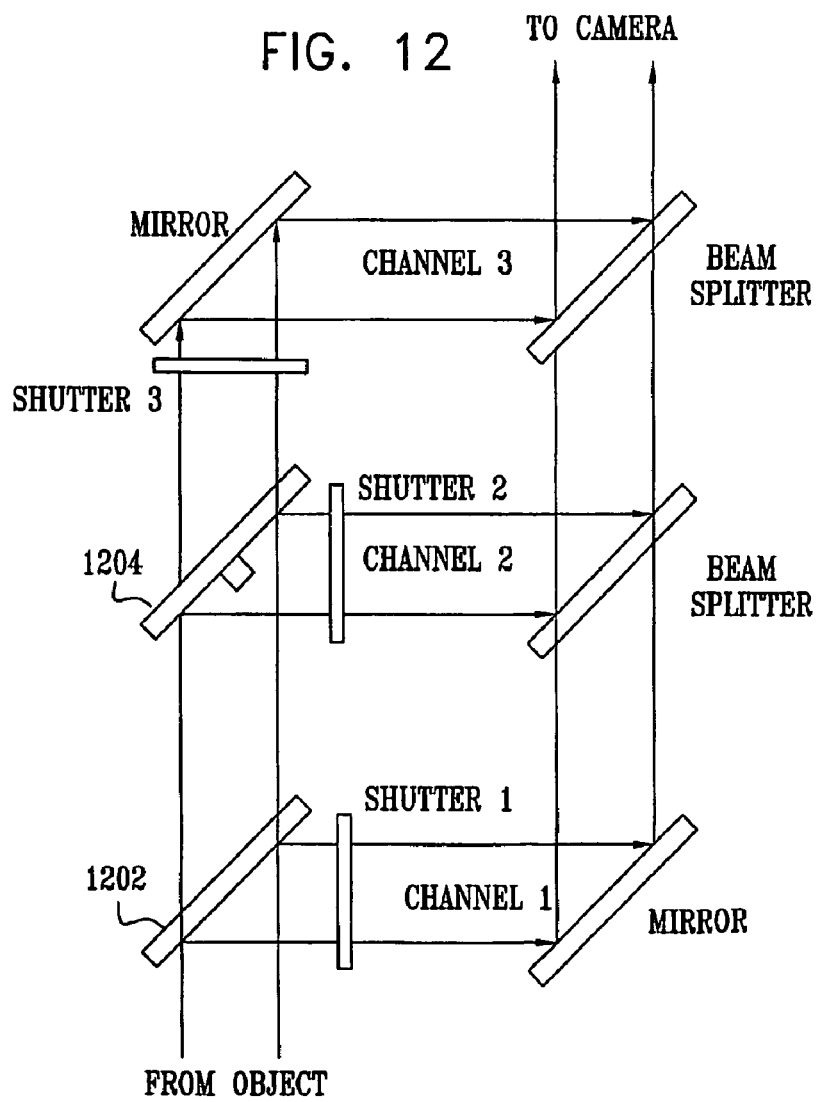
FIG. 12 is a simplified schematic illustration of a wavefront analysis system using a combination of reflection and transmission modes in phase shifts, constructed and operative in accordance with another embodiment of the present invention.

Reference is now made to FIG. 12, which is a simplified schematic illustration of a wavefront analysis system using a combination of reflection and transmission modes in phase shifts, constructed and operative in accordance with another embodiment of the present invention. In the embodiment seen in FIG. 12, two mirrors and a beam splitter 1202 are combined with a phase plate 1204, where the beam is divided into 3 parts to 3 different channels. Channel 1 is not passing through or reflected from the phase plate. Channel 2 is reflected from the phase plate, and channel 3 is transmitted through the phase plate, Operation of the shutters enable images to be obtained in each of the channels as appropriate, thus, when obtaining an image in channel 1, shutter 1 is in the open position and shutters 2 and 3 are closed, while shutter. 2 is opened and shutters 1 and 3 are closed when obtaining an image in channel 2 and shutter 3 is opened and shutters 1 and 2 are closed to obtain an image in channel 3. In each mode, transmission or reflection, a different phase shift is applied to the wavefront. In channel 1, no phase delay is applied. In the channel 3 transmission mode the phase delay is $$\phi = \frac{2\pi}{\lambda}(n-1)d,$$

and in the channel 2 reflection mode the phase delay is $$\phi = \frac{4\pi}{\lambda}d,$$

where $\Phi$ is the phase delay, d is the depth or deposit height in the phase plate, $\lambda$ is the wavelength and n is the index of refraction of the material of the phase plate. The ratio of the two phase delays is $$\frac{n-1}{2}.$$

Figure 13:
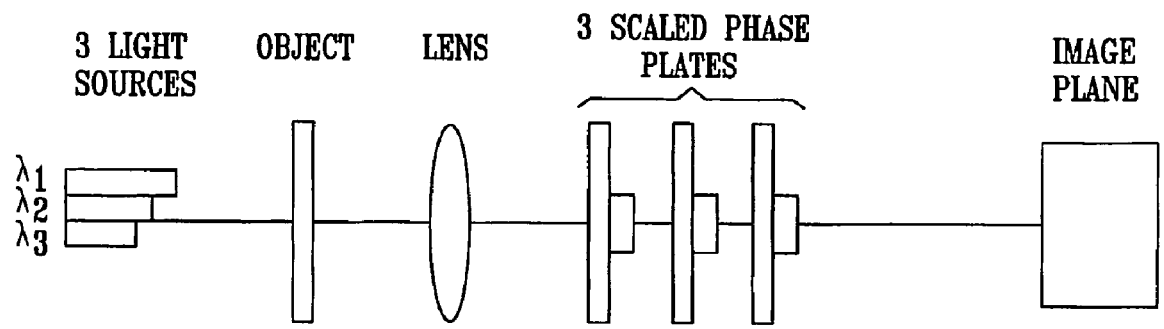
FIG. 13 is a simplified schematic illustration of a wavefront analysis system using scaled phase plates in phase manipulations, constructed and operative in accordance with still another preferred embodiment of the present invention.

Reference is now made to FIG. 13, which is a simplified schematic illustration of a wavefront analysis system using scaled phase plates in phase manipulations in accordance with still another preferred embodiment of the present invention. In this embodiment, multiple phase delays are generated using a wavefront having different wavelengths, such as a light-source with different wavelengths, where the same phase plate generates a different optical path change, or phase delay, for each wavelength. However, in the position of the phase plate, such as in the Fourier plane, the scaling of the diffraction pattern of each wavelength is different. This results in each wavelength having a different ratio of the phase-changing area in the phase plate to the minimum spot size of the system. It is therefore desirable to rescale the diffraction pattern of each wavelength so that the ratio will be the same for all wavelengths. It is known in the art, that the optical Fourier transform of an object is obtained at the image plane of the light source and that it is scaled according to the distances of the light source and the object from the imaging lens. By modifying the distances from the light sources of each wavelength to the object, the optical Fourier transforms of the object from different wavelengths are obtained at different planes. The distances are chosen so that the optical Fourier transforms are rescaled to obtain the same ratio for all wavelengths. When using only a single lens for the wavefront analysis system, the object is imaged on the image plane, by the same lens that creates the Fourier transform in the Fourier plane.

Figure 14:
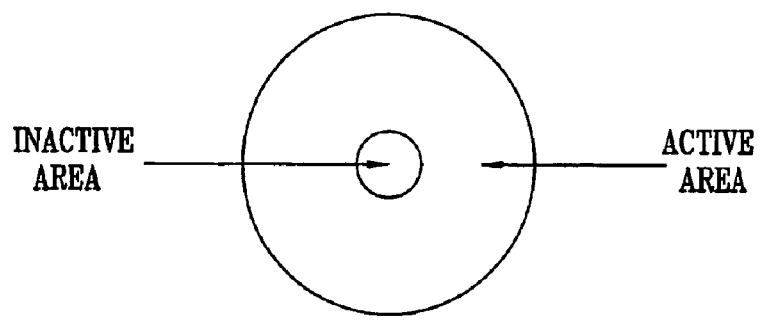
FIG. 14 is a simplified schematic illustration of a tunable spatial light modulator with an active area surrounding an inactive area, constructed and operative in accordance with yet another preferred embodiment of the present invention.

Reference is now made to FIG. 14, which is a simplified schematic illustration of a tunable spatial light modulator with an active area surrounding an inactive area, in accordance with yet another preferred embodiment of the present invention.

Another methodology for generating multiple phase delays is to create phase shifts of only the lower frequencies of the object in the Fourier plane, which are in the inner area of the Fourier plane. A tunable spatial light modulator positioned in the Fourier plane can provide these phase shifts. The spatial light modulator can consist of, for example, a nematic liquid crystal, or LC, material, with a conductive layer, or ITO, on an active area where different voltages are applied to the conductive layer to cause different phase shifts in the liquid crystal area adjacent to the conductive layer. However, to generate these phase shifts in a generally central part of the liquid crystal, electrical conductors should pass through the outer non-active area to reach the conductive layer on the active area. These conductors can cause unwanted phase changes in the non-active area as well. In another embodiment of the present invention, which overcomes this problem, the phase shifts are performed on the higher frequencies in the outer area in the Fourier plane instead of the lower frequencies. Thus the conductive layer covers the outer area of the spatial light modulator and there are no phase shifts in the inner area. There is thus no need for electrical conductors in the inner area.

In certain applications, the actual phase change in each area is not the most important parameter but rather the relative phase change between the inner and outer areas is the most important parameter. In this embodiment, the same relative phase change can be provided either by changing the phase, delays in the outer area in respect to a constant phase delay in the inner area or by changing the phase delays in the inner area in respect to a constant phase delay in the outer area.

Yet another method for creating different phase shifts or phase manipulations is to use a mechanically movable phase plate which has different phase shifts at different locations. When a specific phase change is required, the appropriate area of the movable phase plate is inserted in the optical path of the system.

Figure 15:
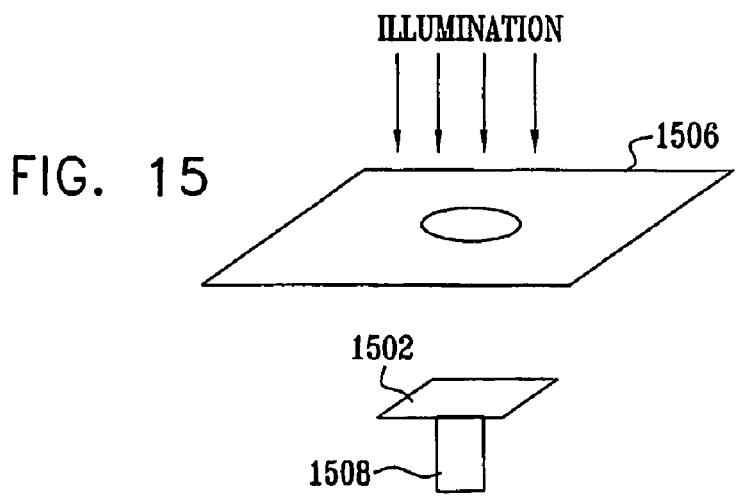
FIG. 15 is a simplified schematic illustration of a spatial light modulator comprising two mirrors, in accordance with yet another preferred embodiment of the present invention.

Reference is now made to FIG. 15, which is a simplified schematic illustration of a spatial light modulator comprising two mirrors, in accordance with yet another preferred embodiment of the present invention. As seen in FIG. 15, a reflective spatial light modulator comprises a moveable mirror 1502 placed under a mirror 1506 with a hole in it. The movements of the movable mirror generate the different phase shifts between different parts of a beam reflected from the two mirror module. The movable mirror is moved, for example, by a piezo-electric actuator 1508.

In accordance with still another preferred embodiment of the present invention, the different phase shifts or phase manipulations are produced by means of a nonlinear material, preferably incorporated into a filter in the Fourier plane. Since the refractive index of this nonlinear material is dependent on the intensity of the radiation impinging thereon, introducing it in the Fourier plane provides another method for generating different phase shifts. When using objects with the major part of the optical power in the Fourier plane concentrated in the lower frequencies, mainly in the DC, the high intensity causes a change in the refractive index of the nonlinear material. This results in a change of the phase shift of the lower object frequencies. Different illumination intensities also cause different phase changes. The different intensity maps obtained thereby are then normalized and used to obtain the wavefront being analyzed in the wavefront analysis system.

In yet a further embodiment, an absorber that can be saturated is introduced in the Fourier plane. The absorption coefficient of this absorber is dependent on the intensity of the radiation impinging on it. Since the intensities of the lower frequencies are higher than in the higher frequencies, a different transmission coefficient is obtained for the lower and higher frequencies. Several measurements in different intensities can be used to obtain the wavefront being analyzed in the wavefront analysis system.

The present invention also provides for improvements in common path interferometry. In common path interferometry microscopes, the interfering object and reference beams propagate a similar path and have a small optical path difference. This provides several advantages, including enabling the use of non-perfect optical elements, insensitivity to vibrations and enabling the use of a broadband light source. There are several common path interferometry microscopes, including the Differential Phase Contrast, or DPC, microscope and the Nomarski Differential Interference Contrast, or DIC, microscope.

The DPC microscope is a common path interferometer, where changes in the optical path of the object are made visible and the three dimensional structure of a reflective object is reconstructed. In the DPC microscope, a split detector records the signal on either side of the optical axis. Any local slope on the sample surface will shift the position of the reflected beam on the detector. The difference between the two signals indicates the steepness of the surface slope at that point. By scanning, the surface can be reconstructed. In another embodiment, the phase difference between two adjacent points of the object is measured. In a Michelson interferometer configuration, the beam is split into two beams, the reference beam and the sample beam. The sample beam is then split again, using a Wolaston prism, into two components with mutually perpendicular polarizations and focused on two adjacent points on the object. The two reflected beams are then combined and interfere with the reference beam. The phase difference between the two points can be calculated by the ratio of the interference intensities of the two polarizations.

The DIC microscope is a bright field microscope with a polarizer-analyzer pair and two prisms. The polarizer and the first prism produce two wavefronts with fields polarized perpendicularly to each other, which are translated with respect to each other. Both wavefronts propagate through or are reflected by the object. The analyzer and the second prism, a Nomarski prism, recombine the two wavefronts and produce a fringe pattern of interference between the two wavefronts through which the phase map of the object is reconstructed.

Phase shift interferometry is a method where three or more phase shifts are introduced between the interfering reference beam and the object beam. The phase shifts produce different interference patterns. Many algorithms for determination of the unknown wavefront have been published. For three different measurements, of different phase delays, the phase and amplitude of the unknown wavefront at each location is expressed as a function of the three measured intensity images and the other known parameters of the system. Each additional measurement, or phase delay function, increases the accuracy of the reconstruction of the wavefront when there are inaccuracies in intensity measurement or in the known parameters, or when there are other noises or disturbances in the system.

A one arm interferometer is an interferometer where the light propagates through an optical fiber and is directed to the object's surface. A portion of the light is reflected by the fiber end and serves as the reference beam while another portion is reflected by the object's surface and serves as the object beam. The two beams interfere and the phase difference can be calculated.

Current methodologies for optical disk data storage are based on storing the data bits as pits on the disk's surface. By focusing light on the disk's surface, a destructive or instructive interference between the light reflected by the pit and the light reflected by the pit's surrounding area, the land, are obtained. There are several methods for increasing the available data storage on an optical disk. One method is to utilize multiple layers, where each layer serves as a different optical disk. The disk is read using, a single wavelength or multi-wavelength beam focused on a specific layer or multiple layers simultaneously. Another reading and storage method, the "Color Optical Memory", increases the available data storage by utilizing different colors, using white light and a thin film. The data is stored in a thin layer on the disk's surface with locally different thicknesses. Different wavelengths are reflected differently by the thin film, so that different thicknesses of the thin film correspond to different color light reflected. The present invention provides for improvements of the interferometry and microscopy methods described hereinabove in various methods and embodiments described below.

Reference is now made to FIG. 16, which is a simplified schematic illustration of an implementation of an improved common path Michelson interferometer, in accordance with one embodiment of the present invention. The incoming laser beam from laser 1600 is split by the beam splitter 1602 into two beams 1604 and 1606. Beam 1604 is focused by means of an optical system (not shown) on a point, or sub-surface, on the surface of an object 1608, while beam 1606 is focused, by means of an optical system including a mirror 1607, on an adjacent point, or sub-surface, of object 1608. After reflection, the two beams are recombined and produce an interference pattern on detector 1610, such as a CCD camera or other electronic imaging device. A tunable phase delay, produced by a tunable optical element 1612, such as spatial light modulator or other suitable device, is introduced in the optical path of beam 1606. The tunable optical element results in different phase delays between beams 1604 and 1606, creating different interference patterns. From three different interference patterns of different phase delays, the phase and the amplitude differences of both points, or sub-surfaces, can be calculated. This embodiment provides the advantages of the common path interferometry and the advantages of phase shift interferometry. Additionally, this embodiment is also applicable using white light or different wavelengths. Alternatively, a static phase plate can be used instead of the tunable optical element 1612, utilizing different wavelengths in the illumination source 1600.

In another embodiment, the beam is split into two components with mutually perpendicular polarizations as in the DPC described hereinabove, where the phase delay is introduced to one polarization component.

In still another embodiment, the Michelson interferometer is actualized using fiber optics. The beam propagates through an optical fiber, is then split by a 50:50 coupler into two fibers and directed to two adjacent points on the sample's surface. The phase delay is then introduced into one arm of the interferometer by any conventional phase delay device.

In a further embodiment, different wavelengths are directed to the two fibers by means of wavelength division multiplexing resulting in different phase delays. Additionally, a bundle of fibers may be utilized to provide a system for two-dimensional measurements.

In another embodiment, the present invention can be used to enable the differential phase contrast interferometer described hereinabove to scan two-dimensional objects, where the local slope and phase are calculated, using two or more adjacent pixels in the camera. Additionally, a tunable phase delay device can be introduced to one side of the optical axis to produce different phase delays between the two sides, also providing the advantages of the phase shift method.

In yet another embodiment, two or more wavelengths are used to produce the different phase shifts between both sides of the optical axis.

Reference is now made to FIG. 17, which is a simplified illustration of light reflecting from a disk being scanned in accordance with yet another preferred embodiment of the present invention. In this embodiment, the differential phase contrast interferometer is used with white light to increase the available data storage. Data bits are stored on the surface of an optical disk 1700 by applying pits 1702, where different depths represent different data. The white light is focused by means of a conventional optical system on a point on the disk's surface. As seen in FIG. 17, part of the white light 1704 is reflected by the pit and the other part 1706 is reflected by the land 1710. As in differential phase contrast interferometry, both parts of light combine and interfere. Thus, different wavelengths have reconstructive and destructive interference for different depths, and the light is reflected from the disk's surface in different colors.

In another embodiment, the refractive index on the disk's surface is changed locally to emulate the pit and the land, instead of utilizing actual pits.

In yet another embodiment of the present invention, two or more wavelengths are directed through the fiber by means of wavelength division multiplexing introducing different phase shifts for each wavelength. This provides different interferences for each wavelength and realizes the advantages of the phase shift method. Alternatively, the fiber end is suitably coated to transmit one wavelength and reflect the other. By scanning the object's surface, the two different reflected wavelengths interfere and the phase is detected in the sense of the Heterodyne detection.

Reference is now made to FIG. 18, which is a simplified schematic illustration of a wavefront analysis method and system using a single intensity map, and to FIG. 19, which is a simplified illustration of an illumination pattern obtained therefrom in the image plane, in accordance with another preferred embodiment of the present invention.

In holography, two light beams, a reference beam and an object beam, interfere on a film to provide the fringes that are recorded on the film. The original object beam is reconstructed by illuminating the film with a reconstruction beam identical to the reference beam. The interference pattern on the film is given by equation 18.1, where U and V are the complex amplitudes of the reference and the object beam respectively.

$$I=|U+V|^2=|U|^2+|V|^2+UV^*+U^*V \quad (18.1)$$

The opacity of the film is proportional to the illumination intensity of the image recorded on it. After illuminating the film with the reconstruction beam identical to the reference beam, the complex amplitude transmitted through the film is stated in equation 18.2.

$$UI=(|U|^2+|V|^2)U+U^2V^*+|U|^2V \quad (18.2)$$

The first term in equation 18.2 describes a beam that propagates in the direction of the reference beam. The second term describes a beam that propagates in a direction which is the conjugate direction of the object's beam with an additional rotation. The final tern describes a reconstruction of the object beam. The original object beam can be reconstructed electronically by multiplying the intensity pattern by means of a computer with a virtual reconstruction beam. After propagating forward the three beams, the first two beams can be filtered out. A reverse propagation reconstructs the object's beam.

In the current embodiment, an imaging system is used, where phase change is applied to the transformed wavefront, similarly to the wavefront analysis system described hereinabove with reference to FIG. 1 and FIG. 2, the intensity map in the image plane is given by equation 18.3, where S, which is generally related to the light diffracted by the Fourier filter, was described hereinabove in FIG. 3.

$$I=|Ae^\phi+(e^{i\theta}-1)S|^2=|V+U|^2 \quad (18.3)$$

In this representation where V represents $Ae^\phi$ and U represents $(e^{i\theta}-1)S$, the phase change of the transformed wavefront can also be considered as a hologram of two interfering wavefronts, the object beam denoted by V and the "S-beam" denoted by U, as seen in FIG. 18. If the object plane is limited by an iris, the imaging system images the object, generating the object's image 1900, limited by the iris image 1902, in the image plane. As a result, the amplitude of S can be reconstructed by the halo 1904 around the iris image 1902 using the method described hereinabove. The object beam can be reconstructed by electronically multiplying the intensity image measured with the reference beam, which is the S beam. The system thus requires only a single intensity map. FIG. 19 is an illustration of an illumination pattern in the image plane generated using an iris as described hereinabove.

Figure 20:
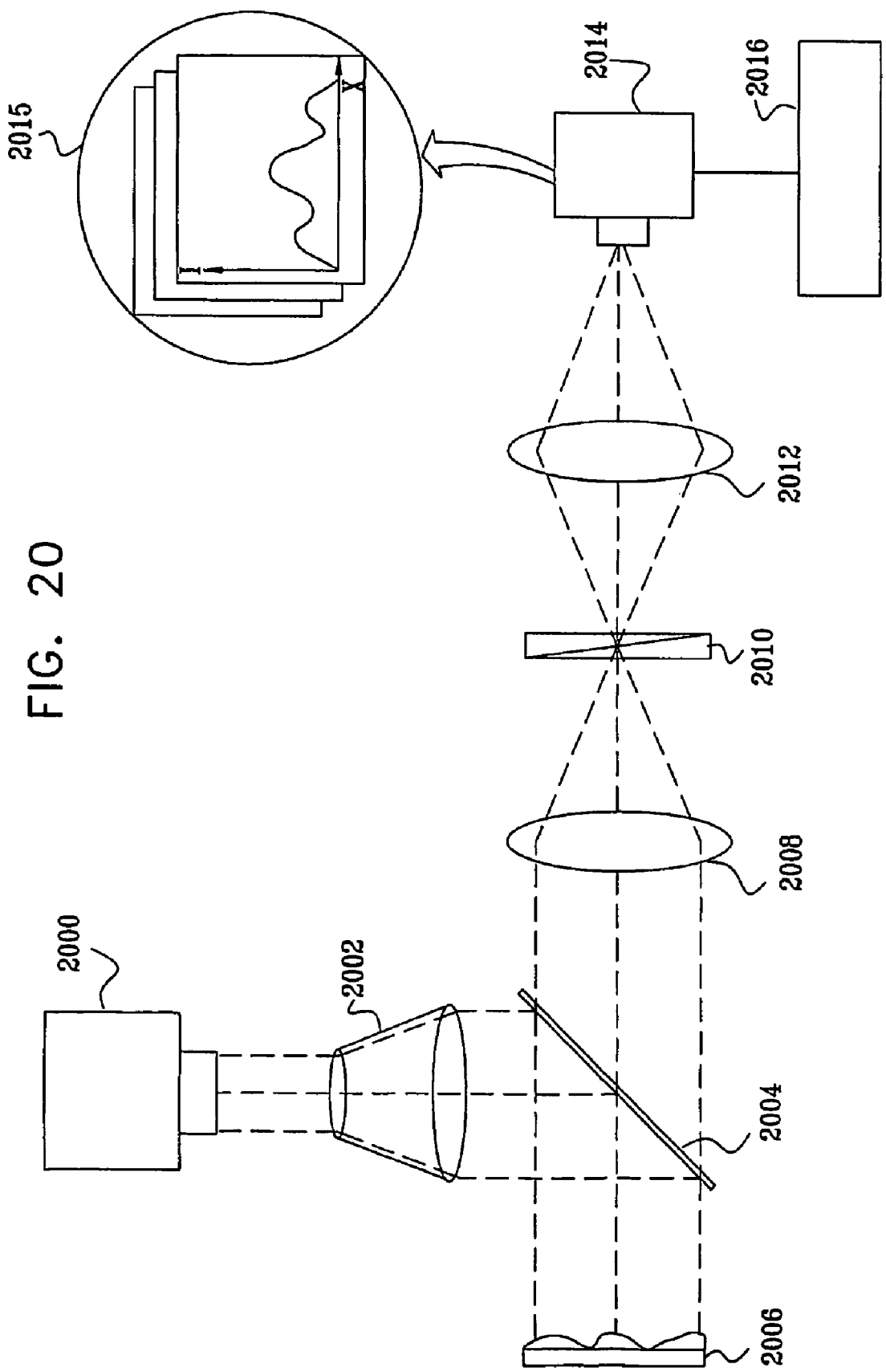
FIG. 20 is a simplified partially schematic, partially pictorial illustration of a system for surface mapping, employing the functionality and structure of FIGS. 1 and 2.

Reference is now made to FIG. 20, which is a simplified partially schematic, partially pictorial illustration of a system for surface mapping, employing the functionality and structure of FIGS. 1 and 2. As seen in FIG. 20, a beam of radiation, such as light or acoustic energy, is supplied from a radiation source 2000, optionally via a beam expander 2002, onto a beam splitter 2004, which reflects at least part of the radiation onto a surface 2006 to be inspected. The radiation reflected from the inspected surface 2006 is a surface mapping wavefront, which has an amplitude and a phase, and which contains information about the surface 2006. At least part of the radiation incident on surface 2006 is reflected from the surface 2006 and transmitted via the beam splitter 2004 and focused via a focusing lens 2008 onto a phase manipulator 2010, such as a spatial light modulator or a series of different transparent, spatially non-uniform objects, which is preferably located at the image plane of radiation source 2000. A second lens 2012 is arranged so as to image surface 2006 onto a detector 2014, such as a CCD detector. Preferably the second lens 2012 is arranged such that the detector 2014 lies in its focal plane. The output of detector 2014, an example of which is a set of intensity maps designated by reference numeral 2015, is preferably supplied to data storage and processing circuitry 2016, which preferably carries out the third sub-functionality described hereinabove with reference to FIG. 1, providing an output indicating at least one and possibly both of the phase and the amplitude of the surface mapping wavefront. This output is preferably further processed to obtain information about the surface 2006, such as geometrical variations and reflectivity of the surface. In accordance with a preferred embodiment of the illustrated embodiment, the phase manipulator 2010 applies a plurality of different spatial phase changes to the radiation wavefront reflected from surface 2006 and Fourier transformed by lens 2008. Application of the plurality of different spatial phase changes provides a plurality of differently phase changed transformed wavefronts which are subsequently detected by detector 2014.

Reference is now made to FIG. 21, which is a simplified partially schematic, partially pictorial illustration of a system for object inspection, employing the functionality and structure of FIGS. 1 and 2. As seen in FIG. 21, a beam of radiation, such as light or acoustic energy, is supplied from a radiation source 2100, optionally via a beam expander, onto at least partially transparent object to be inspected 2102. The radiation transmitted through the inspected object 2102 is an object inspection wavefront, which has an amplitude and a phase, and which contains information about the object 2102. At least part of the radiation transmitted through object 2102 is focused via a focusing lens 2104 onto a phase manipulator 2106, such as a spatial light modulator or a series of different transparent, spatially non-uniform objects, which is preferably located at the image plane of radiation source 2100. It is appreciated that phase manipulator 2106 can be configured such that a substantial part of the radiation focused thereonto is reflected therefrom. Alternatively the phase manipulator 2106 can be configured such that a substantial part of the radiation focused thereonto is transmitted therethrough. A second lens 2108 is arranged so as to image object 2102 onto a detector 2110, such as a CCD detector. Preferably, the second lens 2108 is arranged such that the detector 2110 lies in its focal plane. The output of detector 2110, an example of which is a set of intensity maps designated by reference numeral 2112, is preferably supplied to data storage and processing circuitry 2114, which preferably carries out the third sub-functionality described hereinabove with reference to FIG. 1, providing an output indicating at least one and possibly both of the phase and the amplitude of the object inspection wavefront. This output is preferably further processed to obtain information about the object 2102, such as a mapping of the object's thickness, refractive index or transmission.

Reference is now made to FIG. 22, which is a simplified partially schematic, partially pictorial illustration of a system for spectral analysis, employing the functionality and structure of FIGS. 1 and 2. As seen in FIG. 22, a beam of radiation, such as light or acoustic energy, is supplied from a radiation source to be tested 2200, optionally via a beam expander, onto a known element 2202, such as an Etalon or a plurality of Etalons. Element 2202 is intended to generate an input wavefront, having at least varying phase or intensity. The radiation transmitted through the element 2202 is a spectral analysis wavefront, which has an amplitude and a phase, and which contains information about the spectrum of the radiation source 2200. At least part of the radiation transmitted through element 2202 is focused via a focusing lens 2204 onto a phase manipulator 2206, such as a spatial light modulator or a series of different transparent, spatially non-uniform objects, which is preferably located at the image plane of radiation source 2200. It is appreciated that phase manipulator 2206 can be configured such that a substantial part of the radiation focused thereonto is reflected therefrom. Alternatively the phase manipulator 2206 can be configured such that a substantial part of the radiation focused thereonto is transmitted therethrough. A second lens 2208 is arranged so as to image element 2202 onto a detector 2210, such as a CCD detector. Preferably, the second lens 2208 is arranged such that the detector 2210 lies in its focal plane. The output of detector 2210, an example of which is a set of intensity maps designated by reference numeral 2212, is preferably supplied to data storage and processing circuitry 2214, which preferably carries out the third sub-functionality described hereinabove with reference to FIG. 1, providing an output indicating at least one and possibly both of the phase and the amplitude of the spectral analysis wavefront. This output is preferably further processed to obtain information about the radiation source 2200, such as the spectrum of the radiation supplied from radiation source 2200.

Reference is now made to FIG. 23, which is a simplified illustration of combining a wavefront-analysis system and an optical imaging system in accordance with yet another preferred embodiment of the present invention.

As described hereinabove, a variety of wavefront analysis methods exist, analyzing wavefronts reflected from or transmitted through an object, such as interferometry, and the wavefront analysis methods described hereinabove. The present invention, provides embodiments to combine these wavefront analysis methods with a variety of imaging methods and apparatuses, such as optical microscopes. Combining these two functionalities, such that a wavefront to be analyzed is imaged through the imaging system, and subsequently analyzed by a wavefront analysis functionality, allows wavefront analysis of the imaged object rather than the original object. The imaged object has several identical features to the original object, but some differences, such as different magnification, that facilitate the wavefront analysis. The wavefront analysis is thus performed on an image of the object to be inspected, where the image, and thus the wavefront to be analyzed, is obtained by the imaging system, such as a microscope or another imaging system. The image wavefront, which is the wavefront that is analyzed after propagation through the imaging system, is related to the original wavefront, and thus applying the wavefront analysis functionality to the image wavefront provides information about the original wavefront. The combination of the imaging and wavefront analysis functionalities can be performed based on any conventional wavefront analysis method and any conventional imaging system.

As seen in FIG. 23, this embodiment of the present invention includes two functionalities, an imaging functionality and an image wavefront analysis functionality. A wavefront to be analyzed 2310 is imaged by the imaging functionality 2320 resulting in an image wavefront 2330. The image wavefront 2330 is analyzed by an image wavefront analysis functionality 2340, and the resulting information about the wavefront is subsequently processed and stored, by a data storage and processing component 2350. It is noted that imaging functionality 2320 and image wavefront analysis functionality 2340 may be embodied in an integrated system, where the image wavefront 2330 is generated internally within the system.

The wavefront to be analyzed 2310 can be any suitable wavefront, such as a wavefront reflected from an object to be inspected, a wavefront transmitted through an object to be inspected, or a wavefront impinging on a known object from a radiation source to be spectrally analyzed. The imaging functionality 2320 and the image wavefront analysis functionality 2340 may be independent, both in hardware and in performance. Thus, various conventional imaging systems can be used for the imaging functionality 2320. Additionally, various wavefront analysis systems can be used for the image wavefront analysis functionality 2340, where the image wavefront analysis functionality 2340 provides a quantitative wavefront analysis of the image wavefront 2330 obtained by the imaging functionality 2320.

In another embodiment of the present invention, the interface between the imaging functionality 2320 and the wavefront analysis functionality 2340 is identical to the interface between an imaging system and a CCD camera. Furthermore, the wavefront analysis module may be identical in size, mechanical interfaces, optical interfaces, functionality and form, to a CCD camera.

In accordance with still another preferred embodiment of the present invention, the intermediate image obtained by the imaging functionality 2320 at the image plane, serves as an "object" for the image wavefront analysis functionality 2340. This image plane contains the image wavefront 2330, which is subsequently analyzed by the image wavefront analysis functionality 2340. It should be noted that according to the present invention, the image wavefront analysis functionality 2340 can be operated in any plane of the imaging functionality and need not necessarily operate on the image plane.

In accordance with yet another embodiment of the present invention the imaging functionality 2320 and the image wavefront analysis functionality 2340 are combined by incorporating a wavefront analysis system into any existing imaging system, in particular, an optical imaging system such as an optical microscope. In this embodiment, the wavefront emerging from the existing optical system is the image wavefront 2330, which is subsequently analyzed by the image wavefront analysis functionality 2340. This embodiment enables transforming existing imaging systems into wavefront analysis systems.

In accordance with another preferred embodiment of the present invention, the imaging functionality 2320 is realized by a microscope, and the image wavefront 2330 is the wavefront imaged by the microscope. Alternatively, the imaging functionality 2320 is realized by any other optical system, such as a simple lens or a telescope.

In accordance with a further preferred embodiment of the present invention, image wavefront analysis functionality 2340 is realized by the wavefront analysis system described hereinabove with reference to FIGS. 1 and 2 and as detailed in PCT Application No. PCT/IL/01/00335, and in U.S. Provisional Patent Applications, Ser. Nos. 60/351,753 and 60/406,593, of the present assignee, the disclosures of which are hereby incorporated by reference. Alternatively, the image wavefront analysis functionality 2340 is realized by any conventional wavefront analysis method, such as white light interferometry, phase shift interferometry, phase-contrast, DIC, spectral measurements, polarization measurements and Shack-Hartman.

In accordance with another embodiment of the present invention, the image wavefront analysis functionality 2340 is realized by manipulating the phase, amplitude and/or polarization of part of the image wavefront 2330, after propagating the image wavefront to a certain plane. Alternatively, the image wavefront analysis functionality 2340 is realized by manipulating the phase, amplitude and/or polarization of part of the image wavefront 2330 at the image plane of imaging functionality 2320, before propagating the image wavefront to another plane.

The wavefront analysis system of the present invention may be applied for various usages, such as object inspection, i.e. analyzing the wavefront impinging on an object to be inspected, intensity retrieval, phase retrieval, polarization retrieval and/or spectral analysis.

In accordance with a preferred embodiment of the present invention, the intermediate image is generated by a microscope using a variety of objectives which may be switched or interchanged without affecting the functionality of the wavefront analysis module. These objectives may be any suitable objectives, such as commercial objectives, custom designed objectives, etc. Additionally, the intermediate image generated by the microscope using a variety of objectives may have a variety of optical parameters including various magnifications, working distances, exit pupil locations and numerical apertures.

In accordance with another preferred embodiment of the present invention, the imaging functionality 2320 may generate the image wavefront 2330 by using a variety of objectives or lenses, which may be switched or interchanged without affecting the image wavefront functionality 2340. The objectives or lenses may be any suitable objectives or lenses such as commercial objectives or lenses, custom designed objectives or lenses, etc. Additionally, the imaging functionality 2320 may have a variety of optical parameters including various magnifications, working distances, exit pupil locations and numerical apertures.

In accordance with yet another embodiment of the present invention, the imaging functionality 2320 that generates the image wavefront 2330 includes additional optical elements in the main optical branch that provide an optical alignment function. Alternatively, the additional optical elements are provided in an additional optical branch.

In accordance with a preferred embodiment of the present invention, the wavefront analysis system includes a light source. Preferably, the light source is monochromatic with high temporal coherence. Alternatively, the light-source is a partially coherent or non-coherent light source with one or more wavelengths.

In accordance with another preferred embodiment of the present invention, the wavefront analysis system includes an illumination module. Preferably, the illumination module is generated by a highly spatial coherent light source such as a point light source or parallel illumination. Alternatively, the illumination is generated by a light source with another spatial shape, such as a line or more than one point, with lower spatial coherence.

In accordance with still another preferred embodiment of the present invention, the image wavefront 2330 is the wavefront of the image obtained by the imaging functionality in the image plane. Alternatively, the image wavefront 2330 is the wavefront obtained in an arbitrary optical plane of the imaging functionality. Additionally, the image wavefront 2330 can be propagated to any other desired plane, using known formulas, and subsequently analyzed by the image wavefront analysis functionality 2340. Alternatively, the image wavefront analysis functionality 2340 includes a sub-functionality that propagates the image wavefront to any other desired plane, using known formulas, and subsequently analyzes the propagated wavefront.

Figure 24:
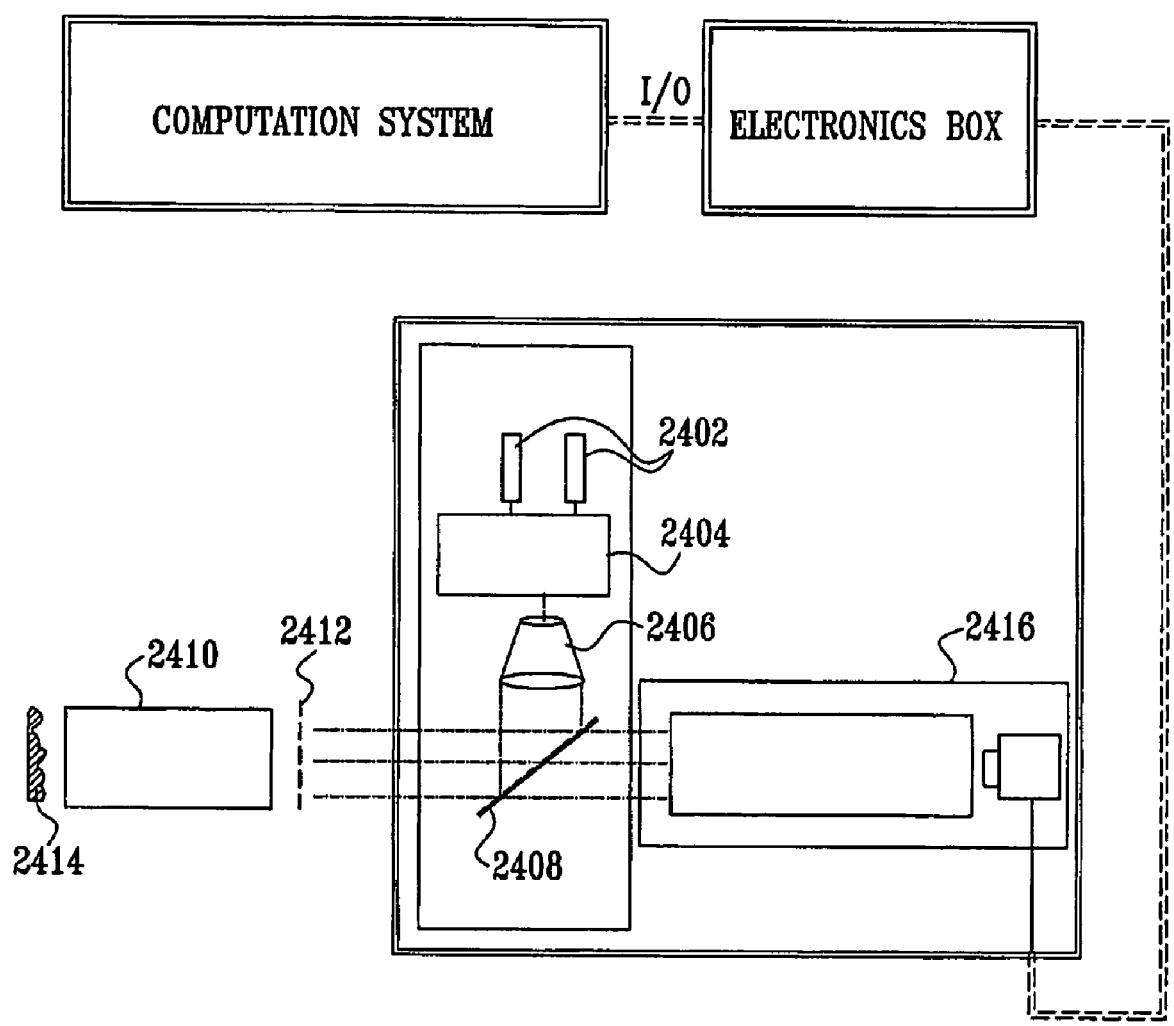
FIG. 24 is a general block diagram of the components of a preferred embodiment of a wavefront analysis module performing the imaged wavefront analysis functionality of FIG. 23.

Reference is now made to FIG. 24, which includes a general block diagram of the components of a preferred embodiment of a wavefront analysis module performing the image wavefront analysis functionality 2340. As seen in FIG. 24, the illumination module consists of two different light sources 2402 with two different wavelengths. The illuminations from the two light sources are combined by a beam combiner 2404 or other conventional device and are collimated by a collimator 2406. The collimated beam is reflected or transmitted by a beam splitter 2408 into an imaging system 2410, such as a microscope, through the image plane 2412 and propagated through the components of the imaging system 2410 to illuminate an object to be inspected 2414. The reflected light from the object constitutes the wavefront to be analyzed. This wavefront, after propagating through the imaging system 2410, forms an image of the object in the microscope's image plane 2412. This imaging system 2410 is equivalent to imaging functionality 2320 of FIG. 23. The image wavefront serves as an object for the image wavefront analysis module 2416 and is analyzed by the wavefront analysis module, including obtaining intensity maps by a camera, and analyzing the intensity maps by an electronics system and a computation system.

In accordance with yet another embodiment of the present invention, the wavefront measurement methods and systems described hereinabove may be incorporated into existing imaging systems and methods. In this embodiment, light is transmitted through or reflected from an object to be inspected, and an image of the object to be inspected, and the wavefront to be analyzed, is obtained by an optical system, such as a microscope or another imaging system. This is achieved by incorporating the wavefront analysis system into any existing optical system, or in the design of an optical system, in particular an imaging system. The wavefront emerging from the existing optical system is then analyzed by the wavefront analysis system.

In one example of the above, the wavefront analysis system is incorporated, as an add-on module, to an existing microscope, such as a microscope imaging objects by reflecting light, a microscope transmitting light through an inspected object or a microscope providing both transmission and reflection. The phase changes of the wavefront analysis system are performed to the transformed wavefronts emerging from the microscope. The magnification of the wavefront analysis system can be times one magnification, 1×, or any other magnification, where the overall magnification of the combined microscope and wavefront analysis system is the product of the magnification of the wavefront analysis system and the magnification of the microscope. In this embodiment, only a single magnification of the wavefront analysis system is required, and different overall magnifications, resulting in different fields of view and different lateral resolutions, can be obtained by switching the magnifications of the microscope, for example, by changing objective lenses. The interface between the wavefront analysis system and the microscope is similar to the interface of a CCD camera and the microscope, where the wavefront to be analyzed is the wavefront related to the 'image' of the original object that would be in the image plane of the CCD camera. If an iris is used to block an area of the inspected object, it is placed in the image plane, where the image of the object is obtained by the microscope. Additionally, an illumination system can be incorporated into the wavefront analysis system, where the illumination light passes through the microscope, reflects from the inspected object back through the microscope and into the wavefront analysis system. In another embodiment a separate illumination system, or the illumination system of the microscope, is used to reflect light from the object or transmit light through it and thus generate the original wavefront that is imaged and analyzed.

In a further embodiment, the module performing the phase manipulations, such as a spatial light modulator, can be inserted into an existing microscope or other imaging device, in various locations, such as in the Fourier plane of the imaging objective, using the original optical components of the existing optical systems.

In any of the above implementations, the light source can be the original light source of the existing optical systems, used with or without modifications, or a dedicated light source added to the system.

The wavefront analysis system is an imaging system, where intensity images of the phase changed transformed wavefronts of the object are obtained, for example by a camera. These intensity images are utilized to reconstruct the wavefront. Since the wavefront analysis system is an imaging system, it can be adjusted to obtain a focused imagine at a variety of distances to the object. Therefore, the wavefront analysis system can also be used for analyzing wavefronts of distant objects.

Figure 25:
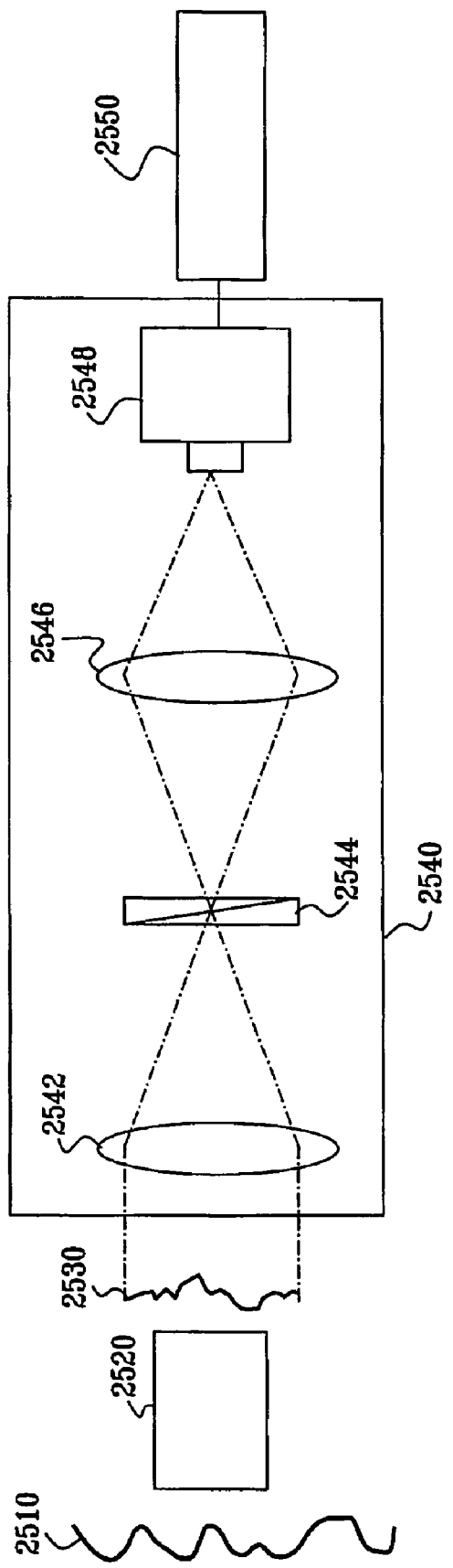
FIG. 25 is a simplified partially schematic, partially block diagram illustration of a wavefront analysis system including an imaging functionality and a phase manipulated based imaged wavefront analysis functionality of the type described in FIG. 23.

Reference is now made to FIG. 25, which is a simplified partially schematic, partially block diagram illustration of a wavefront analysis system including an imaging functionality and a phase manipulated based image wavefront analysis functionality of the type described with reference to FIG. 23. As seen in FIG. 25, an enhanced wavefront analysis system includes an imaging functionality and an image wavefront analysis functionality. The wavefront to be analyzed 2510 is imaged by the imaging functionality 2520 resulting in an image wavefront 2530. The image wavefront 2530 is analyzed by an image wavefront analysis functionality 2540, and the resulting information about the image wavefront 2530 is subsequently processed and stored by the data storage and processing component 2550. It is noted that imaging functionality 2520 and image wavefront analysis functionality 2540 may be embodied as an integrated system, where the image wavefront 2530 is generated internally. A different scale and magnification may be obtained by imaging the wavefront to be analyzed 2510 through imaging system 2520.

As seen in FIG. 25, image wavefront analysis functionality 2540 includes focusing image wavefront 2530, preferably using a lens 2542, onto a manipulator 2544, which is preferably located at the focal plane of lens 2542. The manipulator 2544, such as a spatial light modulator or a series of different transparent, spatially non-uniform objects, generates an optical manipulation, such as a phase change. A second lens 2546 is arranged to image the image wavefront 2530 onto a detector 2548, such as a CCD detector. The wavefront to be analyzed 2510 is thus re-imaged onto detector 2548. Preferably, the second lens 2546 is arranged such that the detector 2548 lies in the imaging plane of the image wavefront 2530.

The wavefront to be analyzed 2510 can be any suitable wavefront, such as a wavefront reflected from an object to be inspected, a wavefront transmitted through an object to be inspected, or a wavefront impinging on a known object from a radiation source to be spectrally analyzed. The imaging functionality 2520 and the image wavefront analysis functionality 2540 may be independent of one another, both in hardware and in performance. Thus various conventional imaging systems can be used for the imaging functionality 2520.

In another embodiment of the present invention, the interface between the imaging functionality 2520 and the image wavefront analysis functionality 2540 is identical to the interface between an imaging system and a CCD camera. Furthermore, the wavefront analysis module can be identical in size, mechanical interfaces, optical interfaces, functionality and form to a CCD camera.

In accordance with still another preferred embodiment of the present invention, an intermediate image, obtained by the imaging functionality 2520 at its image plane, serves as an "object" for the image wavefront analysis functionality 2540. This image plane contains the image wavefront 2530, which is subsequently analyzed by the image wavefront analysis functionality 2540. It should be noted that according to the present invention, the image wavefront analysis functionality 2540 can be operated in any plane of the imaging functionality and need not necessarily operate on the image plane.

In accordance with another embodiment of the present invention the imaging functionality 2520 and the image wavefront analysis functionality 2540 are combined by incorporating a wavefront analysis system into any existing imaging system, in particular, an optical imaging system such as an optical microscope. In this embodiment, the wavefront emerging from the existing optical system is the image wavefront, which is subsequently analyzed by the image wavefront analysis functionality 2540. This embodiment enables transforming existing imaging systems into wavefront analysis systems.

In accordance with yet another preferred embodiment of the present invention, the manipulator 2544 is located at the effective focal plane of the combined optics contained in the imaging functionality 2520 and lens 2542.

In accordance still another embodiment of the present invention, the wavefront analysis functionality 2540 analyzing the image wavefront 2530 obtained by the imaging functionality 2520 is implemented by any wavefront analysis method or apparatus described in PCT Application No. PCT/IL/01/00335 or any wavefront analysis method or apparatus described in U.S. Provisional Patent Applications, Ser. Nos. 60/351,753 and 60/406,593, of the present assignee.

In accordance with another preferred embodiment of the present invention, the image wavefront analysis functionality 2540 analyzing the image wavefront 2530 obtained by the optical system 2520 is implemented by any wavefront analysis method or apparatus which is accomplished by manipulating the phase, amplitude and/or polarization of part of the image wavefront 2530. This manipulation of the phase, amplitude and/or polarization may be performed in the image plane of the imaging system before propagating the image wavefront to another plane or after propagating the wavefront to a desired plane.

In accordance with yet another preferred embodiment of the present invention, the imaging functionality 2520 is realized by a microscope, and the image wavefront 2530 is the wavefront imaged by the microscope. Alternatively, the imaging functionality 2520 is realized by any other optical system, such as a simple lens or a telescope.

In accordance with a further preferred embodiment of the present invention, the intermediate image is generated by the imaging system 2520 by using a variety of objectives where the various objectives may be switched or interchanged without affecting the functionality of the image wavefront analysis module 2540. The objectives may be any suitable objectives such as commercial objectives, custom designed objectives, etc. Additionally, the intermediate image generated by the imaging system 2520 using a variety of objectives, may have a variety of optical parameters including various magnifications, working distances, exit pupil locations and numerical apertures.

In accordance with a preferred embodiment of the present invention, the image wavefront 2530 is the wavefront of the image obtained by the imaging functionality in the image plane. Alternatively, the image wavefront 2530 is the wavefront obtained in an arbitrary optical plane of the imaging functionality. Additionally, the image wavefront 2530 can be propagated to any other desired plane, using known formulas, and subsequently analyzed by the image wavefront analysis functionality 2540. Alternatively, the image wavefront analysis functionality 2540 includes a sub-functionality that propagates the image wavefront to any other desired plane using known formulas, and subsequently analyzes the propagated wavefront.

The imaging functionality 2520 that generates the image wavefront 2530 preferably includes a light source. The light source may be a monochromatic light source with high temporal coherence or a partial or non coherent light source with one or more wavelengths. The illumination may be generated by a light source providing high spatial coherence such as a point light source or parallel illumination, or with light sources of other spatial shapes with lower spatial coherence, such as a line light source or a multipoint light source.

In accordance with yet another embodiment of the present invention, any wavefront analysis method or apparatus described in PCT Application No. PCT/IL/01/00335 or in U.S. Provisional Patent Applications, Ser. Nos. 60/351,753 or 60/406,593, of the present assignee, may be applied at an image plane of an object to be inspected, and thus operate on an image wavefront.

Figure 26:
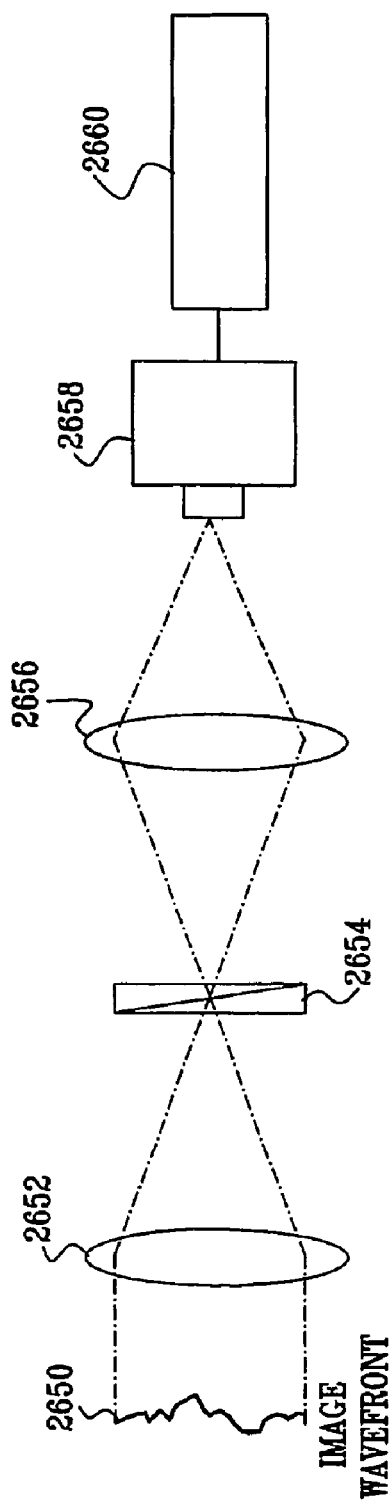
FIG. 26 is a simplified partially schematic, partially block diagram illustration of a wavefront analysis system operating on an imaged wavefront and forming the imaged wavefront analysis functionality of FIG. 23.

Reference is now made to FIG. 26, which is a simplified partially schematic, partially block diagram illustration of a wavefront analysis system operating on an image wavefront. This embodiment provides enhanced methods and apparatus for wavefront analysis, 3D measurement and spectral analysis, based on analyzing an image wavefront.

As seen in FIG. 26, an image wavefront 2650, which can be obtained such as by imaging a wavefront through an imaging system, is focused by a lens 2652, onto a manipulator 2654, such as a spatial light modulator or a series of different transparent, spatially non-uniform objects, preferably located at the focal plane of lens 2652, which generates optical manipulations such as phase changes. A second lens 2656 is arranged so as to image wavefront 2650 onto a detector 2658, such as a CCD detector. Preferably the second lens 2656 is arranged such that the detector 2658 lies in its focal plane. The output of detector 2658 is preferably supplied to data storage and processing circuitry 2660. Analyzing an image wavefront allows the wavefront analysis module to be located at a more convenient location rather than in proximity to the original object being analyzed.

Preferably, the wavefront analysis system of FIG. 26 is combined into any existing imaging system, in particular, an optical imaging system such as an optical microscope. In this embodiment, the wavefront emerging from the existing optical system is the image wavefront 2650, which is subsequently analyzed by a wavefront analysis system. This embodiment enables transforming existing imaging systems into wavefront analysis systems.

The image wavefront 2650 can be any suitable image wavefront, such as a wavefront reflected from an object to be inspected, a wavefront transmitted through an object to be inspected, or a wavefront impinging on a known object from a radiation source to be spectrally analyzed. The image wavefront analysis functionality can be completely independent of the wavefront origination and on the nature of the imaging. Various conventional imaging systems can be used to generate the image wavefront 2650.

In accordance with a preferred embodiment of the present invention, the image wavefront 2650 serves as an "object" for the image wavefront analysis functionality. The image wavefront 2650 is subsequently analyzed by the image wavefront analysis functionality. It should be noted that the image wavefront can be at any plane of an imaging functionality and not necessarily be on the image plane.

Figure 27:
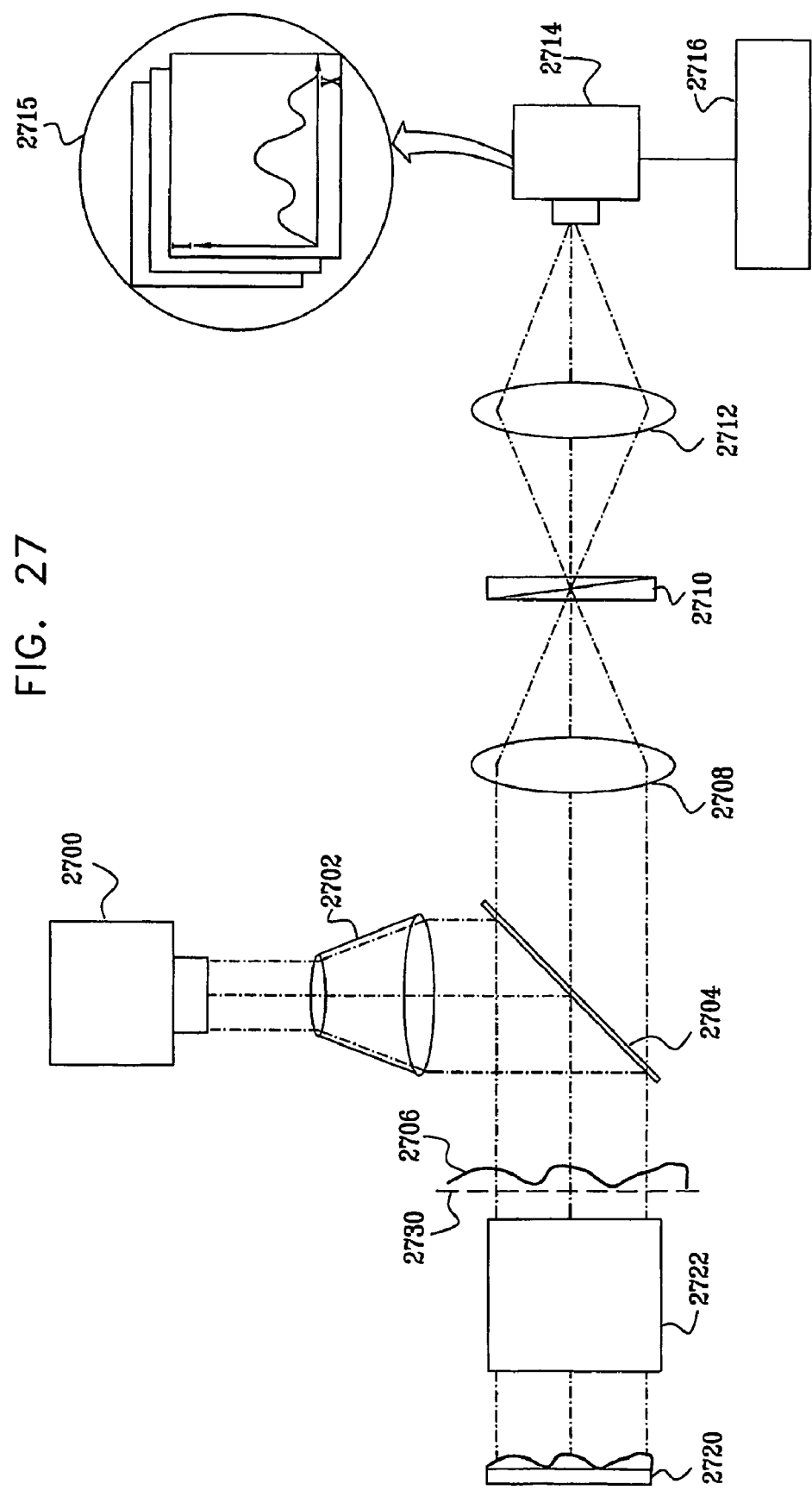
FIG. 27 is a simplified partially schematic, partially pictorial illustration of a system for surface mapping, employing the functionality and structure of FIG. 25.

Reference is now made to FIG. 27, which is a simplified partially schematic, partially pictorial illustration of a system for surface mapping, employing the functionality and structure of FIG. 25. As seen in FIG. 27, a beam of radiation, such as light or acoustic energy, is supplied from a radiation source 2700, optionally via a beam expander 2702, onto a beam splitter 2704, which reflects at least part of the radiation through the imaging system image plane 2730 and through the imaging system 2722 onto a surface of an object 2720 to be inspected. The radiation reflected from the inspected surface 2720 is a surface mapping wavefront, which has an amplitude and a phase, and which contains information about the surface 2720. The imaging system 2722 produces an image 2706 of the object 2720 in the image plane 2730. The image plain 2730 contains an image surface mapping wavefront, which has an amplitude and a phase, and which contains information about the surface 2720. At least part of the radiation propagrating from the image plane 2730 is transmitted via the beam splitter 2704 and focused via a focusing lens 2708 onto a phase manipulator 2710, such as a spatial light modulator or a series of different transparent, spatially non-uniform objects, which is preferably located at the image plane of radiation source 2700. A second lens 2712 is arranged so as to image the image plane 2730 onto a detector 2714, such as a CCD detector. Preferably the second lens 2712 is arranged such that the detector 2714 lies in its focal plane. The output of detector 2714, an example of which is a set of intensity maps designated by reference numeral 2715, is preferably supplied to data storage and processing circuitry 2716, which preferably carries out the third sub-functionality described hereinabove with reference to FIG. 1, providing an output indicating at least one and possibly both of the phase and the amplitude of the image surface mapping wavefront. This output is preferably further processed to obtain the phase and the amplitude of the surface mapping wavefront and thus information about the object 2720, such as geometrical variations and reflectivity of the surface. In accordance with a preferred embodiment of the mentioned invention, the phase manipulator 2710 applies a plurality of different spatial phase changes to the radiation wavefront propagates from surface 2720 and Fourier transformed by lens 2708. Application of the plurality of different spatial phase changes provides a plurality of differently phase changed transformed wavefronts which may be subsequently detected by detector 2714.

Figure 28:
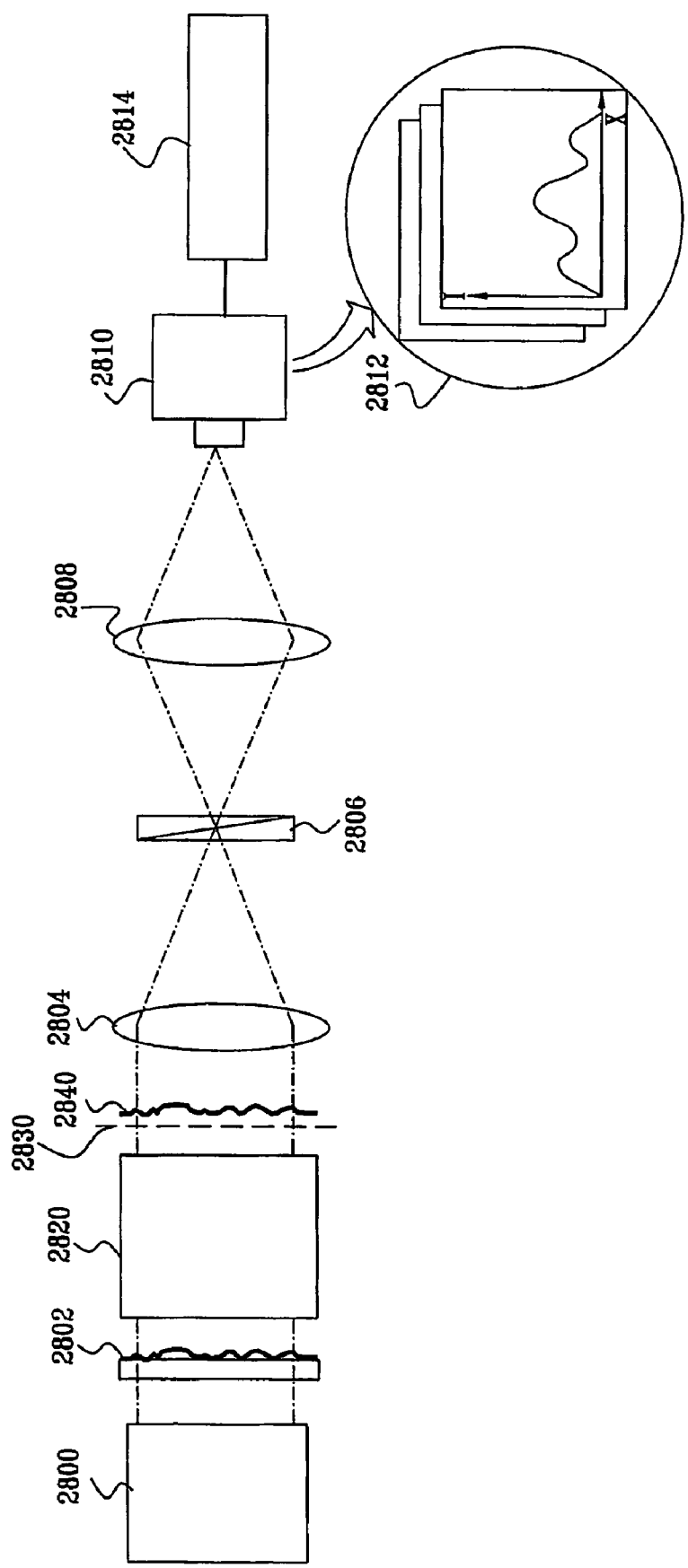
FIG. 28 is a simplified partially schematic, partially pictorial illustration of a system for object inspection employing the functionality and structure of FIG. 25.

Reference is now made to FIG. 28, which is a simplified partially schematic, partially pictorial illustration of a system for object inspection employing the functionality and structure of FIG. 25. As seen in FIG. 28, a beam of radiation, such as light or acoustic energy, is supplied from a radiation source 2800, optionally via a beam expander, onto at least partially transparent object to be inspected 2802. The radiation transmitted through the inspected object 2802 is an object inspection wavefront, which has an amplitude and a phase, and which contains information about the object 2802. At least part of the radiation transmitted through object 2802 is transmitted through the imaging system 2820 and the object's image is obtained in an image plane 2830 of the imaging system. The wavefront image plane 2830 contains an image object inspection wavefront 2840, which has an amplitude and a phase, and which contains information about the object 2802. The radiation propagated through the image plane 2830 is focused via a focusing lens 2804 onto a phase manipulator 2806, such as a spatial light modulator or a series of different transparent, spatially non-uniform objects, which is preferably located at the image plane of radiation source 2800. It is appreciated that phase manipulator 2806 can be configured such that a substantial part of the radiation focused thereonto is reflected therefrom. Alternatively the phase manipulator 2806 can be configured such that a substantial part of the radiation focused thereonto is transmitted therethrough. A second lens 2808 is arranged so as to image the image plane 2830 onto a detector 2810, such as a CCD detector. Preferably, the second lens 2808 is arranged such that the detector 2810 lies in its focal plane. The output of detector 2810, an example of which is a set of intensity maps designated by reference numeral 2812, is preferably supplied to data storage and processing circuitry 2814, which preferably carries out the third sub-functionality described hereinabove with reference to FIG. 1, providing an output indicating at least one and possibly both of the phase and the amplitude of the image object inspection wavefront 2840. This output is preferably further processed to obtain the phase and amplitude of the surface mapping wavefront and thus information about the object 2802, such as a mapping of the object's thickness, refractive index or transmission.

Figure 29:
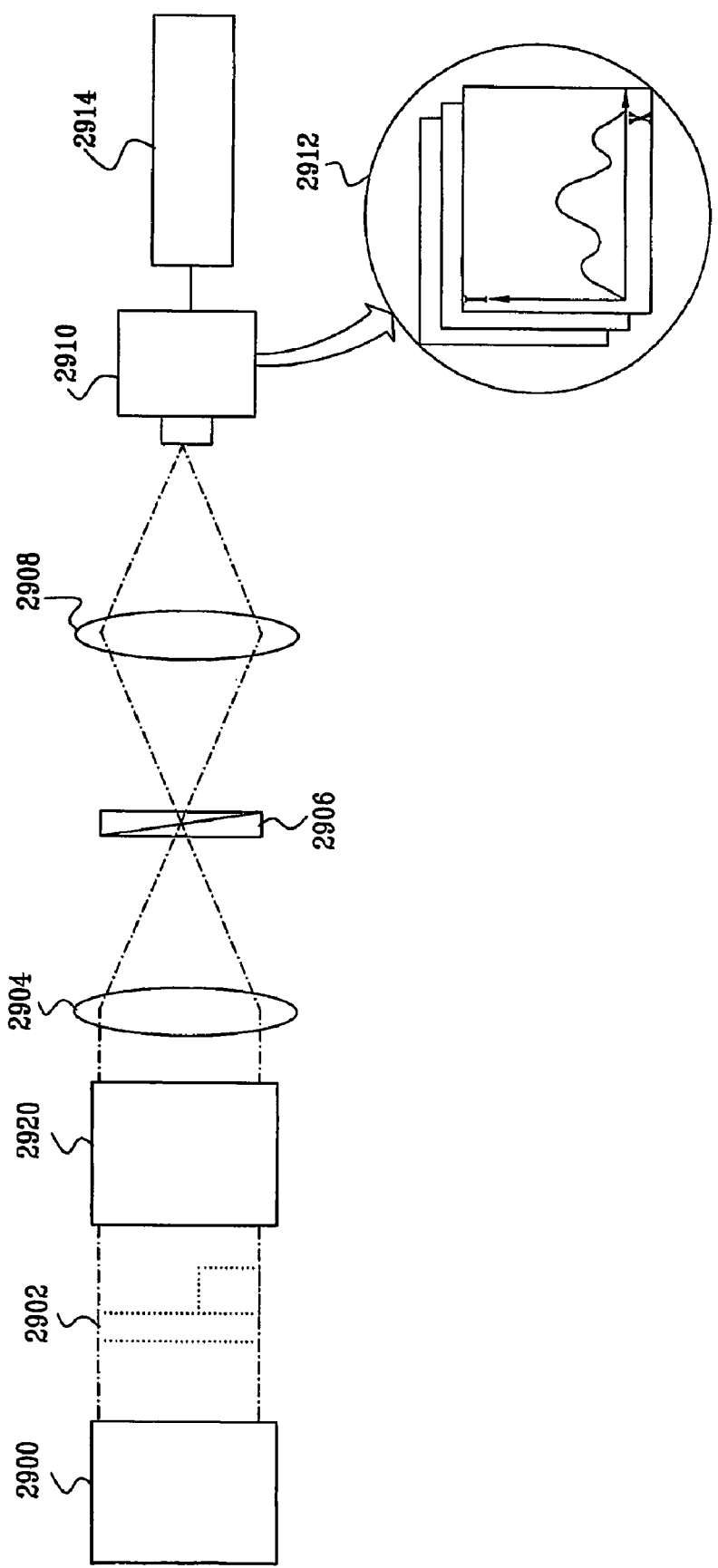
FIG. 29 is a simplified partially schematic, partially pictorial illustration of a system for spectral analysis employing the functionality and structure of FIG. 25.

Reference is now made to FIG. 29, which is a simplified partially schematic, partially pictorial illustration of a system for spectral analysis employing the functionality and structure of FIG. 25. As seen in FIG. 29, a beam of radiation, such as light or acoustic energy, is supplied from a radiation source to be tested 2900. The radiation propagates through a known element 2902, such as an Etalon or a plurality of Etalons. Element 2902 is intended to generate an input wavefront, having at least varying phase or intensity. The radiation transmitted through the element 2902 is a spectral analysis wavefront, which has an amplitude and a phase, and which contains information about the spectrum of the radiation source 2900. The spectral analysis wavefront is subsequently imaged by imaging system 2920 to generate an image spectral analysis wavefront, which has an amplitude and a phase, and which contains information about the amplitude and phase of the spectral analysis wavefront. At least part of the radiation transmitted through element 2902 and imaged though imaging system 2920 is focused via a focusing lens 2904 onto a phase manipulator 2906, such as a spatial light modulator or a series of different transparent, spatially non-uniform objects, which is preferably located at the image plane of radiation source 2900. It is appreciated that phase manipulator 2906 can be configured such that a substantial part of the radiation focused thereonto is reflected therefrom. Alternatively, the phase manipulator 2906 can be configured such that a substantial part of the radiation focused thereonto is transmitted therethrough.

A second lens 2908 is arranged so as to image element 2902 onto a detector 2910, such as a CCD detector. Preferably, the second lens 2908 is arranged such that the detector 2910 lies in its focal plane. The output of detector 2910, an example of which is a set of intensity maps designated by reference numeral 2912, is preferably supplied to data storage and processing circuitry 2914, which preferably carries out the third sub-functionality described hereinabove with reference to FIG. 1, providing an output indicating at least one and possibly both of the phase and the amplitude of the image spectral analysis wavefront. This output is preferably further processed to obtain the phase and the amplitude of the spectral analysis wavefront and thus information about the radiation source 2900, such as the spectrum of the radiation supplied from radiation source 2900.

Preferably, the spectral analysis wavefront is obtained by reflecting the radiation supplied from the image of the radiation source 2900 by element 2902. Alternatively, the spectral analysis wavefront is obtained by transmitting the radiation supplied from the image of the radiation source 2900 through element 2902.

In accordance with an embodiment of the present invention, the beam of radiation supplied from radiation source 2900 comprises a plurality of different wavelength components, thereby providing a plurality of wavelength components in the spectral analysis wavefront and subsequently in the transformed wavefront impinging on phase manipulator 2906. In this case the phase manipulator may be an object, at least one of whose thickness, refractive index and surface geometry varies spatially. This spatial variance of the phase manipulator generates a different spatial phase change for each of the wavelength components, thereby providing a plurality of differently phase changed transformed wavefronts to be subsequently detected by detector 2910.

In accordance with another embodiment of the present invention, the phase manipulator 2906 comprises a plurality of objects, each characterized in that at least one of its thickness and refractive index varies spatially. The spatial variance of the thickness or of the refractive index of the plurality of objects may be selected in a way such that the phase changes applied by phase manipulator 2906 differ to a selected predetermined extent for at least some of the wavelength components supplied by radiation source 2900. The objects are specifically selected such that the phase change applied to an expected wavelength of the radiation source differs substantially from the phase change applied to an actual wavelength of the radiation source. Alternatively, the spatial variance of the thickness or refractive index of the plurality of objects may be selected in a way such that the phase changes applied by phase manipulator 2906 are identical for at least some of the plurality of different wavelength components supplied by radiation source 2900.

In accordance with yet another embodiment of the present invention, the known element 2902 comprises a plurality of objects, each characterized in that at least one of its thickness and refractive index varies spatially. The spatial variance of the thickness or of the refractive index of the plurality of objects may be selected in a way such that the wavelength components of the input wavefront, generated by passing the wavelength components of the radiation supplied by radiation source 2900 through the element 2902, differ to a selected predetermined extent for at least some of the wavelength components supplied by radiation source 2900. The objects are specifically selected such that the wavelength component of the input wavefront generated by an expected wavelength of the radiation source differs substantially from the wavelength component of the input wavefront generated by an actual wavelength of the radiation source. Alternatively, the spatial variance of the thickness or refractive index of the plurality of objects may be selected in a way such that the wavelength components of the input wavefront, generated by passing the wavelength components of the radiation supplied by radiation source 2900 through the element 2902, are identical for at least some of the wavelength components supplied by radiation source 2900.

Figure 30:
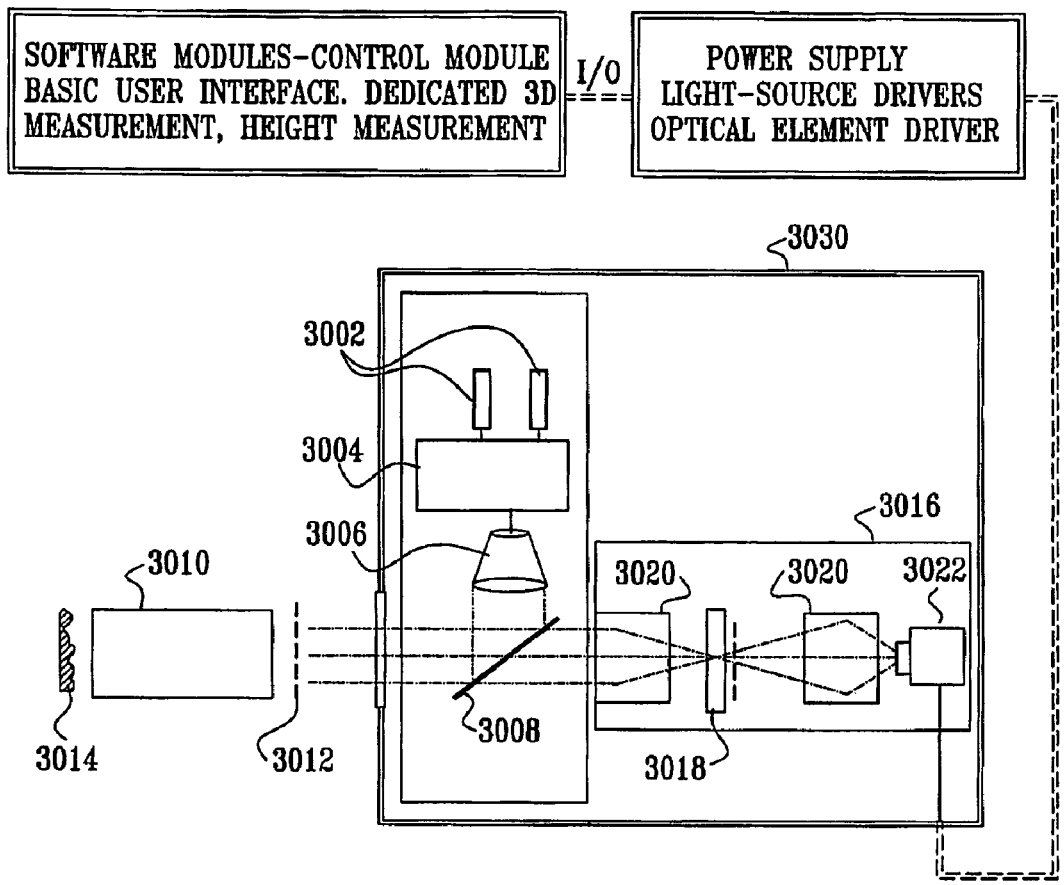
FIG. 30 is a general block diagram of the components of a preferred embodiment of a wavefront analysis module performing the imaged wavefront analysis functionality of FIG. 25.

Reference is now made to FIG. 30, which is a general block diagram of the components of a preferred embodiment of the wavefront analysis module performing the image wavefront analysis functionality of FIG. 25. As seen in FIG. 30, the illumination module consists of two different light sources 3002 with two different wavelengths. The illumination from the two light sources 3002 is combined by a beam combiner 3004 or other conventional device and is collimated by a collimator 3006. The collimated beam is coupled by a beam splitter 3008 into the microscope 3010 through the image plane 3012 and propagates through the microscope tube and illuminates the object 3014. The reflected light from the object forms an image of the object 3014 in the microscope's image plane 3012. This image's wavefront serves as an object for the wavefront analysis module 3016 and it is analyzed by the wavefront analysis module 3016.

Preferably, the wavefront analysis module 3016 will include an optical manipulator 3018, imaging optics 3020 and a CCD camera 3022, and additional components may be added for calibration of the optical manipulator location. Alternatively, additional optical elements may be included in the wavefront analysis module in order to adapt the first optical system's image plane and light source's image plane to the wavefront analysis module optical planes such as object's plane and the phase manipulator's plane. A field stop may be included in the intermediate image plane or in another plane within the optical head 3030. The wavefront analysis module can include electronic modules such as power supplies, light-source drivers and drivers for the optical element, as well as software modules such as control software, user interface software, dedicated 3D measurement software and data analysis.

Figure 31:
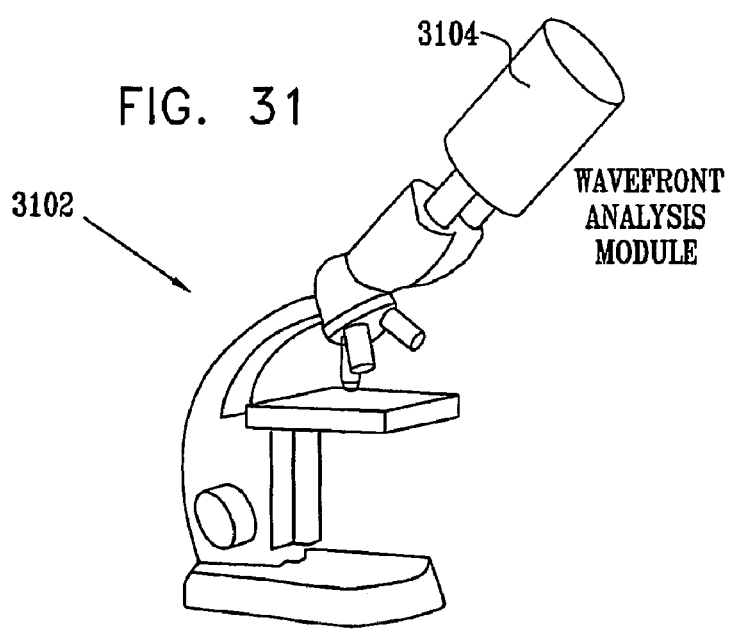
FIG. 31 is a simplified illustration of an existing microscope including a wavefront analysis module, in accordance with still another preferred embodiment of the present invention.

Reference is now made to FIG. 31, which is a simplified illustration of an existing microscope 3102, working in reflection or transmission mode, including a wavefront analysis module 3104, in accordance with still another preferred embodiment of the present invention. The wavefront analysis module 3104 preferably interfaces with the microscope 3102 similarly to a conventional CCD. The existing microscope 3102 performs an optical imaging of the object, and the wavefront analysis module 3104 provides a quantitative wavefront analysis of the optical image obtained by the microscope 3102, where in general the wavefront analysis module 3104 is independent of the imaging module of the microscope 3102, both in hardware and in performance.

In this embodiment, the intermediate image, obtained by the microscope 3102 at the image plane, serves as an "object" for the wavefront analysis module 3104 and the wavefront of the image is analyzed. The wavefront analysis module 3104 can be identical in size, mechanical interfaces, optical interfaces, functionality and form to a CCD camera, while additionally generating the wavefront analysis.

Preferably, the wavefront analysis module 3104 is mounted at the same location using the same mounting means as a conventional CCD camera, where the 'object plane' of the module is the image plane of the original CCD. In this embodiment, the same camera is used for acquiring the two dimensional conventional image and the intensity images for the wavefront analysis calculations. Alternatively, two cameras may be used, one for the wavefront analysis module and the second for the conventional two dimensional microscopy.

The light source utilized in this embodiment may be the microscope's light source or an additional light source. The illumination may be coupled to the microscope through the conventional coupling port or through any other suitable port such as illuminating the object through the image plane.

Additionally, the wavefront analysis module can be attached to any suitable imaging optical system such as a telescope.

Additionally, the wavefront analysis module, which analyzes the image's wavefront, may be implemented in any of the following modes, either alone or in combination. The wavefront analysis module may be added to a commercial microscope, where the optical imaging of the microscope, tube-lens and various objectives, is used for the two dimensional imaging and the wavefront analysis module analyses the image's wavefront. Preferably, the wavefront analysis module is mounted in the conventional CCD location. Additionally or alternatively, the wavefront analysis module is coupled directly to a commercial objective, to generate a complete wavefront analysis sensor. Alternatively or additionally, the wavefront analysis module is coupled to a set of various commercial objectives, such as with different magnifications, to generate a complete wavefront analysis sensor with various magnifications and lateral resolutions. Additionally or alternatively, various wavefront analysis sensors, all having the same basic wavefront analysis module, are combined with various two dimensional imaging objectives.

Preferably, lenses or other suitable optical elements may be added to the optical system in order to adapt the wavefront analysis module to any microscope or any other optical system. These lenses or other optical elements may be added to cancel spherical wavefronts of spherical objects, or to cancel wavefront deviations from a known wavefront, such as a plane wave, as in a Tewman-Green interferometer. Additionally or alternatively, additional imaging lenses or other optical elements may be added, such as simple off-the-shelf lenses, prisms or other optical elements, or custom made optical elements, which may have a variety of focal lengths and numerical apertures.

The wavefront analysis module can have various magnifications, where the overall system magnification is the product of the magnification of the imaging microscope and the magnification of the wavefront analysis module. In one embodiment of the present invention, the wavefront analysis module has a one times magnification, and the overall magnification of the system is determined by the magnification of the microscope imaging system.

In accordance with another preferred embodiment of the present invention, the wavefront analysis module will include an optical manipulator to manipulate the optical transform of the wavefront obtained by the microscope imaging system. The manipulations, of the wavefront's optical transform provided by the microscope imaging system, may be implemented in any of the following modes, either alone or in combination, using multiple sensors and multiple passive wavefront manipulators in multiple optical branches, using one sensor and one active wavefront manipulator, such as an active spatial light modulator, in one optical branch or using multiple sensors and multiple passive and active wavefront manipulators in multiple optical branches.

Preferably, the optical manipulator within the wavefront analysis module is located in any desired plane where optical transforms of the image's complex amplitude are obtained. Alternatively, the optical manipulator is located in the light source's image plane where the Fourier Transform of the image's complex amplitude is obtained.

Preferably, lenses or other suitable optical elements may be added to the optical system in order to adapt the optical manipulator to various objectives that do not have the same exit-pupil location.

In the present embodiment, the optical manipulator can perform at least one and possibly a combination of phase manipulation, intensity manipulation and polarization manipulation. When phase manipulation is required, the optical manipulator may be an active phase manipulator, such as a phase light modulator, or a passive phase manipulator, such as phase retarder. When intensity manipulation is required, the optical manipulator may be an active intensity manipulator, such as a masked phase manipulator.

Preferably, the image wavefront analysis functionality also includes an illumination radiation source, such as a light source, for generating the wavefront to be analyzed. Alternatively, the illumination is coupled to the imaging functionality microscope through an existing illumination coupling port of the imaging system, such as a microscope's conventional coupling port. Alternatively, the illumination is coupled through another suitable port, such as illuminating an object to be inspected through the image plane. Additionally or alternatively, the imaging functionality includes an illumination radiation source, such as a light source, for generating the wavefront to be analyzed. In this embodiment, the image wavefront analysis functionality can utilize this illumination to generate the wavefront to be analyzed.

Preferably, the illumination radiation source of the wavefront analysis system is a monochromatic light source. The light source can be of any temporal coherence—high, partial or none.

Preferably, the illumination radiation source of the wavefront analysis system is a light source including one major wavelength. Alternatively, various major wavelengths are presented.

Additionally or alternatively, the illumination radiation source of the wavefront analysis system is generated by various levels of spatially-coherent illumination having various shapes. These may include a highly spatial coherence light source, such as a point light source or an illumination generated by parallel illumination, a lower spatial coherence light source comprised of several point sources, or a very low spatial coherent light source comprised of an elongate shape. Preferably, the spatial manipulation of the optical manipulator is substantially identical in shape to the spatial shape of the illumination.

In accordance with one embodiment of the present invention, an existing microscope, working in reflection or transmission mode, generates an optical image of an illuminated object.

Preferably, the illumination light source that illuminates the object is the original microscope's light source. Alternatively, an additional light source is provided for the illumination of the wavefront analysis module. This illumination can be Koehler illumination, Critical illumination or any other suitable conventional illumination method. Alternatively, an illumination module may be provided as part of the wavefront analysis module or as an independent illumination module.

Preferably, the object's illumination is implemented using any wavelength in the electromagnetic spectrum that can be detected by a sensor.

In a further embodiment of the present invention, a camera, such as a CCD camera, is used for obtaining intensity maps of the image wavefront analysis functionality. Preferably, the same camera is used to obtain both the information on the wavefront to be analyzed, such as a conventional image, and the image wavefront, such as the intensity data for the wavefront analysis calculations. Alternatively, a separate camera, such as a CCD camera, is used for acquiring the results of the image wavefront analysis functionality. In this embodiment, two cameras are be used, one to obtain the conventional image and a second to obtain the intensity data for the wavefront analysis calculations. This two camera embodiment may be implemented, for example, by a dual port microscope. These cameras may be provided as part of the wavefront analysis module or may be a camera that can be independently mounted on the wavefront analysis module. Preferably, the camera consists of any chip-size of CCD, CMOS or other detecting technologies, and any number of pixels in any pattern.

In one embodiment of the present invention, an optical element or optical system may be inserted into the wavefront analysis module to view the optical manipulator plane.

Preferably, the imaged object can be tilted using a mechanical stage so as to minimize the tilt in the wavefront to be analyzed. Alternatively, the tilt minimization of the wavefront to be analyzed can be obtained by moving the optical manipulator perpendicular to the optical axis.

In another preferred embodiment of the present invention, the wavefront analysis system is combined with confocal microscopy. In this embodiment, the wavefront analysis system is implemented as a "4-F" imaging optical system, i.e. where tile distance between the object and the image equals 4 times the focal distance of the imaging objective lens. It is known that current imaging systems with high numerical apertures are sensitive to focal length variations. This results in an imaging optical system that can be used as a confocal microscope, which is very sensitive to focal length variations and is used for focal measurements, 3D measurements and slicing. In this embodiment, the confocal microscope characteristics are incorporated into a wavefront analysis system, which is designed to have high numerical aperture so that it is very sensitive to focal length variations. This combined confocal wavefront analysis system can measure the phase and amplitude of a reflected or transmitted wavefront, and also provides the advantages of a confocal microscope, with increased overall dynamic range, i.e. the overall 'depth' of the inspected object that can be measured. A "deep" object can be measured by slices, scanning in the Z dimension, where in each wavefront analysis measurement a different 'slice' is measured, and the entire object is measured similarly to confocal microscopy measurements.

In still another preferred embodiment of the present invention, the wavefront analysis system and method is combined with the Micro-Moiré lines method. In a wavefront analysis system using a single wavelength light source there is a $2\pi$ ambiguity in the results, i.e. the result obtained is modulo $2\pi$ of the real phase, when obtaining, the phase of the wavefront being analyzed. As a result, the dynamic range of measurements, in particular the surface difference between adjacent locations of the inspected object, is limited by the wavelength of the light source, since the height measured has also ambiguity. To increase the dynamic range of the measurements, required in many applications, this embodiment of the present invention combines a wavefront analysis system with the Moiré lines method for height measurements.

In the Moiré lines method, interference fringes or a grating are projected onto the object. The object is then viewed from another direction through another grating with the same spacing. The Moiré pattern obtained by the two interfering lines series is used to obtain the contour of the object. In the present embodiment, the object can be projected, as in the Moiré lines method, by interference fringes or grating lines and will be viewed by a sensor through another grating having the same spacing as the grating lines. The contours obtained by the Moiré pattern of the combined system are used to obtain the object surface topography with an increased measurement range, but with limited resolution, while the different intensity images of the wavefront analysis system portion of the combined system are used to obtain the object surface with a limited measurement range, but with increased resolution. Thus, in the combined method and system the object's surface topography is obtained in an increased measurement range and increase resolution.

Preferably, the projected lines are obtained by using two coherent light sources with a fixed lateral distance between them. The two beams interfere and a fringe pattern is obtained on the object surface. A line phase filter is introduced in the Fourier plane as described in reference to FIG. 4 hereinabove, so that the two beams will experience the same phase delays.

Alternatively, an image of a grating is projected on the object. Since the light illuminating the object is spatially modulated before illuminating the object, this process does not interfere with the phase-change analysis process of the wavefront analysis system.

Figure 32:
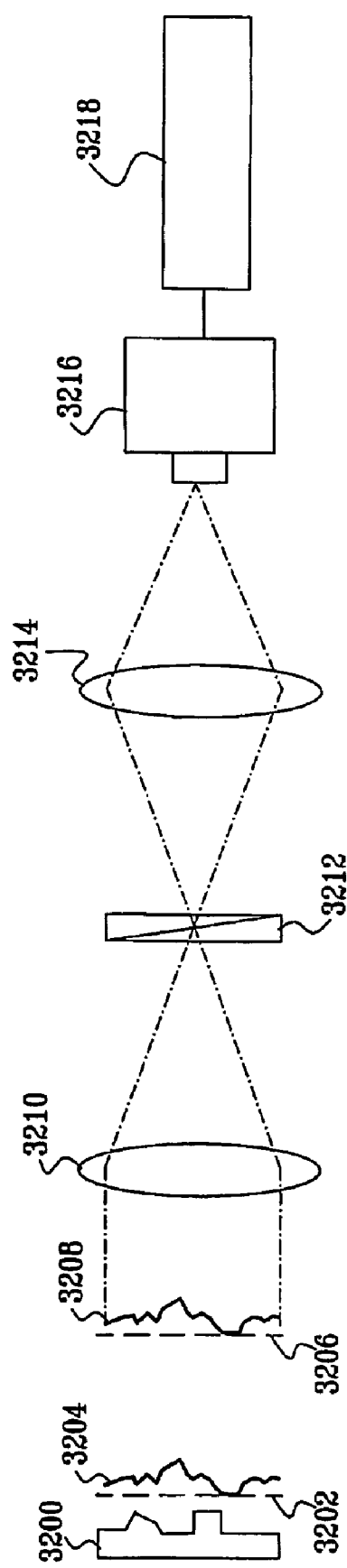
FIG. 32 is a simplified partially schematic, partially pictorial illustration of a wavefront analysis system operative to generate measurements in an extended Z range, constructed and operative in accordance with yet another preferred embodiment of the present invention.

Reference is now made to FIG. 32, which is a simplified partially schematic, partially pictorial illustration of a wavefront analysis system operative to generate measurements in an extended Z range, in accordance with yet another preferred embodiment of the present invention.

Current wavefront retrieval methods and algorithms include non-interferometric methods, such as Shack-Hartman and the Gerchberg and Saxton algorithm, as well as interferometric methods, such as Phase Shift Interferometry (PSI), Point Diffraction Interferometry (PDI), or other conventional methods. The prior PCT and U.S. Provisional Patent Applications of the assignee cited hereinabove, provide other wavefront analysis methodologies and systems, as well as systems and methodologies for surface mapping, phase change analysis, spectral analysis, object inspection, stored data retrieval, three-dimensional imaging and other suitable applications utilizing wavefront analysis. Conventional interferometric methods are limited in the extent of the measurement range due to the $2\pi$ ambiguity. The measurement range can be extended significantly using mechanical scanning, but this method for range extension is limited in the measurement range and is time consuming. It is known that Maxwell's equations have unique solutions, such that when a specific solution is known in an arbitrary plane, the solution in any other plane is determined.

In accordance with a preferred embodiment of the present invention, the radiation complex amplitude can be analyzed or retrieved at an arbitrary plane and it can be propagated to any other desired plane by propagation formulas, known in the art. There are several propagation formulas for a radiation complex amplitude propagation from a certain plane p1 to another plane p2, such as Fresnel Transform or Rayleigh-Sommerfeld and Kirchhof diffraction integrals. The Rayleigh-Sommerfeld diffraction integral is:

$$u(x, y, z) = \int\int [\tilde{U}(f_x, f_y)\exp(2\pi i f_z)]\exp(2\pi i(f_x x + f_y y))df_x df_y \quad (19.1)$$

where $$U(f_x, f_y) = \int\int u(x, y, 0)\exp[-2\pi i(f_x x + f_y y)]dx dy \quad (19.2)$$

$$f_z = \begin{cases} \left(\frac{1}{\lambda^2} - f_t^2\right)^{\frac{1}{2}} & \text{if } f_t^2 = f_x^2 + f_y^2 \leq \frac{1}{\lambda^2} \\ \left(f_t^2 - \frac{1}{\lambda^2}\right)^{\frac{1}{2}} & \text{if } f_t^2 = f_x^2 + f_y^2 \geq \frac{1}{\lambda^2} \end{cases} \quad (19.3)$$

Where
$u(x,y,0)$ is the radiation complex amplitude at each point (x,y) in the plane p1,
$u(x,y,z)$ is the radiation complex amplitude obtained at each point (x,y) in the plane p2,
z is the distance in the Z direction between planes p1 and p2, and
$\lambda$ is the wavelength.

The present invention enables an extended Z range of the wavefront analysis and retrieval to be obtained. For example, the complex amplitude of the wavefront can be retrieved by a conventional wavefront retrieval method in a certain plane. By propagating the calculated wavefront's complex amplitude by the propagation formulas to any other desired plane, an extended three dimensional and object's surface mapping range is obtained without the need for additional scanning.

As seen in FIG. 32, a wavefront 3204 is generated by object 3200 in a plane 3202. In plane 3202 the complex amplitude of the radiation can be described by the function $A(x,y)e^{i\Phi(x,y)}$. The complex amplitude of the radiation in plane 3202 propagates further to plane 3206, forming propagated wavefront 3208. As the wavefront's complex amplitude propagates, the amplitude and the phase are changed and a different complex amplitude, described by the function $A'(x,y)e^{i\Phi'(x,y)}$, is obtained at plane 3206. If the wavefront is known in a certain plane, it can be calculated in any other plane, by virtue of equations (19.1)-(19.3) above. The propagated wavefront 3208 is then focused, as by a lens 3210, onto a phase manipulator 3212, preferably located at the focal plane of lens 3210. A second lens 3214 is arranged so as to image the wavefront onto a detector 3216, such as a camera or CCD detector. Preferably the second lens 3214 is arranged such that the detector 3216 lies in its focal plane. The output of detector 3216 is preferably supplied to data storage and processing circuitry 3218, which analyses the propagated wavefront as described hereinabove with respect to various wavefront analysis methods. This propagated wavefront 3208 is subsequently back propagated by virtue of equations (19.1)-(19.3), described hereinabove, from plane 3206 to obtain wavefront 3204 at plane 3202.

In accordance with the present embodiment, the data storage and processing circuitry 3218 is operative to propagate the wavefront's complex amplitude by the propagation formulas from one plane to another plane, such as from plane 3206 to plane 3202. By virtue of this propagation, when obtaining the wavefront at any specific plane, all characterizations of the radiation, such as amplitude, phase and polarization, in any second plane can be obtained by propagating the wavefront's complex amplitude by equations (19.1)-(19.3) to that second plane. Therefore, there is no need to measure those characterizations in that certain plane, and an extended three dimensional and surface mapping range of the object without requiring additional scanning can be obtained.

Additionally, the measuring device needs not be focused onto the object to be measured. The measured wavefront's complex amplitude, once obtained at one plane, can be propagated by virtue of the propagation formulas from the measuring plane to any other desired plane, such as the plane which is in focus, to obtain a focused image.

Additionally, when an object to be inspected has an extended height or depth such that part of the surface of the object is within the depth of field and part of it is outside the depth of field, the measuring device needs not be focused onto the part of the object which is outside the depth of field. Additionally, there is no need to measure again the part of the object which is outside the depth of field. Rather, the measured wavefront's complex amplitude at the plane within the depth of field can be propagated from the measuring plane to any other desired plane to obtain a focused image of the part of the object which is outside the depth of field.

Additionally, the present invention allows for obtaining the absolute distance between the measuring plane and any other desired plane. By propagating the measured wavefront's complex amplitude from the measuring plane to another plane to obtain a focused image, the distance that the measured wavefront's complex amplitude was propagated is well known, i.e. the actual distance between these two planes.

Additionally, by propagating sequentially the measured wavefront's complex amplitude from the measuring plane to adjacent planes in small steps, a focused spatial part of the image at each plane can be obtained. This method enables even an optical system with narrow depth of focus to obtain a focused image with very large depth.

This embodiment of the present invention also provides more details about the wavefront and a lateral super-resolution, by measuring the wavefront's complex amplitude at any other desired plane, and comparing it to the calculated wavefront's complex amplitude at that plane. In accordance with the present invention, by measuring the wavefront's complex amplitude at a defocus plane where the wavefront is expanded relative to the focus plane, more detector's pixels are involved and consequently more details about the wavefront can be determined. When the wavefront measured at the defocus plane is propagated back to the focus plane a better lateral resolution is obtained. In addition, when a diverging illumination is used, the divergent radiation complex amplitude can be measured in a certain plane. This measured radiation complex amplitude can be propagated back in the conversion direction to obtain the radiation complex amplitude with better lateral resolution.

It is well known that by using two wavelength measurements the $2\pi$ ambiguity is resolved. By propagation of the two wavefronts, one for each wavelength, an extended Z range with high resolution can be calculated. The basic measurements with the two wavelengths give a very high resolution measurement where the $2\pi$ ambiguity is resolved. This high resolution measurement is conserved during the propagation of the radiation complex amplitude. The radiation complex amplitude of each wavelength can be propagated to any desired plane. In the desired plane the two obtained wavefronts can be recombined to resolve the $2\pi$ ambiguity at that plane.

Additionally, the present invention can utilize the reconstructed wavefront's complex amplitude to obtain multiple views of interference patterns in different Z ranges by simulating multiple reference beams impinging on a virtual mirror. These multiple views are generated by interfering a virtual reference beam impinging on the virtual mirror with the reconstructed complex amplitude. These multiple views allow for a three dimensional reconstruction of the original object.

Additionally, the present invention can utilize the reconstructed wavefront's complex amplitude to simulate other suitable applications, such as Shack-Hartman or confocal microscopy by propagating the reconstructed wavefront's complex amplitude to any required plane through any virtual optical element. For instance, the reconstructed wavefront's complex amplitude can be propagated through a virtual micro-lens array to obtain the intensity in the focus plane of the virtual micro-lens array. This simulates the results of what is obtained in a Shack-Hartman sensor. In another example, the reconstructed wavefront's complex amplitude can be propagated through a virtual lens that focuses it to a pinhole. This produces a result similar to that obtained by confocal microscopy.

Additionally, the present invention can utilize the reconstructed wavefront's complex amplitude to generate an extended focused Z range without requiring additional scanning of the object, as opposed to the extended focused Z range generated by a conventional microscope, which requires scanning of the object.

Figure 33:
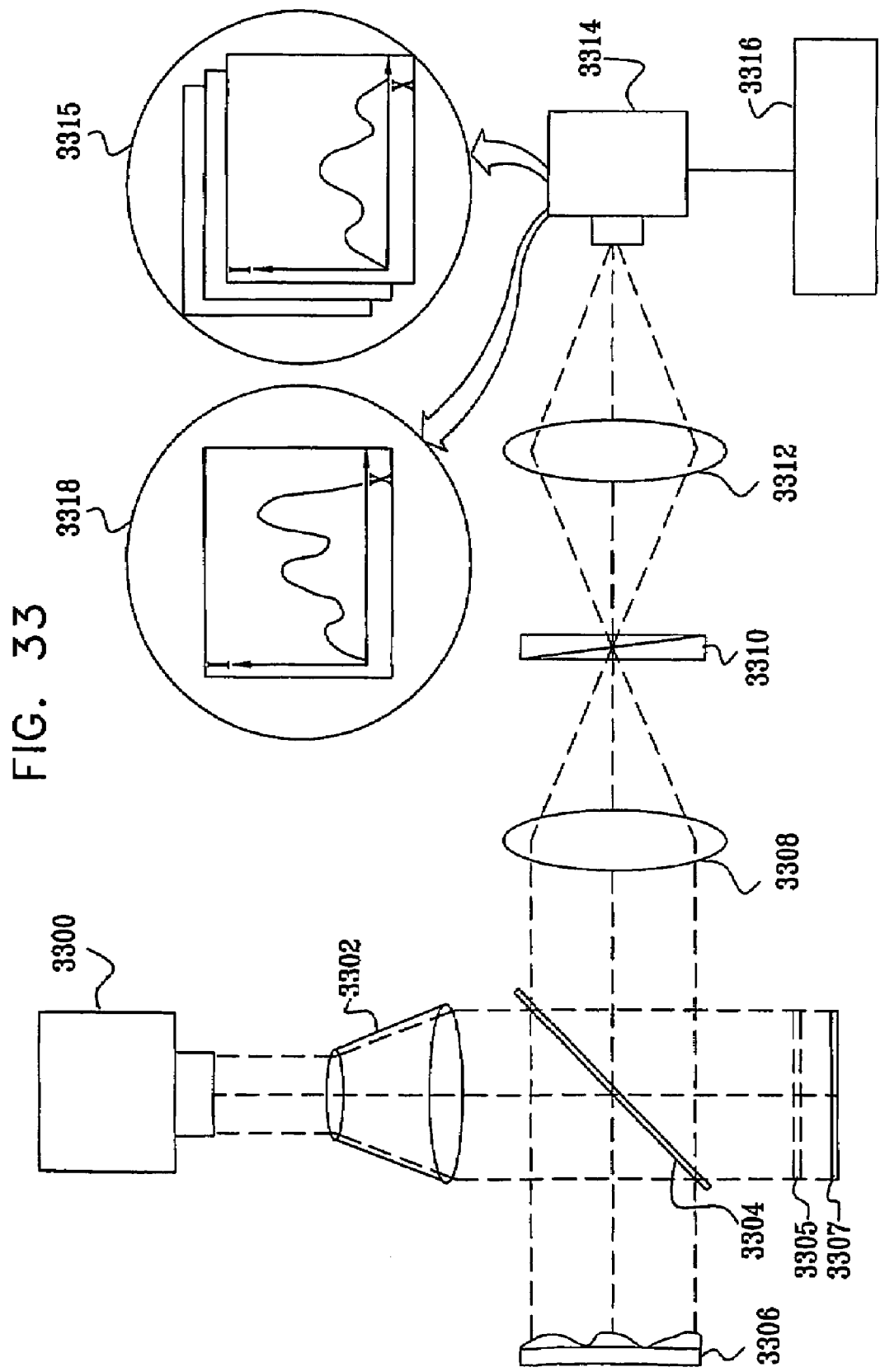
FIG. 33 is a simplified, partially schematic, partially pictorial illustration of a wavefront analysis system operative to provide the absolute location of an object with respect to a reference mirror, constructed and operative in accordance with still another preferred embodiment of the present invention.

Reference is now made to FIG. 33, which is a simplified, partially schematic, partially pictorial illustration of a wavefront analysis system operative to provide, in addition to surface topography or wavefront analysis, the absolute location of an object with respect to a reference mirror, in accordance with still another preferred embodiment of the present invention.

In some of the previous embodiments of a wavefront analysis system described hereinabove a relative wavefront is measured, i.e. where an arbitrary phase constant can be added to the entire complex wavefront. Thus, when an object surface is measured, a constant height can be added to the entire surface, and the absolute location of the object in respect to the measuring instrument is not known. In this embodiment, the phase constant added to the complex amplitude reconstructed is determined relative to a reference wavefront. Thus, for example, when an object surface is measured, the distance from the object's surface to the reference mirror within the measuring instrument is obtained.

As seen in FIG. 33, the optical apparatus is similar to that described with reference to FIG. 20, with a shutter 3305 and a reference mirror 3307 added, and data storage and processing circuitry 3316 includes additional functionalities. In the present apparatus, the incoming illumination from a radiation source 3300, after optionally being expanded by a beam expander 3302, is split by a beam splitter 3304. Part of the illumination is projected on an object 3306 to obtain the wavefront of the object. This part of illumination serves as the object's beam. When shutter 3305 is in an open state, the other part of the illumination is projected onto reference mirror 3307 and serves as a reference beam.

The object's beam is reflected from the object 3306 and focused via a focusing lens 3308 onto a phase manipulator 3310, such as a Phase Light Modulator, which is preferably located at the image plane of radiation source 3300. A second lens 3312 is arranged to image object 3306 onto a detector 3314, such as a CCD camera. Multiple images, preferably, three or four images, are recorded by detector 3314 when the shutter 3305 is closed. Each image corresponds to a different phase changes caused by phase modulator 3310. The output of detector 3314, such as a set of intensity maps 3315, is preferably supplied to the data storage and processing circuitry 3316, which reconstructs the wavefront reflected from the object as described hereinabove with respect to previous embodiments. In the current embodiment, an additional image 3318 is obtained on the detector 3314, in a state where no phase change is applied by the phase manipulator 3310, and the shutter 3305 is open. This additional image is an intensity map of the interference pattern of the object's beam and the reference beam.

The data storage and processing circuitry 3316 employs the obtained reconstructed wavefront reflected from the object, together with the additional image 3318 and the known nature of the mirror 3307 to obtain the absolute location of the surface of the object with respect to reference mirror 3307. This absolute distance is obtained by calculating the optimal phase constant that when added to the complex amplitude when interfering with the reference beam generates an intensity pattern as close as possible to interference image 3318.

Obtaining the absolute location of each object with respect to the reference mirror, enables measuring the absolute distance between two different objects that are far apart from each other by comparing the absolute distance between each one of these objects to the reference mirror.

The additional measurement described hereinabove enables obtaining additional data for the reconstructed wavefront that can be applied to correct the reconstructed wavefront.

The average absolute distance between the object to the reference mirror is calculated by averaging it over all the object's points. The actual distance from each object's point to the reference mirror is the average absolute distance between the object to the reference mirror minus the height of the object's point. Any deviation of the distance of each point of the object from this calculated distance can be considered as an error in the height measurement of this point, and can be corrected.

Preferably, the illumination source contains more than one wavelength to resolve the $2\pi$ ambiguity.

According to the present invention, where there are estimated known differences of the wavefront being analyzed from a planar-like wavefront, these estimated known differences can be removed by an optical element. In this embodiment, the measurements are done on a planar-like wavefront to obtain the complex amplitude of this planar-like wavefront, and to measure the deviations, such as in phase and amplitude, of this planar-like wavefront from an ideal uniform plane wave. When the complex amplitude of the planar-like wavefront is reconstructed, the estimated known differences that were removed are reintroduced mathematically to obtain the actual wavefront.

In another embodiment, when the wavefront being analyzed is approximately a spherical wavefront, a lens can be added to remove the spherical components of the wavefront being analyzed. After the reconstruction, the removed spherical components are mathematically added to the reconstructed wavefront, to obtain the wavefront being analyzed.

In another embodiment, where the wavefront being analyzed is a tilted wavefront with additional features, a prism can be added to remove the tilt component of the wavefront being analyzed. After the wavefront reconstruction, the removed tilt component is mathematically added to the reconstructed wavefront to obtain the wavefront being analyzed.

The wavefront analysis systems and methods described hereinabove can be used in a variety of applications, including wavefront analysis, surface mapping, phase change analysis, spectral analysis, object inspection, intensity retrieval, phase retrieval, polarization retrieval, stored data retrieval, multilayer measurements, three-dimensional imaging and other suitable applications utilizing wavefront analysis. These applications specifically include optical systems for 3D measurement and surface mapping of various objects, such as semiconductors, electronic components and micromechanical elements, optical systems for the measurement of transparent objects, such as optical components, quality of optical components, measurement of index of refraction and biological tissue, and optical system for spectral analysis.

The systems and methods described hereinabove provide a variety of advantages over conventional methods, including the flexibility provided by an independent wavefront analysis module and an independent imaging two dimensional module, the ability to utilize various magnifications using the same wavefront analysis module and the potential to enhance the performance of a two dimensional microscope or to convert it into a three dimensional measurement tool. Additionally, the combination of conventional two dimensional imaging and wavefront analysis, such as by utilizing three dimensional surface mapping, is advantageous to the user due to the ability to view in a conventional microscope the area which is being measured. Furthermore, the present invention describes a wavefront analysis system which is robust and insensitive to vibrations, unlike a conventional interferometer. Quantitative three dimensional imaging with nano-meter accuracy in the height axis can be obtained, as well as high throughput two and three dimensional measurements. Additionally, the present invention provides the ability to adapt a wavefront analysis module to any other optical system. The combination of various measurements, such as that obtained by conventional imaging, with the intensity data from the wavefront analysis, can be utilized to extract information, not readily obtainable by conventional methods from an object being analyzed. Additionally, as described hereinabove, the obtained wavefront parameters, such as amplitude and phase, can be averaged to eliminate fringes and other noise factors to obtain a more accurate measurement, using different channels and/or different wavelengths.

The present invention also provides elaborated, improved and enhanced methodologies and systems for wavefront analysis. Additionally, the present invention provides methods and systems to perform wavefront analysis and three dimensional measurements, specifically those which are based on analyzing the output of an intermediate plane, such as an image plane, of an optical system. These methods and systems can be applied to existing wavefront analysis and measurement methods, such as methods provided in PCT Application No. PCT/IL/01/00335, and in U.S. Provisional Patent Applications, Ser. Nos. 60/351,753 and 60/406,593, of the assignee, as well as other conventional wavefront analysis methods.

It is appreciated by persons skilled in the art that the present invention is not limited by what has been particularly shown and described hereinabove. Rather the scope of the present invention includes both combinations and subcombinations of the various features described hereinabove as well as variations and modifications which would occur to persons skilled in the art upon reading the specifications and which are not in the prior art.

The invention claimed is:

1. A method of wavefront analysis comprising: utilizing a light source to illuminate an object and to obtain a wavefront having an amplitude and a phase; obtaining a plurality of differently phase changed transformed wavefronts corresponding to said wavefront being analyzed, including: applying a transform to said wavefront being analyzed thereby to obtain a transformed wavefront; and applying a plurality of different phase changes to said transformed wavefront, thereby to obtain a plurality of differently phase changed transformed wavefronts; obtaining a plurality of intensity maps of said plurality of phase changed transformed wavefronts by phase manipulation; and employing said plurality of intensity maps to obtain an output indicating said amplitude and phase of said wavefront being analyzed, wherein said plurality of different phase changes are applied to a region of said transformed wavefront, said region having a shape of said light source.

2. A method according to claim 1 and wherein said light source comprises an elongate light source.

3. A method of wavefront analysis comprising: utilizing a light source to illuminate an object and to obtain a wavefront having an amplitude and a phase; obtaining a plurality of differently phase changed transformed wavefronts corresponding to said wavefront being analyzed, including: applying a transform to said wavefront being analyzed thereby to obtain a transformed wavefront; and applying a plurality of different phase changes to said transformed wavefront, thereby to obtain a plurality of differently phase changed transformed wavefronts; obtaining a plurality of intensity maps of said plurality of phase changed transformed wavefronts by phase manipulation; and employing said plurality of intensity maps to obtain an output indicating said amplitude and phase of said wavefront being analyzed, wherein said plurality of different phase changes are applied to regions of said transformed wavefront, said regions having the form of a grating.

4. A method of wavefront analysis comprising: obtaining a plurality of differently phase changed transformed wavefronts corresponding to a wavefront being analyzed which has an amplitude and a phase; obtaining a plurality of intensity maps of said plurality of phase changed transformed wavefronts; and employing said plurality of intensity maps to obtain an output indicating said amplitude and phase of said wavefront being analyzed, and wherein obtaining a plurality of differently phase changed transformed wavefronts comprises: applying a transform to said wavefront being analyzed thereby to obtain a transformed wavefront; and applying a plurality of different phase changes to said transformed wavefront, thereby to obtain a plurality of differently phase changed transformed wavefronts, and wherein said transformed wavefront comprises a plurality of different polarization components; and said plurality of different phase changes are effected by using a birefringent phase changer to apply different phase changes to said plurality of different polarization components of said transformed wavefront.

5. A method of wavefront analysis comprising: obtaining two differently phase changed transformed wavefronts corresponding to a wavefront being analyzed which has an amplitude and a phase; obtaining two intensity maps of said two phase changed transformed wavefronts; employing interference between said two intensity maps to generate a third intensity map; and employing said two intensity maps and said third intensity map to obtain an output indicating said amplitude and phase of said wavefront being analyzed.

6. A method of wavefront analysis comprising: obtaining a plurality of differently phase changed transformed wavefronts corresponding to a wavefront being analyzed which has an amplitude and a phase; obtaining a plurality of intensity maps of said plurality of phase changed transformed wavefronts; and employing said plurality of intensity maps to obtain an output indicating said amplitude and phase of said wavefront being analyzed, and wherein obtaining a plurality of differently phase changed transformed wavefronts comprises: applying a transform to said wavefront being analyzed thereby to obtain a transformed wavefront; and applying a plurality of different phase changes to said transformed wavefront, thereby to obtain a plurality of differently phase changed transformed wavefronts, and wherein: said plurality of different phase changes includes spatial phase changes; said plurality of different spatial phase changes are effected by applying a spatially uniform, time-varying spatial phase change to part of said transformed wavefront; said transform applied to said wavefront being analyzed is a Fourier transform; said plurality of different spatial phase changes comprises at least three different phase changes, said plurality of intensity maps comprises at least three intensity maps; and said employing step comprises: expressing said wavefront being analyzed as a first complex function which has an amplitude and phase identical to said amplitude and phase of said wavefront being analyzed; expressing said plurality of intensity maps as a function of said first complex function and of a spatial function governing said spatially uniform, time-varying spatial phase change; defining a second complex function, having an absolute value and a phase, as a convolution of said first complex function and of a Fourier transform of said spatial function governing said spatially uniform, time-varying spatial phase change; expressing each of said plurality of intensity maps as a third function of: said amplitude of said wavefront being analyzed; a square of said absolute value of said second complex function; a difference between said phase of said wavefront being analyzed and said phase of said second complex function; and a known phase delay produced by one of said at least three different phase changes which each correspond to one of said at least three intensity maps; solving said third function to obtain said amplitude of said wavefront being analyzed, said absolute value of said second complex function and said difference between said phase of said wavefront being analyzed and said phase of said second complex function; solving said second complex function to obtain said phase of said second complex function; and obtaining said phase of said wavefront being analyzed by adding said phase of said second complex function to said difference between said phase of said wavefront being analyzed and said phase of said second complex function, said square of said absolute value of said second complex function is obtained by approximating a square of said absolute value to a polynomial of a given degree; and said employing step comprises computing a confidence level map characterizing confidence in each of a plurality of portions of said phase of said wavefront being analyzed, by comparing said square of said absolute value of said second complex function to said polynomial of a given degree, the confidence level map comprising a plurality of confidence levels respectively corresponding to a plurality of portions within said intensity maps.

7. A method according to claim 6 wherein said step of applying a plurality of different phase changes is performed at least twice using at least two pluralities of different phase changes and wherein said step of employing is performed at least twice using said at least two pluralities of different phase changes, thereby to obtain at least two values for said phase of said wavefront being analyzed, and wherein the method also comprises using the at least two confidence level maps resulting from performing said confidence level map computation step at least twice, to combine said at least two values for said phase of said wavefront being analyzed into a single value.

8. A method according to claim 7 wherein said step of combining comprises selecting one value from among said at least two values for said phase of said wavefront being analyzed, wherein said selected value is the value of the phase having the highest value of said confidence levels.

9. A method according to claim 7 wherein said step of combining comprises computing a weighted average of said at least two values for said phase of said wavefront being analyzed, using the confidence levels included in said at least two confidence level maps as weights for the at least two values respectively.

10. A method according to claim 6 and also comprising computing the confidence in each of a plurality of portions of said phase, using, for at least one portion, a phase value which is different from that measured for the at least one portion and, if the confidence computed for an individual portion using the different phase value exceeds the confidence computed using the measured phase value, replacing the measured phase value for the individual portion with the different phase value.

11. A method according to claim 6 wherein the wavefront being analyzed comprises a plurality of wavefront components having different wavelengths, and said plurality of differently phase changed transformed wavefronts are obtained by applying a phase change to said plurality of different wavelength components of said wavefront being analyzed, and wherein said wavefront being analyzed comprises a plurality of different wavelength components; and said plurality of differently phase changed transformed wavefronts are obtained by applying a phase change to said plurality of different wavelength components of said wavefront being analyzed.

12. A method according to claim 11 wherein said step of applying a plurality of different phase changes is performed for each of the plurality of wavefront components, and wherein said step of employing is performed for each of the plurality of wavefront components, thereby to obtain a corresponding plurality of values for said phase of said wavefront being analyzed, and wherein the method also comprises using the at least confidence level maps resulting from performing said confidence level map computation step a plurality of times, to combine said plurality of values for said phase of said wavefront being analyzed into a single value.

13. A method of wavefront analysis comprising: obtaining a plurality of differently phase changed transformed wavefronts corresponding to a wavefront being analyzed which has an amplitude and a phase; obtaining a plurality of intensity maps of said plurality of phase changed transformed wavefronts; and employing said plurality of intensity maps to obtain an output indicating said amplitude and phase of said wavefront being analyzed, and wherein said step of employing also comprises normalizing each of the plurality of intensity maps to obtain a plurality of intensity maps having the same sum of intensity values.

14. A method according to claim 13 and wherein said plurality of differently phase changed transformed wavefronts are obtained so as to maximize contrast between said plurality of intensity maps and to minimize effects of noise on said phase of said wavefront being analyzed.

15. A method of phase change analysis comprising: obtaining a phase change analysis wavefront which has an amplitude and a phase; applying a transform to said phase change analysis wavefront thereby to obtain a transformed wavefront; applying at least one phase change to said transformed wavefront, thereby to obtain at least one phase changed transformed wavefront; obtaining at least one intensity map of said at least one phase changed transformed wavefront; and employing said at least one intensity map to obtain an output indication of said at least one phase change applied to said transformed phase change analysis wavefront.

16. A method according to claim 15 and wherein said obtaining a phase change analysis wavefront comprises reflecting light off a known object and using the light reflected off the known object as said phase change analysis wavefront.

17. A method according to claim 15 and wherein said obtaining a phase change analysis wavefront comprises transmitting light through a known object and using the transmitted light exiting the known object as said phase change analysis wavefront.

18. A method according to claim 15 and wherein said applying at least one phase change to said transformed wavefront comprises applying a phase delay value to an area within said transformed wavefront and wherein said step of employing said at least one intensity map comprises obtaining an output indication delimiting said area.

19. A method according to claim 18 wherein said obtaining a phase change analysis wavefront comprises reflecting light off a known object and using the light reflected off the known object as said phase change analysis wavefront.

20. A method according to claim 18 wherein said obtaining a phase change analysis wavefront comprises transmitting light through a known object and using the transmitted light exiting the known object as said phase change analysis wavefront.

21. A method according to claim 15 wherein said step of employing said at least one intensity map comprises deriving at least one contrast map from the at least one intensity map and employing said at least one contrast map to obtain an output indication of said at least one phase change applied to said transformed phase change analysis wavefront.

22. A method of wavefront analysis comprising: obtaining a plurality of differently phase changed transformed wavefronts corresponding to a wavefront being analyzed which has an amplitude and a phase; obtaining a plurality of intensity maps of said plurality of phase changed transformed wavefronts; and employing said plurality of intensity maps to obtain an output indicating said amplitude and phase of said wavefront being analyzed, the method also comprising: performing said obtaining steps and said employing step wherein said wavefront being analyzed comprises a wavefront originating from a known object having known amplitude and phase values; computing amplitude and phase calibration values by comparing the output of the employing step performed on said known object to said known amplitude and phase values; and when performing said obtaining and employing steps on an unknown object, using said amplitude and phase calibration values to correct the output for said unknown object generated in said employing step.

23. A method according to claim 22 wherein said wavefront originating from the known object comprises a wavefront reflected from the known object.

24. A method according to claim 22 wherein said wavefront originating from the known object comprises a wavefront transmitted through the known object.

25. A method according to claim 22 wherein said known object comprises a flat mirror.

26. A method according to claim 22 wherein said known object comprises a window.

27. A method of wavefront analysis comprising: obtaining a plurality of differently phase changed transformed wavefronts corresponding to a wavefront being analyzed which has an amplitude and a phase; obtaining a plurality of intensity maps of said plurality of phase changed transformed wavefronts; and employing said plurality of intensity maps to obtain an output indicating said amplitude and phase of said wavefront being analyzed, and also comprising using an iris to block off a portion of a wavefront, thereby to generate said wavefront being analyzed, and wherein the plurality of intensity maps are obtained using a camera having an imaging area which is larger than the image of said iris on the imaging area.

28. A method of wavefront analysis comprising: obtaining a plurality of differently phase changed transformed wavefronts corresponding to a wavefront being analyzed which has an amplitude and a phase; obtaining a plurality of intensity maps of said plurality of phase changed transformed wavefronts; and employing said plurality of intensity maps to obtain an output indicating said amplitude and phase of said wavefront being analyzed, and wherein obtaining a plurality of differently phase changed transformed wavefronts comprises: applying a transform to said wavefront being analyzed thereby to obtain a transformed wavefront; and applying a plurality of different phase changes to said transformed wavefront, thereby to obtain a plurality of differently phase changed transformed wavefronts, and wherein said plurality of different phase changes includes spatial phase changes, and wherein said plurality of different spatial phase changes are effected by applying a spatially uniform, time-varying spatial phase change to part of said transformed wavefront, and wherein: said transform applied to said wavefront being analyzed is a Fourier transform; said step of employing includes: expressing said wavefront being analyzed as a first complex function which has an amplitude and phase identical to said amplitude and phase of said wavefront being analyzed; expressing said plurality of intensity maps as a function of said first complex function and of a spatial function governing said spatially uniform, time-varying spatial phase change; defining a second complex function, having an absolute value and a phase, as a convolution of said first complex function and of a Fourier transform of said spatial function governing said spatially uniform, time-varying spatial phase change; expressing each of said plurality of intensity maps as a third function of: said amplitude of said wavefront being analyzed; said absolute value of said second complex function; a difference between said phase of said wavefront being analyzed and said phase of said second complex function; and a known phase delay produced by one of said different phase changes which each correspond to one of said intensity maps; solving said third function to obtain said amplitude of said wavefront being analyzed, said absolute value of said second complex function and said difference between said phase of said wavefront being analyzed and said phase of said second complex function; solving said second complex function to obtain said phase of said second complex function; and obtaining said phase of said wavefront being analyzed by adding said phase of said second complex function to said difference between said phase of said wavefront being analyzed and said phase of said second complex function, wherein said step of obtaining an output indicating said amplitude and phase of said wavefront being analyzed comprises employing said plurality of intensity maps and said square of the absolute value of the second complex function to obtain said output.

29. A method for analyzing a wavefront having an amplitude and a phase, the method comprising: using an iris to block off a portion of a wavefront, thereby to generate a wavefront being analyzed; Fourier-transforming said wavefront being analyzed and effecting a spatial phase change on a portion of the transformed wavefront, thereby to generate at least one partially phase changed transformed wavefront, including a known phase changed wavefront portion and a phase unchanged wavefront portion; obtaining at least one intensity map of said at least one partially phase changed transformed wavefront, the map representing interference between the phase changed portion and the phase unchanged portion, wherein said map is obtained using a camera having an imaging area which is larger than the image of said iris on the imaging area, thereby to define inside and outside map portions representing intensity of light impinging on the imaging area portion inside and outside the iris image respectively; and employing said at least one intensity map to obtain an output indicating said amplitude and phase of said wavefront being analyzed, including: expressing said wavefront being analyzed as a first complex function which has an amplitude and phase identical to said amplitude and phase of said wavefront being analyzed; expressing said intensity map as a function of said first complex function and of a spatial function; and defining a second complex function, having an absolute value and a phase, as a convolution of said first complex function and of a Fourier transform of said spatial function; wherein said absolute value of said second complex function is obtained by approximating said absolute value to a polynomial of a given degree, and wherein the square of the absolute value of the second complex function is derived from the portion of the imaging area which is external to the image of said iris on the imaging area, assuming that the phase of the second complex function is constant over the imaging area; and computing the amplitude and phase of the wavefront being analyzed by assuming said inside map portion represents interference between said wavefront being analyzed and a wavefront having said absolute value of said second complex function as an amplitude and having a phase which is constant over the imaging area.

30. A method according to claim 27 and wherein: said obtaining a plurality of differently phase changed transformed wavefronts comprises: applying a transform to said wavefront being analyzed thereby to obtain a transformed wavefront; and applying a plurality of different phase changes to said transformed wavefront, thereby to obtain a plurality of differently phase changed transformed wavefronts; said plurality of different phase changes includes spatial phase changes; said plurality of different spatial phase changes are effected by applying a spatially uniform, time-varying spatial phase change to part of said transformed wavefront; said transform applied to said wavefront being analyzed is a Fourier transform, said plurality of different spatial phase changes comprises at least three different phase changes; said plurality of intensity maps comprises at least three intensity maps; and said employing includes: expressing said wavefront being analyzed as a first complex function which has an amplitude and phase identical to said amplitude and phase of said wavefront being analyzed; expressing said plurality of intensity maps as a function of said first complex function and of a spatial function governing said spatially uniform, time- varying spatial phase change; defining a second complex function, having an absolute value and a phase, as a convolution of said first complex function and of a Fourier transform of said spatial function governing said spatially uniform, time-varying spatial phase change; expressing each of said plurality of intensity maps as a third function of: said amplitude of said wavefront being analyzed; said absolute value of said second complex function; a difference between said phase of said wavefront being analyzed and said phase of said second complex function; and a known phase delay produced by one of said at least three different phase changes which each correspond to one of said at least three intensity maps; solving said third function to obtain said amplitude of said wavefront being analyzed, said absolute value of said second complex function and said difference between said phase of said wavefront being analyzed and said phase of said second complex function; solving said second complex function to obtain said phase of said second complex function; and obtaining said phase of said wavefront being analyzed by adding said phase of said second complex function to said difference between said phase of said wavefront being analyzed and said phase of said second complex function, and wherein the square of the absolute value of the second complex function is derived from the portion of the imaging area which is external to the image of said iris on the imaging area.

31. A method of wavefront analysis comprising: obtaining a plurality of differently phase changed transformed wavefronts corresponding to a wavefront being analyzed which has an amplitude and a phase; obtaining a plurality of intensity maps of said plurality of phase changed transformed wavefronts; and employing said plurality of intensity maps to obtain an output indicating said amplitude and phase of said wavefront being analyzed, and wherein obtaining a plurality of differently phase changed transformed wavefronts comprises: applying a transform to said wavefront being analyzed thereby to obtain a transformed wavefront; and applying a plurality of different phase changes to said transformed wavefront, thereby to obtain a plurality of differently phase changed transformed wavefronts, and wherein said plurality of different phase changes includes spatial phase changes, and wherein said plurality of different spatial phase changes are effected by applying a spatial phase change to part of said transformed wavefront, wherein said step of applying a plurality of different phase changes comprises duplicating the transformed wavefront into several wavefronts and wherein said step of applying a plurality of different phase changes comprises applying a different spatial phase change to each of said several wavefronts.

32. A method according to claim 31 wherein said step of duplicating comprises splitting the beam forming the transformed wavefront.

33. A method of providing simultaneous surface and layer thickness measurements of a multilayer object comprising: illuminating the multilayer object with broadband illumination; analyzing illumination emerging from said multilayer object to provide a spectral analysis output; and utilizing said spectral analysis output to provide simultaneously both surface and layer thickness information regarding said multilayer object.

34. A method according to claim 33 and wherein said method comprises: obtaining a reflected wavefront having an amplitude and a phase, by reflecting radiation from a surface; and analyzing said reflected wavefront by: obtaining a plurality of differently phase changed transformed wavefronts corresponding to said reflected wavefront; obtaining a plurality of intensity maps of said plurality of phase changed transformed wave fronts; and employing said plurality of intensity maps to obtain an output indicating said amplitude and phase of said reflected wavefront.

35. A method according to claim 34 and wherein said radiation reflected from said surface has at least two narrow bands, each centered about a different wavelength, providing at least two wavelength components in said surface mapping wavefront and at least two indications of said phase of said surface mapping wavefront, thereby enabling an enhanced mapping of said surface to be obtained by avoiding an ambiguity in the mapping which exceeds the larger of said different wavelengths about which said two narrow bands are centered.

36. A method according to claim 34 and wherein: said wavefront being analyzed comprises a plurality of different wavelength components; and said plurality of differently phase changed transformed wavefronts are obtained by applying a phase change to said plurality of different wavelength components of said wavefront being analyzed.

37. A method of wavefront analysis according to claim 34 and wherein: said plurality of intensity maps comprises at least four intensity maps; and employing said plurality of intensity maps to obtain an output indicating said amplitude and phase of said wavefront being analyzed includes employing a plurality of combinations, each of at least three of said plurality of intensity maps, to provide a plurality of indications of said amplitude and phase of said wavefront being analyzed.

38. A method according to claim 34 and wherein: said wavefront being analyzed comprises at least two wavelength components; said obtaining a plurality of intensity maps also includes dividing said phase changed transformed wavefronts according to said at least two wavelength components in order to obtain at least two wavelength components of said phase changed transformed wavefronts and in order to obtain at least two sets of intensity maps, each set corresponding to a different one of said at least two wavelength components of said phase changed transformed wavefronts; and employing said plurality of intensity maps to obtain an output indicating said amplitude and phase of said wavefront being analyzed includes obtaining an output indicative of the phase of said wavefront being analyzed from each of said at least two sets of intensity maps and combining said outputs to provide an enhanced indication of phase of said wavefront being analyzed, in which enhanced indication, there is no ambiguity.

39. A method according to claim 33 wherein said broadband illumination includes multi-wavelength illumination including illumination having a number of known wavelengths, said number at least equal to the number of layers in said multilayer object.

40. A method according to claim 39 wherein said analyzing comprises generating an emerging illumination intensity map for each of a number of known wavelengths, said number at least equal to the number of layers in said multilayer object.

41. A method according to claim 39 wherein said emerging illumination comprises at least one of reflected illumination and transmitted illumination.

42. A method of analyzing a wavefront, comprising a plurality of different wavelength components, after the wavefront exits an object, the method comprising: obtaining a plurality of differently phase changed transformed wavefronts corresponding to a wavefront being analyzed which has an amplitude and a phase, including: applying a transform to each of the plurality of different wavelength components, thereby to generate a plurality of transformed wavefront components; and applying a plurality of scalable phase changes to the plurality of transformed wavefront components respectively; obtaining a plurality of intensity maps of said plurality of phase changed transformed wavefronts; and employing said plurality of intensity maps to obtain an output indicating said amplitude and phase of said wavefront being analyzed.

43. A method according to claim 42 wherein said plurality of scalable phase changes are each in a different plane.

44. A method according to claim 42 wherein said plurality of different wavelength components are generated by light sources disposed at various distances from the object.

45. A method of wavefront analysis comprising: obtaining a plurality of differently phase changed transformed wavefronts corresponding to a wavefront being analyzed which has an amplitude and a phase; obtaining a plurality of intensity maps of said plurality of phase changed transformed wavefronts; and employing said plurality of intensity maps to obtain an output indicating said amplitude and phase of said wavefront being analyzed, and wherein obtaining a plurality of differently phase changed transformed wavefronts comprises: applying a transform to said wavefront being analyzed thereby to obtain a transformed wavefront; and applying a plurality of different phase changes to said transformed wavefront, thereby to obtain a plurality of differently phase changed transformed wavefronts, wherein said applying a plurality of different phase changes comprises providing an optical system having a selectable plurality of optical configurations creating a corresponding plurality of phase changes respectively.

46. A method according to claim 45 wherein said optical system comprises a spatial light modulator (SLM) including a central inactive area and a peripheral active area.

47. A method according to claim 45 wherein said optical system comprises a phase plate having a plurality of portions each corresponding to an individual phase change and a phase plate portion selector operative to position a selected one of the phase plate portions along a light path.

48. The method according to claim 45 wherein said optical system comprises two mirrors at an adjustable distance from one another whose relative configuration is such that a first portion of the light impinging at the two mirror configuration arrives at the first mirror and a second portion of the light impinging at the two mirror configuration arrives at the second mirror, and wherein said distance between said two mirrors is adjusted to effect said phase change.

49. The method according to claim 48 wherein said two mirrors comprise a first mirror preceding a second mirror along the light path, said first mirror having an aperture defined therewith, thereby allowing said second portion of the light to reach said second mirror via the aperture.

50. The method according to claim 48 wherein said two mirrors comprise a first mirror preceding a second mirror along the light path wherein at least one dimension of the first mirror's surface area is less than at least one corresponding dimension of the cross-section of the wavefront and less than the corresponding dimension of the second mirror's surface area, thereby allowing said second portion of the light to reach the second mirror.

51. The method according to claim 48 and also comprising at least one piezo-electric actuator operative to allow a user to control the distance between the two mirrors.

52. An apparatus for wavefront analysis comprising: a light source, to illuminate an object and to obtain a wavefront having an amplitude and a phase; a wavefront transformer, obtaining a plurality of differently phase changed transformed wavefronts corresponding to a wavefront being analyzed having a phase and an amplitude, including: a transformed wavefront generator, applying a transform to said wavefront being analyzed thereby to obtain a transformed wavefront; and a phase changer, applying a plurality of different phase changes to said transformed wavefront, thereby to obtain a plurality of differently phase changed transformed wavefronts; an intensity map provider, obtaining a plurality of intensity maps of said plurality of phase changed transformed wavefronts by phase manipulation; and an intensity map utilizer, employing said plurality of intensity maps to obtain an output indicating said amplitude and phase of said wavefront being analyzed, wherein said plurality of different phase changes are applied to a region of said transformed wavefront, corresponding to a shape of said light source.

53. An apparatus for wavefront analysis comprising: a wavefront transformer, obtaining two differently phase changed transformed wavefronts corresponding to a wavefront being analyzed which has an amplitude and a phase; an intensity map provider, obtaining two intensity maps of said two phase changed transformed wavefronts; and an intensity map utilizer, employing said two intensity maps to obtain an output indicating said amplitude and phase of said wavefront being analyzed; and wherein: said intensity map provider is also operative for employing interference between said two intensity maps to generate a third intensity map; and said obtaining two differently phase changed transformed wavefronts comprises: applying a transform to said wavefront being analyzed thereby to obtain a transformed wavefront; and applying a plurality of different phase changes to said transformed wavefront, thereby to obtain a plurality of differently phase changed transformed wavefronts.

54. A method of optical property analysis of an object by analyzing a wavefront exiting the object, the method comprising: providing an imaging system having a defined depth of focus; repeating the following steps focusing on each of several depths within the object: obtaining a plurality of differently phase changed transformed wavefronts corresponding to a wavefront being analyzed which has an amplitude and a phase and which is exiting an object; obtaining a plurality of intensity maps of said plurality of phase changed transformed wavefronts; and employing said plurality of intensity maps to obtain an output indicating said amplitude and phase of said wavefront being analyzed; and combining the several outputs generated by repeating said obtaining and employing steps in order to obtain a slice-by-slice optical transmission profile of the object.

55. A method according to claim 54 wherein said optical transmission profile comprises an optical path length for each of the several depths within the object.

56. A method of wavefront analysis operative to analyze a wavefront exiting from an object, the method comprising: focusing an imaging system on the object without changing the distance from the object to the imaging system and obtaining a plurality of differently phase changed transformed wavefronts corresponding to a wavefront being analyzed which has an amplitude and a phase; obtaining a plurality of intensity maps of said plurality of phase changed transformed wavefronts; and employing said plurality of intensity maps to obtain an output indicating said amplitude and phase of said wavefront being analyzed.

57. A method of wavefront analysis comprising: obtaining a plurality of differently phase changed transformed wavefronts corresponding to a wavefront being analyzed; obtaining a plurality of intensity maps of said plurality of phase changed transformed wavefronts; and employing said plurality of intensity maps to obtain a modulo 2 output indicating said amplitude and phase of said wavefront being analyzed, wherein said step of employing comprises computing at least one characteristic of the object's surface geometry by analyzing a Moiré pattern generated by projecting stripes on the object and viewing the object through a grating; and resolving the $2\pi$ ambiguity of the modulo $2\pi$ output using at least one characteristic of the object's surface geometry.

58. A method according to claim 57 wherein said stripes are generally linear.

59. A method according to claim 57 wherein said step of projecting stripes comprises illuminating the object via a grating.

60. A method according to claim 57 wherein said step of projecting stripes comprises using a plurality of coherent illumination sources to illuminate the object, thereby to generate an interference pattern on the object.

61. A method for wavefront analysis utilizing a propagated wavefront, the method comprising: utilizing a propagated wavefront, which corresponds to a wavefront being analyzed, having an amplitude and a phase, for obtaining a plurality of differently phase changed transformed propagated wavefronts; obtaining a plurality of intensity maps of said plurality of phase changed transformed propagated wavefronts; and employing said plurality of intensity maps to obtain an output indicating said amplitude and phase of said wavefront being analyzed.

62. A method for wavefront analysis according to claim 61 and wherein said employing comprises: employing said plurality of intensity maps to obtain an output corresponding to said propagated wavefront; and employing said output corresponding to said propagated wavefront to obtain an output indicating said amplitude and phase of said wavefront being analyzed.

63. A method according to claim 61 and also comprising: utilizing said output indicating said amplitude and phase of said wavefront being analyzed in order to obtain a second output indicating amplitude and phase of a propagated wavefront obtained by propagating said wavefront being analyzed to any given plane.

64. A method according to claim 63 wherein said propagating said wavefront being analyzed to any given plane also includes propagating through optical elements.

65. A method for wavefront analysis comprising: in a first mode of operation: obtaining a plurality of differently phase changed transformed wavefronts corresponding to an wavefront being analyzed which has an amplitude and a phase; obtaining a plurality of intensity maps of said plurality of phase changed transformed wavefronts; and employing said plurality of intensity maps to obtain an output indicating said amplitude and phase of said wavefront being analyzed; and in a second mode of operation: carrying out an interferometric measurement on said wavefront being analyzed employing a reference in order to provide an output indicating the location of a source of said wavefront being analyzed.

66. A method of wavefront analysis according to claim 65 and wherein said source of said wavefront being analyzed comprises an object.

67. A method of wavefront analysis according to claim 65 and wherein said reference comprises a mirror.

68. A method of wavefront analysis comprising: obtaining a wavefront being analyzed which has an amplitude and a phase; obtaining a modified wavefront which has an amplitude and a phase in which estimated known differences of the wavefront being analyzed from a planar-like wavefront are removed by an optical element; obtaining a plurality of differently phase changed transformed modified wavefronts corresponding to said modified wavefront; obtaining a plurality of intensity maps of said plurality of phase changed transformed modified wavefronts; employing said plurality of intensity maps to obtain an output indicating said amplitude and phase of said modified wavefront; and obtaining an output indicating said amplitude and phase of said wavefront being analyzed, by reintroducing said estimated known differences from said planar-like wavefront to said output indicating said amplitude and phase of said modified wavefront.

69. A method according to claim 68 and wherein: said wavefront being analyzed is approximately a spherical wavefront; and said optical element is a lens operative to remove the spherical components of said wavefront being analyzed.

70. A method according to claim 68 and wherein: said wavefront being analyzed is a tilted wavefront with additional features, and said optical element is a prism operative to remove the tilt component of said wavefront being analyzed.

71. A wavefront analysis system comprising: a wavefront generator, operative to obtain a wavefront being analyzed which has an amplitude and a phase; an optical element, operative to modify said wavefront to obtain a modified wavefront which has an amplitude and a phase in which estimated known differences of the wavefront being analyzed from a planar-like wavefront are removed by said optical element; a phase changer, operative to provide a plurality of differently phase changed transformed modified wavefronts corresponding to said modified wavefront; an intensity map generator, operative to generate a plurality of intensity maps of said plurality of phase changed transformed modified wavefronts; an intensity map utilizer, employing said plurality of intensity maps to provide an output indicating said amplitude and phase of said modified wavefront; and a wavefront reconstructor, operative to obtain an output indicating said amplitude and phase of said wavefront being analyzed by reintroducing said estimated known differences from said planar-like wavefront to said output indicating said amplitude and phase of said modified wavefront.

72. A system according to claim 71 and wherein: said wavefront being analyzed is approximately a spherical wavefront; and said optical element is a lens operative to remove the spherical components of said wavefront being analyzed.

73. A system according to claim 71 and wherein: said wavefront being analyzed is a tilted wavefront with additional features; and said optical element is a prism operative to remove the tilt component of said wavefront being analyzed.

74. A method of wavefront analysis comprising: obtaining a plurality of differently phase changed transformed wavefronts corresponding to a wavefront being analyzed which has a polarization; obtaining a plurality of intensity maps of said plurality of phase changed transformed wavefronts; and employing said plurality of intensity maps to obtain an output indicating said polarization of said wavefront being analyzed.

* * * * *

UNITED STATES PATENT AND TRADEMARK OFFICE
CERTIFICATE OF CORRECTION

| | | |
|---|---|---|
| PATENT NO. | : 7,609,388 B2 | Page 1 of 1 |
| APPLICATION NO. | : 10/499758 | |
| DATED | : October 27, 2009 | |
| INVENTOR(S) | : Arieli et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1230 days.

Signed and Sealed this

Twelfth Day of October, 2010

David J. Kappos
*Director of the United States Patent and Trademark Office*